(12) United States Patent
Mitsuda et al.

(10) Patent No.: US 10,001,041 B2
(45) Date of Patent: Jun. 19, 2018

(54) ENGINE DEVICE

(71) Applicant: YANMAR CO., LTD., Osaka-shi, Osaka (JP)

(72) Inventors: Masataka Mitsuda, Osaka (JP); Isao Taguchi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 84 days.

(21) Appl. No.: 15/108,516

(22) PCT Filed: Dec. 10, 2014

(86) PCT No.: PCT/JP2014/082729
§ 371 (c)(1),
(2) Date: Jun. 27, 2016

(87) PCT Pub. No.: WO2015/098532
PCT Pub. Date: Jul. 2, 2015

(65) Prior Publication Data
US 2016/0319716 A1 Nov. 3, 2016

(30) Foreign Application Priority Data

Dec. 27, 2013 (JP) ................................. 2013-271756
Dec. 27, 2013 (JP) ................................. 2013-271757

(51) Int. Cl.
*F01N 3/05* (2006.01)
*B60K 13/04* (2006.01)
(Continued)

(52) U.S. Cl.
CPC .............. *F01N 3/055* (2013.01); *B60K 13/04* (2013.01); *F01N 13/1805* (2013.01);
(Continued)

(58) Field of Classification Search
CPC ..... B60K 13/04; F01N 13/1805; F01N 3/055; F01N 2260/022; F01N 2340/04;
(Continued)

(56) References Cited

U.S. PATENT DOCUMENTS

2014/0360172 A1 12/2014 Saitou et al.
2014/0366516 A1 12/2014 Mitsuda et al.
2015/0369109 A1 12/2015 Mitsuda

FOREIGN PATENT DOCUMENTS

JP 2000-145430 5/2000
JP 2004-138014 A 5/2004
(Continued)

OTHER PUBLICATIONS

Machine Translation of JP 2010185340 A to Onodera.*

*Primary Examiner* — Brandon Lee
(74) *Attorney, Agent, or Firm* — Norris McLaughlin & Marcus, P.A.

(57) ABSTRACT

An engine includes an exhaust gas purification device for treating exhaust gas. The exhaust gas purification device is arranged on the upper surface side of the engine. Regarding structure in which an exhaust throttle device is provided in an installation portion of an exhaust manifold on one side of the engine, the exhaust throttle device is inclined and disposed with respect to the right side surface of the engine in a plan view, and a gap is formed between the right side surface of a head cover and the inner side surface of the exhaust throttle device.

7 Claims, 33 Drawing Sheets

(51) Int. Cl.
*F01N 13/18* (2010.01)
*F01N 3/021* (2006.01)

(52) U.S. Cl.
CPC ..... *B60Y 2200/415* (2013.01); *B60Y 2200/62* (2013.01); *F01N 3/021* (2013.01); *F01N 2260/022* (2013.01); *F01N 2340/04* (2013.01); *F01N 2470/18* (2013.01)

(58) Field of Classification Search
CPC ................ F01N 2470/18; F01N 3/021; B60Y 2200/415; B60Y 2200/62
See application file for complete search history.

(56) References Cited

FOREIGN PATENT DOCUMENTS

| | | | |
|---|---|---|---|
| JP | 2007-182705 | | 7/2007 |
| JP | 2010-185292 | | 8/2010 |
| JP | 2010185292 | A | 8/2010 |
| JP | 2010185340 | A * | 8/2010 |
| JP | 2012-184771 | A | 9/2012 |
| JP | 2013-76403 | | 4/2013 |
| JP | 2013-079624 | A | 5/2013 |
| JP | 2013-231443 | | 11/2013 |
| JP | 2013-231443 | A | 11/2013 |
| JP | 2014-159202 | | 9/2014 |
| JP | 2014-238064 | | 12/2014 |
| WO | 2013/099980 | A1 | 7/2013 |
| WO | 2013/108879 | | 7/2013 |
| WO | 2013108879 | A1 | 7/2013 |

* cited by examiner

ENGINE DEVICE

BACKGROUND OF THE INVENTION

The present invention of the instant application relates to, an engine device, in which a diesel engine is mounted, such as a construction machine (a bulldozer, a hydraulic excavator, and a loader), an agricultural machine (a tractor and a combine harvester), a generator, or a compressor and more specifically relates to an engine device in which an exhaust gas purification device is mounted that removes particulate matter (soot) included in exhaust gas, and the like.

Technologies of purification treatment have been developed theretofore, wherein an exhaust gas purification device (a diesel particulate filter) is provided in the exhaust path of an engine, and the exhaust gas discharged from a diesel engine is purified with an oxidation catalyst, a soot filter, or the like in the exhaust gas purification device (for example, see Japanese Unexamined Patent Application Publication 2000-145430). Also, in recent years, in the field of work machines such as the construction machine and the agricultural machine, it has been demanded that the exhaust gas purification device is provided in the diesel engine used in the work machine for environmental measures (for example, see Japanese Unexamined Patent Application Publication 2007-182705).

SUMMARY OF THE INVENTION

Incidentally, when the exhaust gas purification device is provided, and the exhaust gas purification device is merely arranged in place of a silencer (muffler) in the exhaust path of an engine, the exhaust gas purification device is markedly heavy, compared with the silencer. Accordingly, there is a problem in that, even when the supporting structure of the silencer of the construction machine disclosed in Japanese Unexamined Patent Application Publication 2007-182705 applied to the supporting structure of the exhaust gas purification device, the exhaust gas purification device cannot be stably assembled. Also, in work machines such as a wheel loader, reduction in size of a travelling vehicle body itself is required so as to reduce a turning radius for the purpose of preventing contact with peripheral objects, and therefore an installation space of the engine is limited. Similarly, as for stationary work machines such as an engine generator, reduction in size has been demanded due to the limited installation space, and the installation space of the engine is limited in the interior of a machine casing.

Accordingly, it is an object of the present invention of the instant application to provide an engine device, in which improvements are provided in the light of the current circumstances.

An engine device of the present invention according to a first aspect of the invention may include an exhaust gas purification device for treating exhaust gas of an engine, and the exhaust gas purification device is arranged on an upper surface side of the engine, and the engine device has structure in which an exhaust throttle device is provided in an installation portion of an exhaust manifold on one side of the engine, and the exhaust throttle device is inclined and disposed with respect to one side surface of the engine in a plan view.

Regarding the engine device according to the first aspect the present invention according a second aspect thereof may be such that a connection portion of a coolant pipe of the exhaust throttle device is configured to be oriented to a side of a cooling fan of the engine.

Regarding the engine device according to the first or second aspect of the present invention according to a third aspect thereof may be such that regarding structure in which the exhaust gas purification device is mounted on a flywheel housing of the engine, an exhaust outlet of the exhaust manifold is opened upward, and the exhaust throttle device is arranged on an upper portion of the exhaust outlet of the exhaust manifold, and the exhaust throttle device is coupled with an inlet pipe of the exhaust gas purification device via an exhaust outlet pipe.

Regarding the engine device according to any one of the first to third aspects of the present invention, the present invention according to a fourth aspect thereof may be such that the exhaust manifold has constitution in which an exhaust pressure sensor pipe is connected to a pressure outlet port on an upper surface, and the exhaust pressure sensor pipe is extended in such a manner as to pass through a gap between a head cover and the exhaust throttle device and connected to an exhaust pressure sensor provided on the side of the cooling fan.

Regarding the engine device according to the fourth aspect thereof, the present invention according to the fifth aspect thereof may such that regarding structure in which the exhaust gas purification device is mounted on a flywheel housing of the engine, the flywheel housings having different specifications are configured to be replaceable.

Regarding the engine device according to the fifth aspect thereof the present invention according to a sixth aspect thereof may be such that regarding structure in which an exhaust gas sensor is arranged on an upper side surface of the exhaust gas purification device, it is formed in such a manner that an upper surface of the engine is flush with an upper surface of the exhaust gas sensor in a side view.

Regarding the engine device according to the fifth or sixth aspect of the present invention according to seventh aspect thereof may be such that an exhaust outlet pipe is adhered to the exhaust manifold of the engine, and the exhaust outlet pipe is coupled with an inlet pipe of the exhaust gas purification device, and the exhaust throttle device is provided between the exhaust manifold and the exhaust outlet pipe.

Regarding the engine device according to the seventh aspect thereof, the present invention may be such that it is formed in such a manner that one side surface of the exhaust gas purification device, which is disposed opposite to a main machine frame in which the engine and the like are mounted, is flush with an outer side surface of the exhaust throttle device.

According to the first aspect of the present invention, the engine device includes the exhaust gas purification device for treating exhaust gas of the engine, and the exhaust gas purification device is arranged on the upper surface side of the engine, and the engine device has structure in which the exhaust throttle device is provided in the installation portion of the exhaust manifold on one side of the engine, and the exhaust throttle device is inclined and disposed with respect to one side surface of the engine in a plan view, so that the connection portion of the coolant pipe of the exhaust throttle device can be formed outward, and, the exhaust throttle device can be contiguously arranged on the side surface of the engine and can be supported in a compact way, while the coolant pipes can be easily prevented from contacting the engine due to the mechanical vibration and being damaged.

According to the second aspect of the present invention, the connection portion of the coolant pipe of the exhaust throttle device is configured to be oriented to the side of the cooling fan of the engine, so that the coolant pipe of the exhaust throttle valve case, which is connected to the coolant pump that works in conjunction with the cooling fan, can be formed so as to be short, and the mechanical vibration of the coolant pipe can be easily reduced.

According to the third aspect of the present invention, regarding the structure in which the exhaust gas purification device is mounted on the flywheel housing of the engine, the exhaust outlet of the exhaust manifold is opened upward, and the exhaust throttle device is arranged on the upper portion of the exhaust outlet of the exhaust manifold, and the exhaust throttle device is coupled with the inlet pipe of the exhaust gas purification device via the exhaust outlet pipe, so that a mounting height can be formed in a compact way on the lateral surface of the engine, and the exhaust gas purification device is fixed on the flywheel housing having high rigidity, so that the supporting structure of the exhaust gas purification device, which is a heavy object, cars be constituted with high rigidity. Also, the mounting position of the exhaust gas purification device or the like can be easily changed only by changing the specifications of the exhaust outlet pipe, and the engine in which the exhaust gas purification device is mounted can be mounted in accordance with the engine room space of various work vehicles in an easy manner.

According to the fourth aspect of the present invention, the exhaust manifold has constitution in which the exhaust pressure sensor pipe is connected to the pressure outlet port on the upper surface, and the exhaust pressure sensor pipe is extended in such a manner as to pass through the gap between the head cover and the exhaust throttle device and connected to the exhaust pressure sensor provided on the side of the cooling fan, so that the exhaust pressure sensor pipe can be formed so as to be short without causing other constituent components to make a detour to a connection path from the pressure outlet port of the exhaust manifold to the exhaust pressure sensor, and the vibration-proof structure of the exhaust pressure sensor pipe and the connection component can be simplified.

According to the fifth aspect of the present invention, regarding structure in which the exhaust gas purification device is mounted on a flywheel housing of the engine, the flywheel housings having different specifications are configured to be replaceable, so that the flywheel housings, each of which has different specifications, are properly used depending on the purposes, thereby changing the heights of the exhaust gas purification device to be supported, and the engine of the same specifications can be easily mounted on various work machines such as a loader and a generator.

According to the sixth aspect of the present invention, regarding structure in which the exhaust gas sensor is arranged on the upper side surface of the exhaust gas purification device, it is formed in such a manner that the upper surface of the engine is flush with the upper surface of the exhaust gas sensor in a side view, so that the engine room can be formed its the interior of a hood of which the upper surface is flat, and the engine can be assembled into the engine room in a compact way. In particular, regarding the loader and the like, the operator on the operating seat can visually recognize the rear of a machine body beyond the upper surface of the hood.

According to the seventh aspect of the present invention, the exhaust outlet pipe is adhered to the exhaust manifold of the engine, and the exhaust outlet pipe is coupled with the inlet pipe of the exhaust gas purification device, and the exhaust throttle device is provided between the exhaust manifold and the exhaust outlet pipe, so that when the flywheel housings, each of which has different specifications, are properly used depending on the purposes, the exhaust gas purification device with the same specifications can be arranged by replacing the exhaust outlet pipe.

According to the eighth aspect of the present invention, it is formed in such a manner that one side surface of the exhaust gas purification device, which is disposed opposite to a main machine frame in which the engine and the like are mounted, is flush with an outer side surface of the exhaust throttle device, so that while engine room structure in which the engine is surrounded by the main machine frame can be constituted in a simple manner, the assembly workability of the engine in which the exhaust gas purification device is arranged can be easily improved. Also, the one side surface of the exhaust gas purification device and the outer side surface of the exhaust throttle device can be contiguously arranged in a compact manner by facing the flat, vertical wall surface of the main machine frame, and the engine can be assembled in a compact way in a limited engine room space.

DETAILED DESCRIPTION OF THE INVENTION

Hereinafter, an engine device of the first embodiment of the present invention of the instant application will be described based on the drawings with reference to FIGS. 1 to 18. It is noted that hereinafter, a wheel loader, which includes a loader device as a work portion, is exemplified as a work machine of the present embodiment, and the constitution of the wheel loader will be described in detail.

Figure 25:
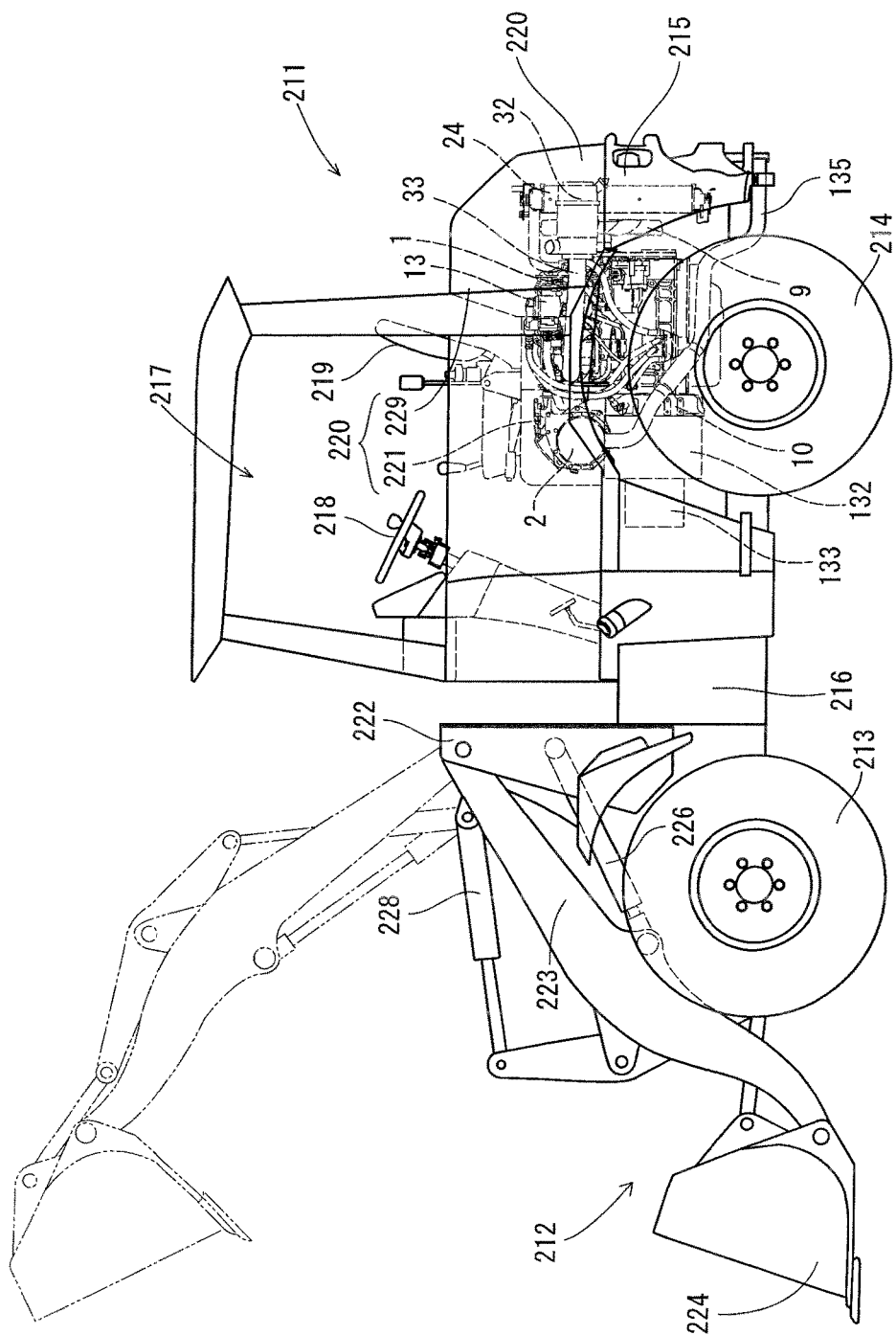
FIG. 25 is a left side view of a wheel loader, which is one example of a work machine in which the diesel engine of the first embodiment is mounted.
Figure 26:
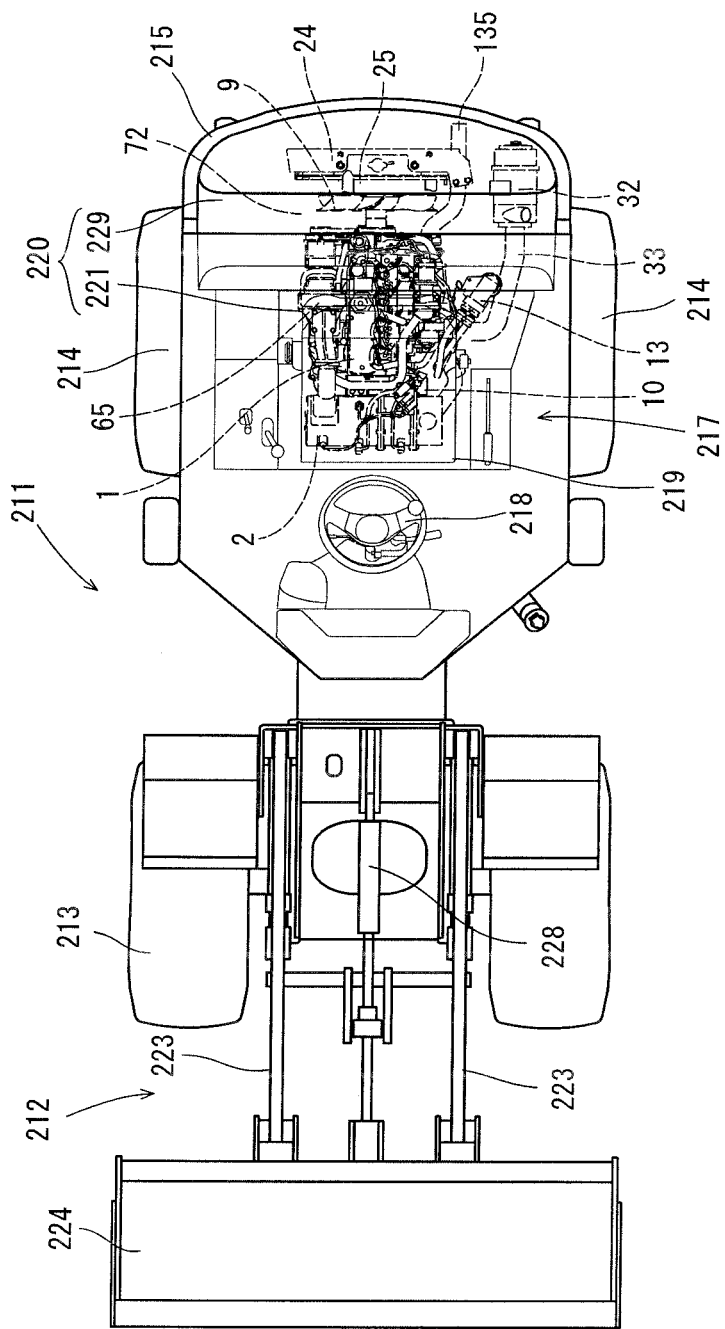
FIG. 26 is a plan view of the wheel loader.

First, with reference to FIGS. 1 to 11, as for the engine device of the present embodiment, a diesel engine 1 mounted on a work machine as a power engine, such as a wheel loader 211 described later (see FIGS. 25 and 26) is exemplified and described below. As described above, the diesel engine 1 includes an exhaust gas purification device 2 connected via an exhaust throttle device 65. The exhaust gas purification device 2 includes a function of reducing carbon monoxide (CO) or hydrocarbon (HC) in the exhaust gas of the diesel engine 1, in addition to the removal of particulate matter (PM) in the exhaust gas of the diesel engine 1.

The diesel engine 1 includes a crankshaft 3 for engine output and a cylinder block 4 in which pistons (not illustrated) are incorporated. A cylinder head 5 is placed on the cylinder block 4. An intake manifold 6 is arranged on the left side surface of the cylinder head 5. An exhaust manifold 7 is arranged on the right side surface of the cylinder head 5. A head cover 8 is arranged on the upper side surface of the cylinder head 5. A cooling fan 9 is provided on the rear side surface of the cylinder block 4. A flywheel housing 10 is provided on the front side surface of the cylinder block 4. A flywheel 11 is arranged in the flywheel housing 10. The flywheel 11 is pivotally supported on the crankshaft 3 (engine output shaft). It is constituted that the power of the diesel engine 1 is taken out to the work portion of a work vehicle (a backhoe, a forklift, and the like) via the crankshaft 3.

Also, an oil pan 12 is arranged on the lower surface of the cylinder block 4. Lubricating oil is stored in the oil pan 12. The lubricating oil in the oil pan 12 is drawn in by an oil pump (not illustrated) arranged at a section near to the left side surface in the cylinder block 4 and supplied to each lubricant portion of the diesel engine 1 via an oil cooler 18 and an oil filter 13 arranged on the left side surface of the cylinder block 4. The lubricating oil supplied to each lubricant portion is returned to the oil pan 12 afterward. The oil pump (not illustrated) is configured to be driven by the rotation of the crankshaft 3. The oil cooler 18 cools the lubricating oil by use of a coolant.

The oil cooler 18 is mounted above the oil pan 12 on the left side surface of the cylinder block 4. The oil cooler 18 is connected to coolant pipes 18a and 18b and has structure in which the coolant recirculates in the interior thereof. The oil filter 13 is arranged in such a manner as to overlap the left side of the oil cooler 18. That is, the oil filter 13 and the oil cooler 18, which are coupled to each other on the right and left, are arranged in such a manner as to protrude from the left side surface to the outside (left side) of the cylinder block 4, at a position above the oil pan 12.

Figure 2:
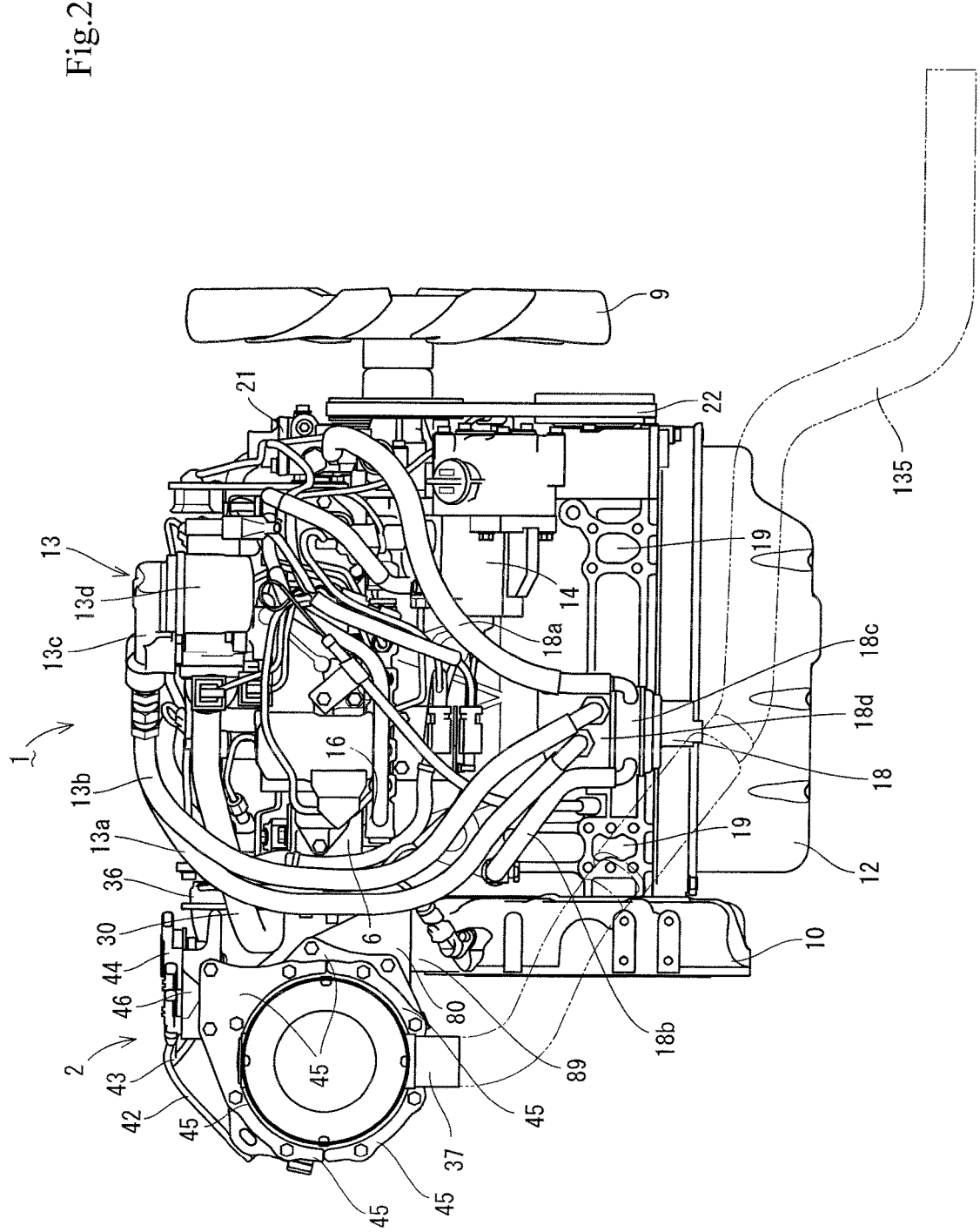
FIG. 2 is a left side view of the diesel engine.
Figure 4:
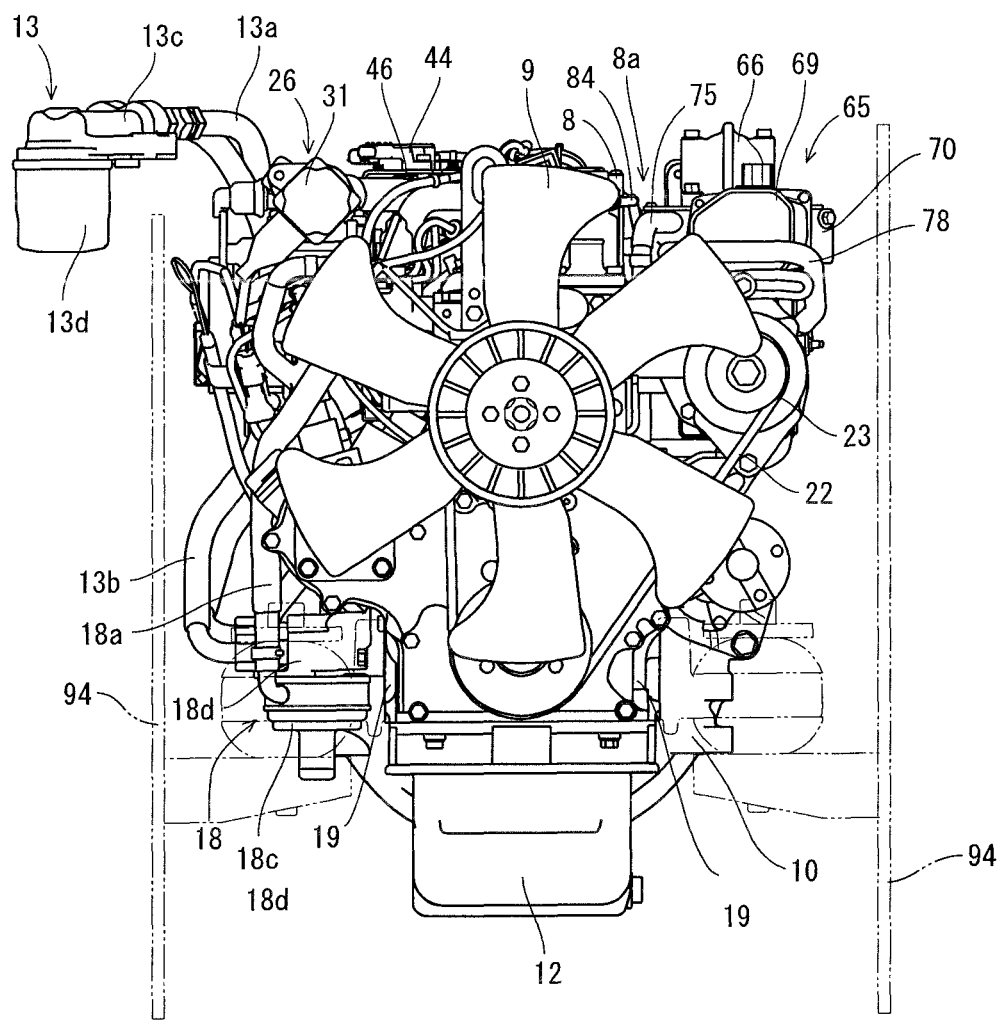
FIG. 4 is a rear view of the diesel engine.
Figure 5:
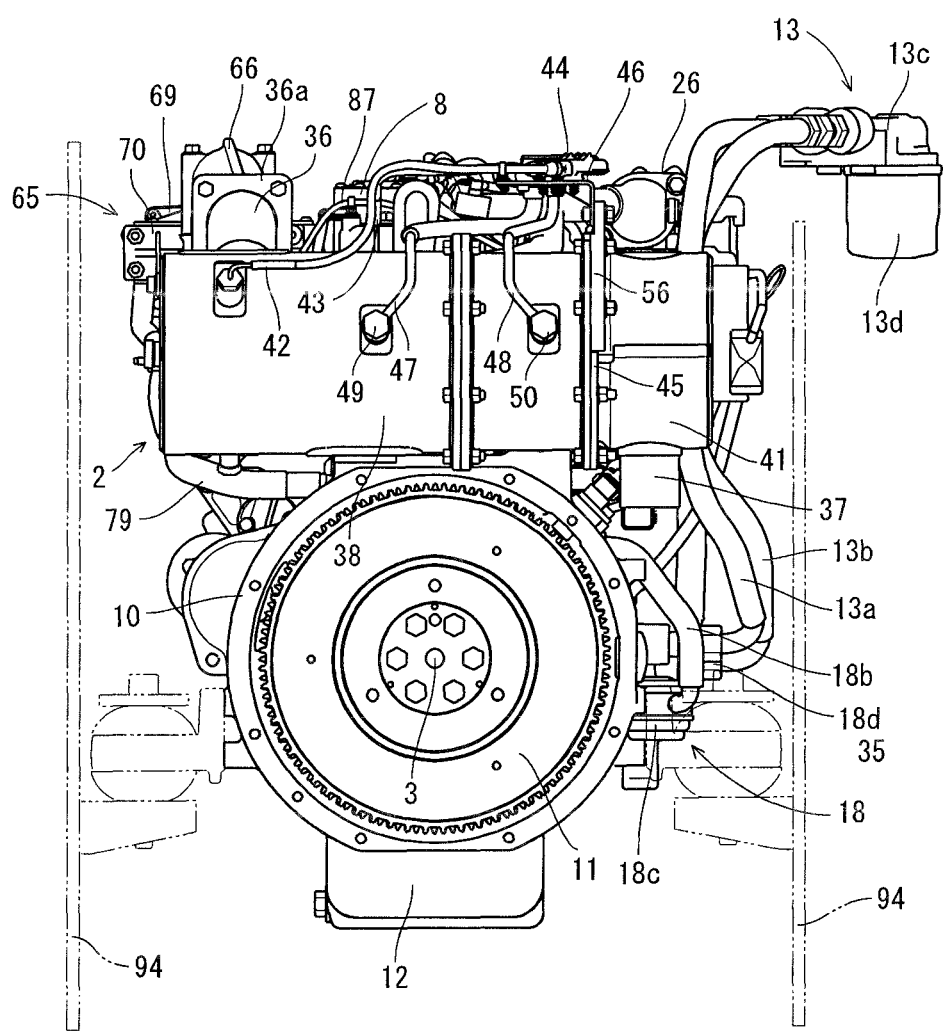
FIG. 5 is a front view of the diesel engine.

As illustrated in FIGS. 2 and 4, the oil cooler 18 is mounted above the oil pan 12 on the left side surface of the cylinder block 4. The lower portion of the oil cooler 18 is connected to the coolant pipes 18a and 18b, and the oil cooler 18 has structure in which the coolant recirculates in the interior thereof. Also, the oil cooler 18 includes an oil pipe connection portion 18d connected to oil pipes 13a and 13b above a coolant pipe connection portion 18c between the coolant pipes 18a and 18b. Accordingly, the oil cooler 18 couples the oil pipes 13a and 13b through the oil pipe connection portion 18d, thereby connecting the oil filter 13 arranged above the cylinder block 4.

Figure 3:
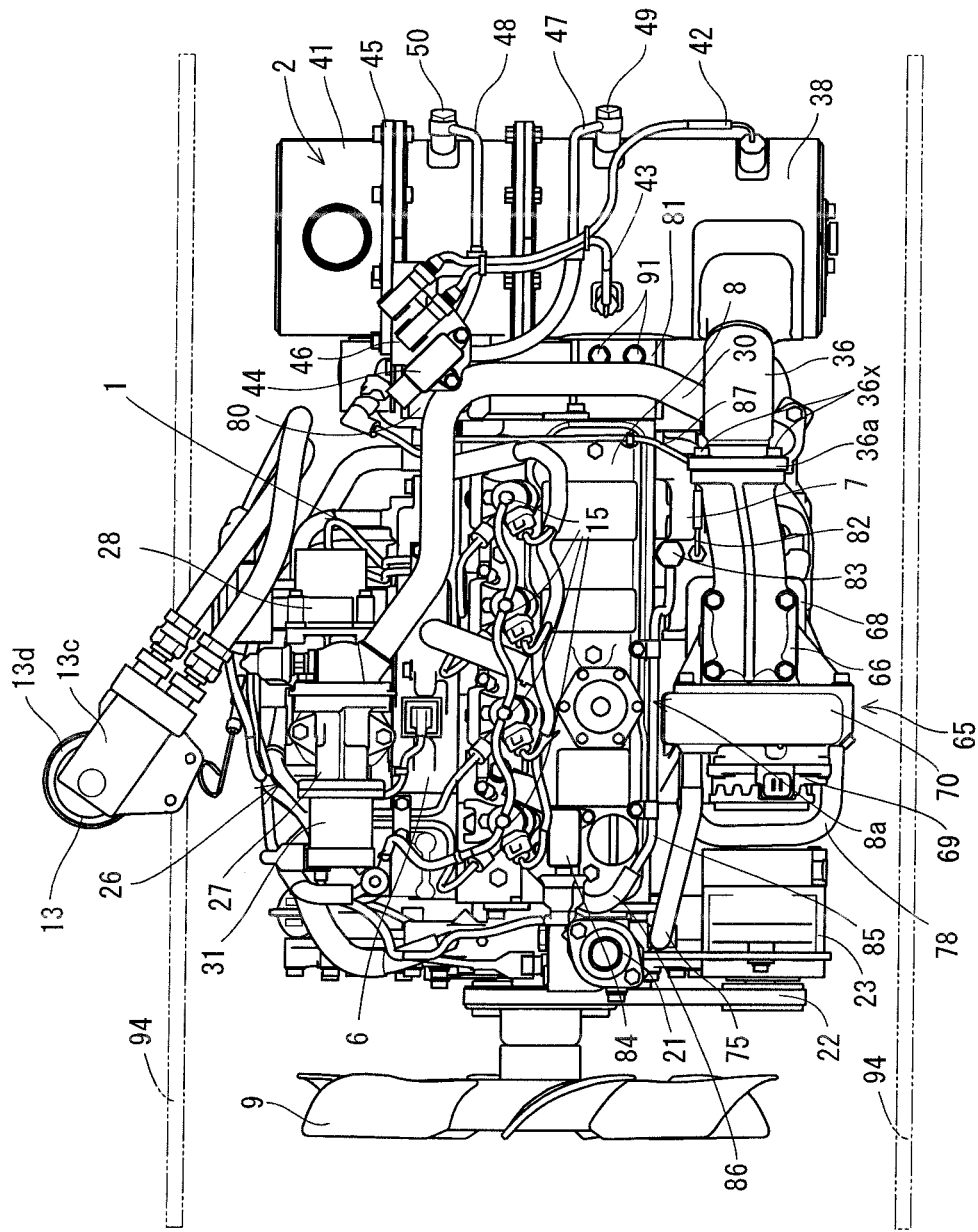
FIG. 3 is a plan view of the diesel engine.

As illustrated in FIGS. 2 to 4, the oil filter 13 is arranged at a position that is separated horn the left side surface to the left side of the cylinder head 5. The oil filter 13 is arranged at a position of which the height is approximately equal to that of the head cover 8 and remotely arranged with respect to the oil cooler 18 on the lower side on the left side surface of the cylinder block 4. Also, the oil filter 13 is constituted such that an oil pipe connection portion 13c connected to the oil pipes 13a and 13b is regarded as an upper side, and a filter portion 13d for removing impurities in the lubricating oil is regarded as a lower side. That is, the oil filter 13 is arranged at a position separated with respect to the left side surface of the diesel engine 1 and coupled with the oil pipes 13a and 13b at a position higher than the height (the height of the upper surface of the head cover 9) of the upper surface of the diesel engine 1.

Accordingly, as illustrated in FIG. 4, when the diesel engine 1 is mounted on a machine body frame 94, the oil filter 13 can be arranged on the outside of the machine body frame 94. That is, the left side surface of the diesel engine 1 is covered with the inner side surface of the machine body frame 94, whereas the oil filter 13 is arranged on the outside of the machine body frame 94. Then, the oil pipes 13a and 13b are disposed from the lower side to the upper side in such a manner as to be along the inner side surface of the machine body frame 94, so that the oil filter 13 couples the oil cooler 18 at a position on the upper side of the machine body frame 94. Accordingly, when the filter portion 13d of the oil filter 13 is replaced, an operator can work on the outside of the machine body frame 94, thereby improving workability and maintainability.

Figure 6:
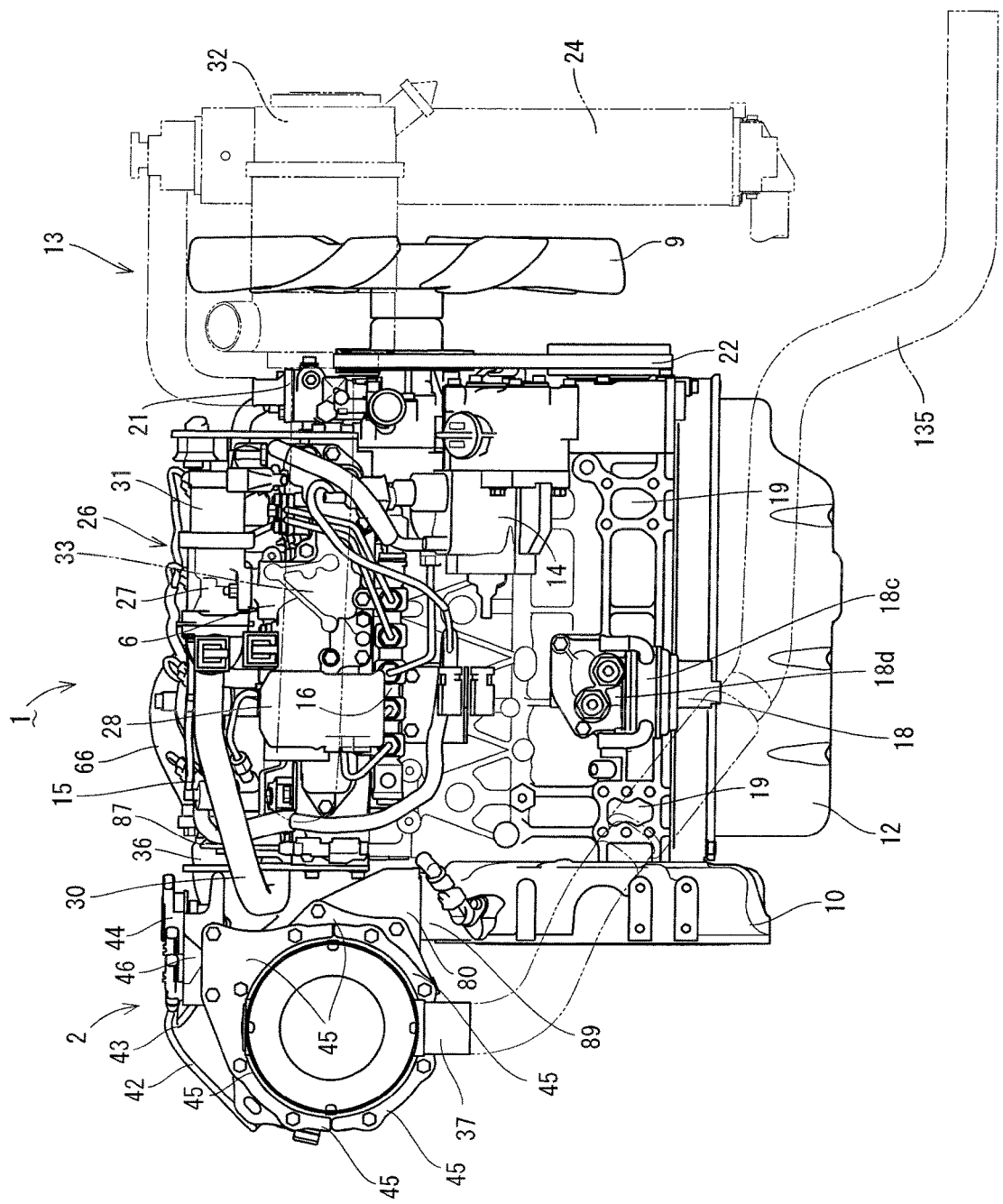
FIG. 6 is a left side view of the diesel engine in which an oil filter is detached.

As illustrated in FIGS. 2 and 6, a fuel supply pump 14 for supplying fuel is mounted above the oil cooler 18 (below the intake manifold 6) on the left side surface of the cylinder block 4. Injectors 15 for four cylinders which are equipped with a fuel injection valve (not illustrated) of an electromagnetic opening/closing control type, are provided in the diesel engine 1. Each injector 15 is connected to a fuel tank (not illustrated) mounted on the work vehicle via the fuel supply pump 14, a cylindrical common rail 16, and a fuel filter (not illustrated).

The fuel in the fuel tank is pressure-fed from the fuel supply pump 14 to the common rail 16, and high-pressure fuel is accumulated in the common rail 16. The fuel injection valve of each injector 15 is controlled in such a manner as to be opened and closed, and the high-pressure fuel in the common rail 16 is injected from each injector 15 to each cylinder of the diesel engine 1.

Figure 1:
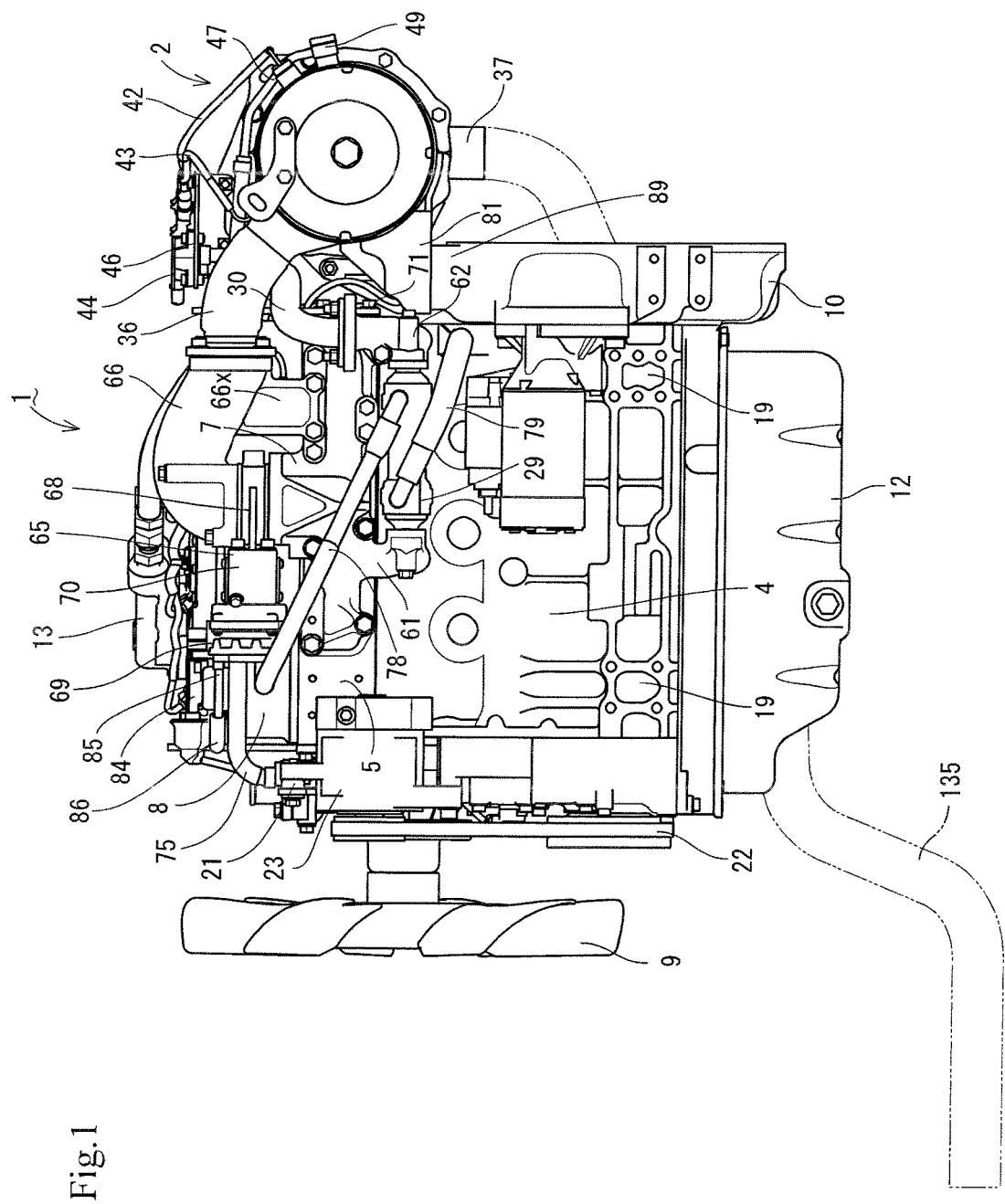
FIG. 1 is a right side view of a diesel engine of the first embodiment of the present invention of the instant application.

As illustrated in FIGS. 1 and 4, a coolant pump 21 for coolant recirculation is arranged coaxially with the fan shaft of the cooling fan 9 in a section near to the right of the rear surface of the cylinder block 4. The coolant pump 21 along with the cooling fan 9 is driven by the rotation of the crankshaft 3 via a V belt 22 for driving the cooling fen. The coolant in a radiator 24 mounted on the work vehicle is supplied to the coolant pump 21 by the drive of the coolant pump 21. Then, the coolant is supplied to the cylinder block 4 and the cylinder head 5, thereby cooling the diesel engine 1. It is noted that an alternator 23 is provided on the right side of the coolant pump 21.

As illustrated in FIGS. 1 and 2, engine leg mounting units 19 are respectively provided on the right and left side surfaces of the cylinder block 4. In each engine leg mounting unit 19, an engine leg body (not illustrated) that includes a vibration-proof rubber and is coupled with the right and left lateral walls of the machine body frame 94 is fastened with bolts. The diesel engine 1 is supported in a vibration isolating manner on the machine body frame 94 of the travelling vehicle body of the work vehicle via each engine leg body (not illustrated). Accordingly, the vibration of the diesel engine 1 can be prevented from being transmitted to the machine body frame 94.

Furthermore, an EGR device 26 (exhaust gas recirculation device) will be described referring to FIGS. 1 to 8. An air cleaner 32 (see FIG. 7) is coupled with the inlet portion of the intake manifold 6 protruded upward via the EGR device 26 (exhaust gas recirculation device). Fresh air (outside air) is transmitted from the air cleaner 32 to the intake manifold 6 via the EGR device 26. The EGR device 26 includes an EGR main body case 27 (collector) that mixes part of the exhaust gas (EGR gas from the exhaust manifold) of the diesel engine with the fresh air (the outside air from the air cleaner 32) and supplies the mixed air to the intake manifold 6, an intake throttle member 28 through which the EGR main body case 27 communicates with the air cleaner 32 through an intake pipe 33, a recirculation exhaust gas pipe 30 connected, as a return pipe path, to the exhaust manifold 7 via an EGR cooler 29, and an EGR valve member 31 through which the EGR main body case 27 communicates with the recirculation exhaust gas pipe 30.

That is, the intake manifold 6 and the intake throttle member 28 for introducing the fresh air are connected via the EGR main body case 27. Then, the outlet side of the recirculation exhaust gas pipe 30 extended from the exhaust manifold 7 communicates with the EGR main body case 27. The EGR main body case 27 is formed in a cylindrical shape. The intake throttle member 28 is fastened with bolts to one end portion of the EGR main body case 27 in the longitudinal direction. The opening end portion, oriented downward, of the EGR main body case 27 is detachably fastened with bolts to the inlet portion of the intake manifold 6.

Also, the outlet side of the recirculation exhaust gas pipe 30 is coupled with the EGR main body case 27 via the EGR valve member 31. The inlet side of the recirculation exhaust gas pipe 30 is coupled with the lower surface side of the exhaust manifold 7 via the EGR cooler 29. The recirculation exhaust gas pipe 30 is disposed above the flywheel housing 10 in such a manner as to make a detour to the front surface of the cylinder head 5. Also, the opening degree of the EGR valve (not illustrated) in the EGR valve member 31 is adjusted, thereby adjusting the amount of EGR gas supplied to the EGR main body case 27.

With the aforementioned constitution, the fresh air (outside air) is supplied from the air cleaner 32 into the EGR main body case 27 via the intake throttle member 28, whereas the EGR gas (part of the exhaust gas discharged from the exhaust manifold) is supplied from the exhaust manifold 7 into the EGR main body case 27 via the EGR valve member 31. After the fresh air from the air cleaner 32 and the EGR gas from the exhaust manifold 7 are mixed in the EGR main body case 27, the mixed gas in the EGR main body case 27 is supplied to the intake manifold 6. That is, part of the exhaust gas discharged from the diesel engine 1 to the exhaust manifold 7 is returned from the intake manifold 6 to the diesel engine 1, so that the maximum combustion temperature during high-load operations is reduced, and the amount of NOx (nitride oxides) discharged from the diesel engine 1 is reduced.

When the EGR cooler 29 is arranged as described above, an EGR gas extraction pipe 61 is integrally formed in the exhaust manifold 7. Also, a pipe joint member 62 is fastened with bolts to the exhaust manifold 7. The EGR gas inlet portion of the EGR cooler 29 is supported with the EGR gas extraction pipe 61, and the EGR gas outlet portion of the EGR cooler 29 is supported with the pipe joint member 62 that connects the recirculation exhaust gas pipe 30, so that the EGR cooler 29 is separated from the cylinder block 4 (specifically, the left side surface) and arranged.

Also, as illustrated in FIGS. 1 to 3 and 6 to 8, the recirculation exhaust gas pipe 30 connected to the pipe joint member 62 is arranged facing the front surface of the cylinder head 5 in such a manner as to pass under the lower side of a purification inlet pipe 36 of the exhaust gas purification device 2. That is, the recirculation exhaust gas pipe 30 and the purification inlet pipe 36 intersect each other in such a manner that the purification inlet pipe 36 is disposed on the upper side, above the flywheel housing 10. Accordingly, above the flywheel housing 10 in front of the cylinder head 5, the recirculation exhaust gas pipe 30 is extended from the right side surface to the left side surface of the cylinder head 5, whereas the purification inlet pipe 36 is extended in the back-and-forth direction in such a manner as to straddle the upper section of the recirculation exhaust gas pipe 30.

Figure 9:
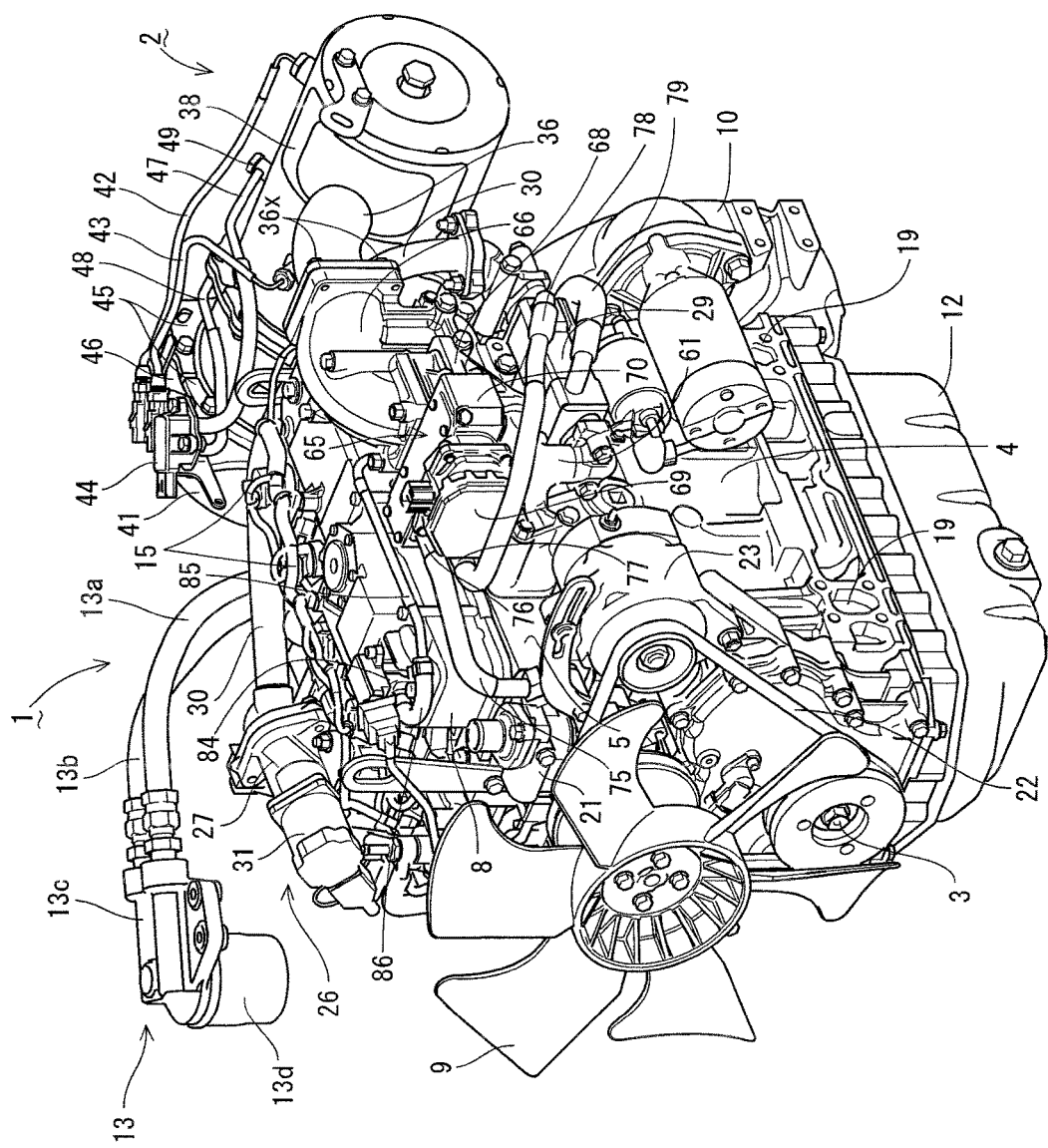
FIG. 9 is a perspective rear view of the diesel engine.
Figure 10:
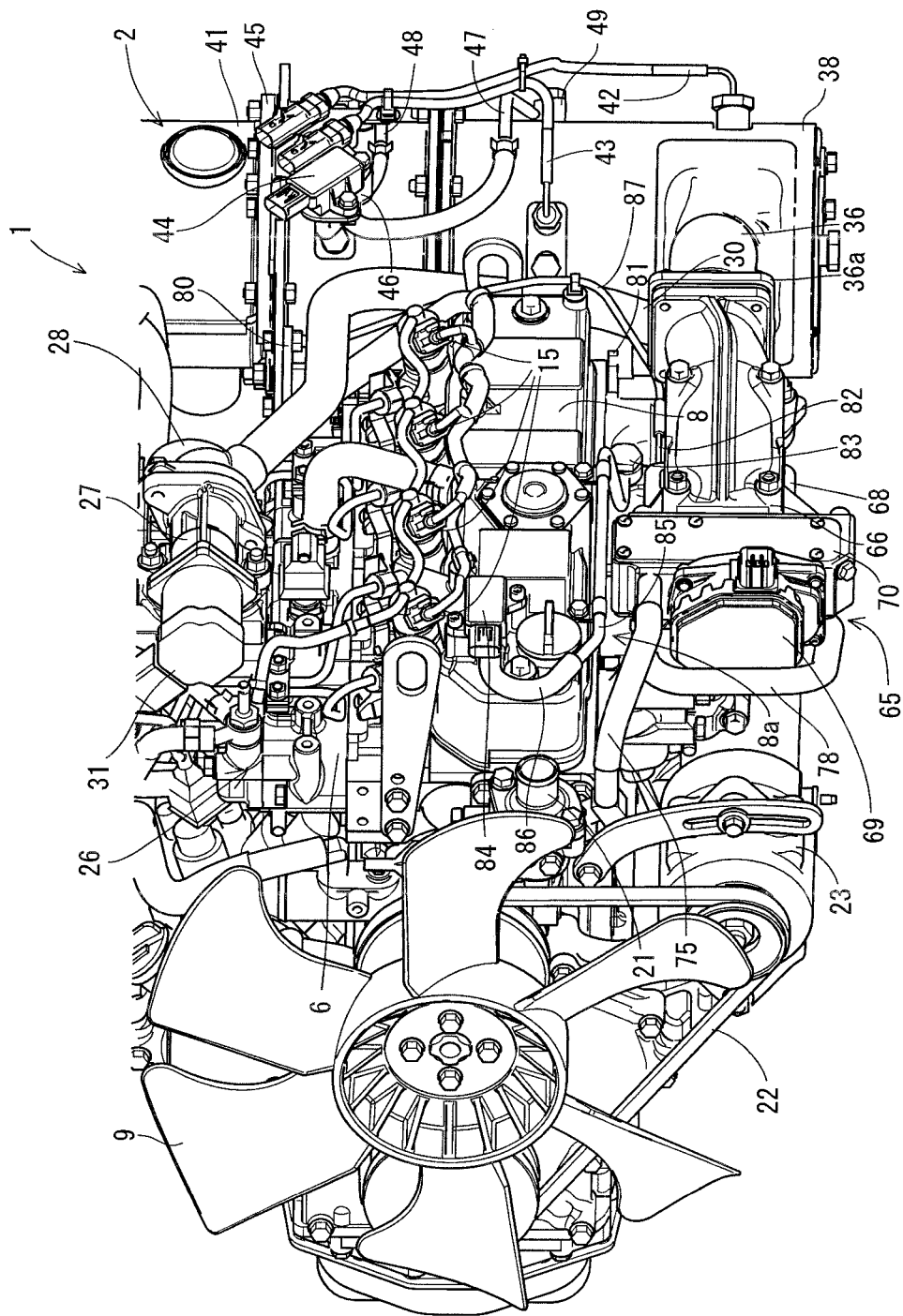
FIG. 10 is an enlarged view of a perspective plan view of the diesel engine.
Figure 11:
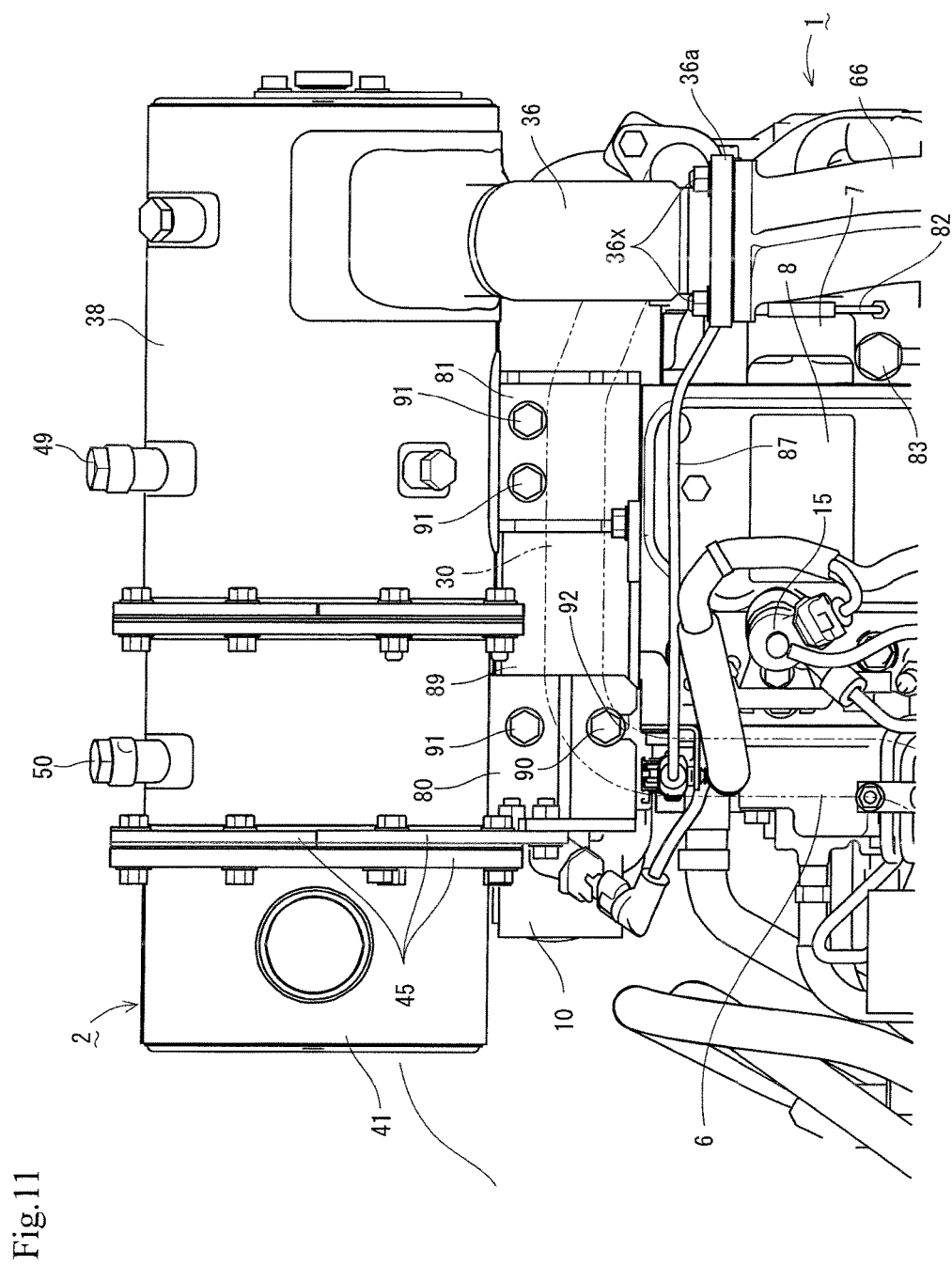
FIG. 11 is a partial enlarged view of FIG. 3.
Figure 12:
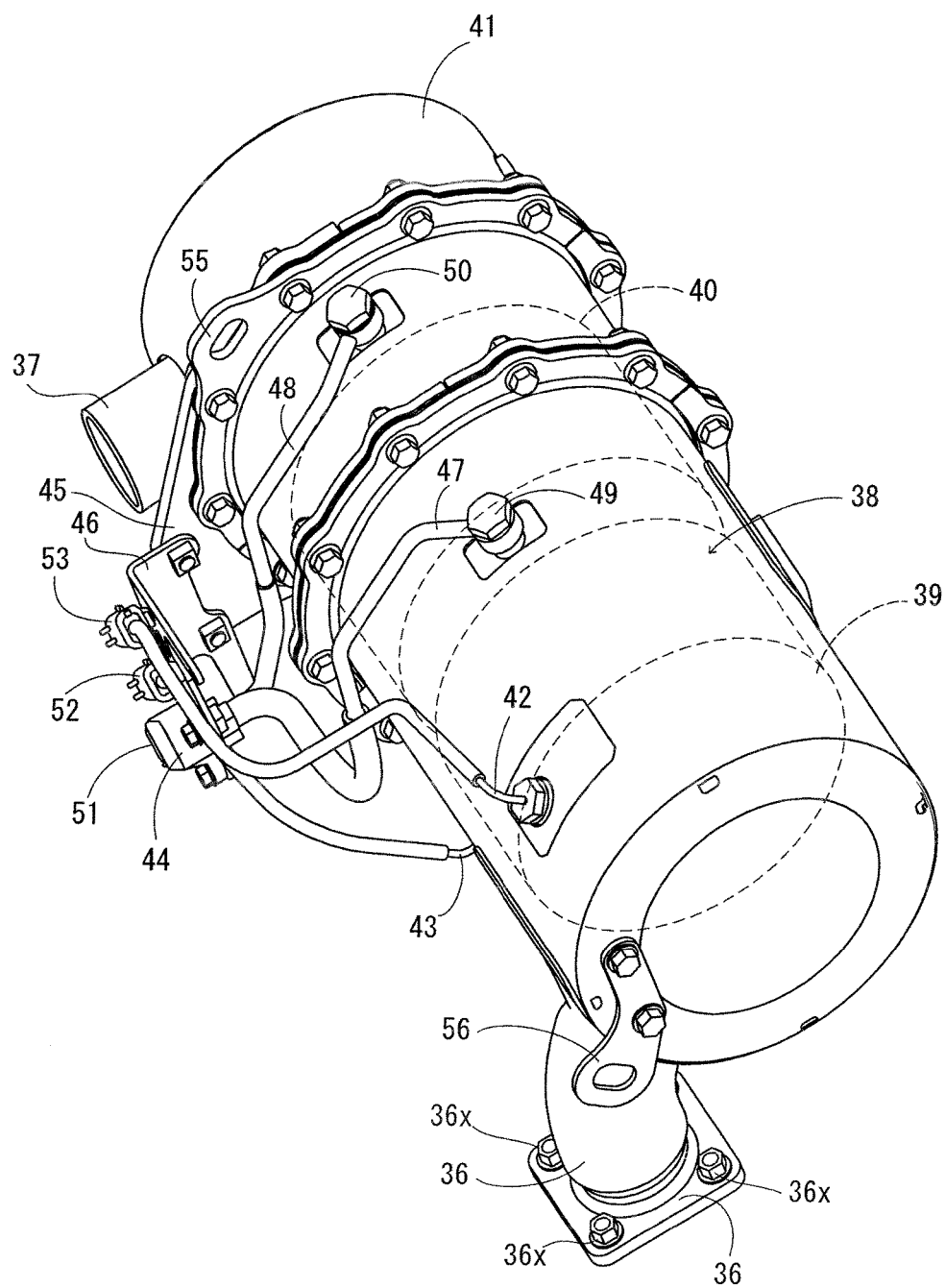
FIG. 12 is a perspective view of an external appearance of an exhaust gas purification device.
Figure 13:
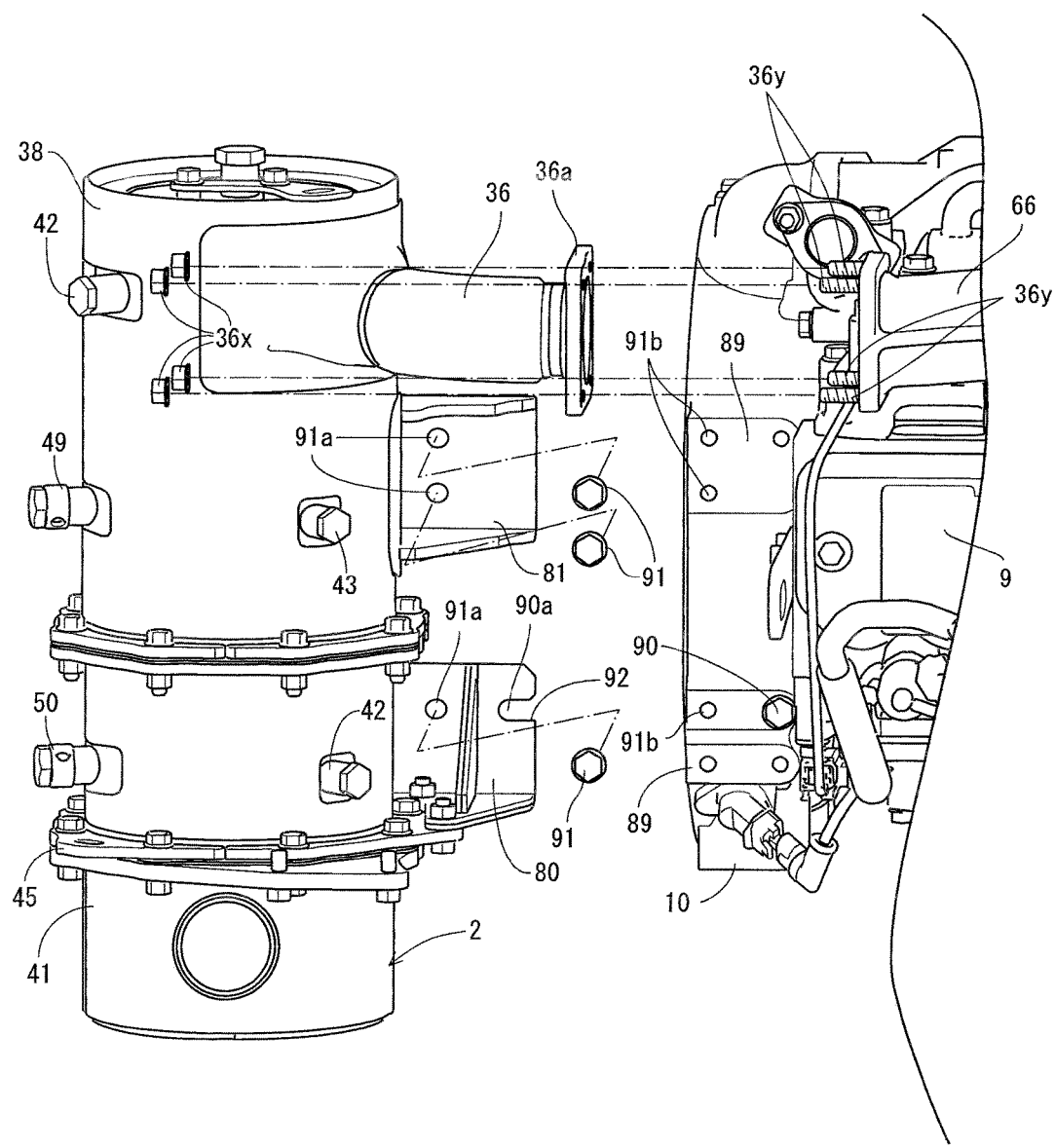
FIG. 13 is an (exploded) explanatory view of assembly of the exhaust gas purification device.
Figure 14:
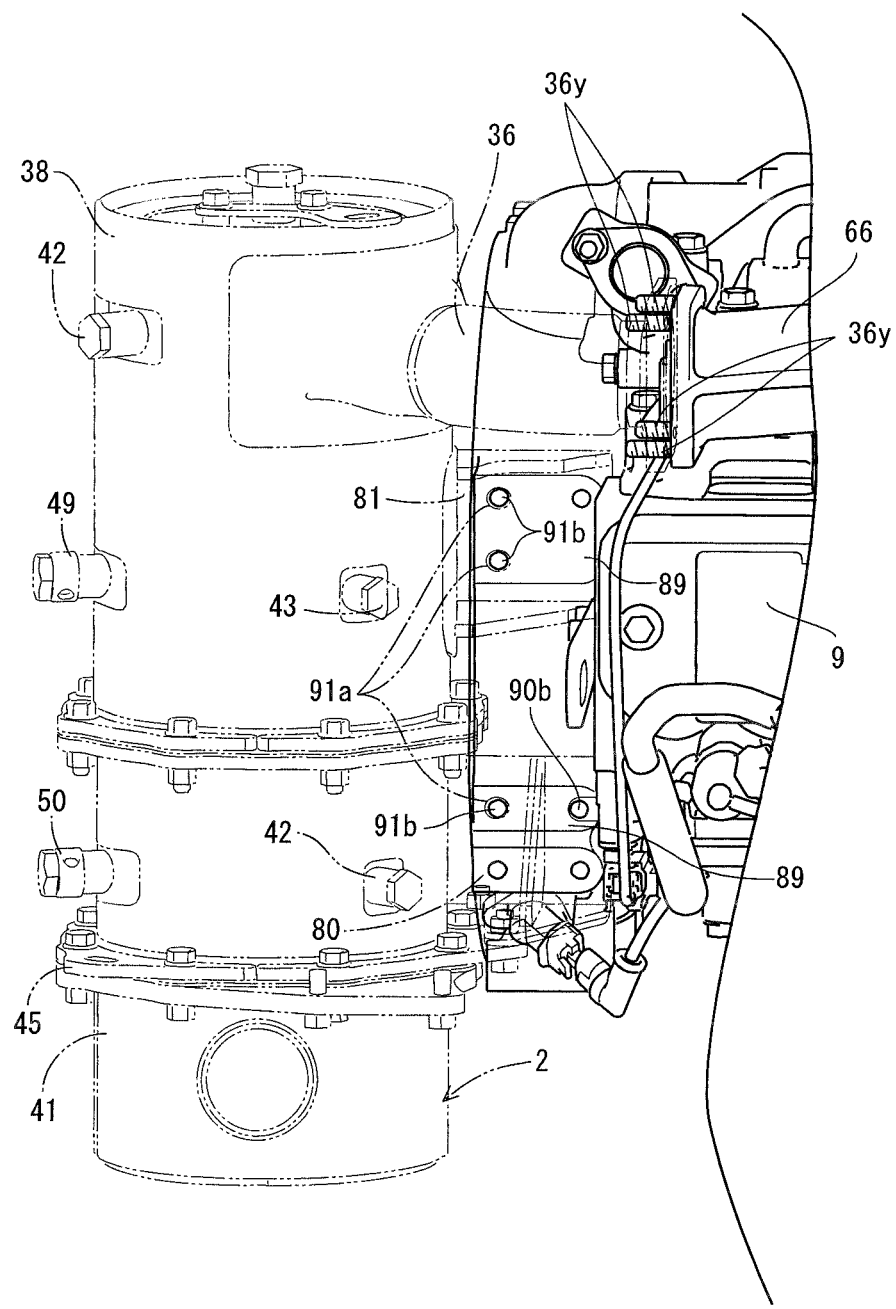
FIG. 14 is an enlarged view to describe the constitution of a mounting portion on a flywheel housing.

Thus, as illustrated in FIGS. 1 and 9, the EGR cooler 29 for cooling EGR gas is arranged below the exhaust manifold 7 on the right side surface of the cylinder block 4. Accordingly, the exhaust manifold 7 and the EGR cooler 29 can be installed in a compact way along the one side surface of the engine 1. Then, a coolant pipe path that connects the coolant pump 21 to the EGR cooler 29 and the exhaust throttle device 65 is provided on the right side (the side of the exhaust manifold 7) of the diesel engine 1. In this manner, it is configured such that not only the coolant from the coolant pump 21 is supplied to the water cooling portion of the diesel engine 1, but also part of the coolant is transferred to the EGR cooler 29 and the exhaust throttle device 65.

Also, as illustrated in FIGS. 1, 3 to 5, and 7 to 10, the exhaust throttle device 65 that increases the exhaust pressure of the diesel engine 1 is provided on the right side of the cylinder head 5. The exhaust outlet of the exhaust manifold 7 is opened upward. The exhaust outlet of the exhaust manifold 7 is detachably coupled with a joining pipe 66 formed in an elbow shape via the exhaust throttle device 65 for adjusting the exhaust pressure of the diesel engine 1. The exhaust throttle device 65 includes a throttle valve case 68 in which an exhaust throttle valve is incorporated, an actuator case 69 in which a power transmission mechanism from the motor (actuator) for controlling the opening/closing of the exhaust throttle valve is incorporated, and a water cooling case 70 for connecting the actuator case 69 with the throttle valve case 68. The rotary shaft of the motor is configured to be capable of being interlocked with the rotary shaft of the exhaust throttle valve in the throttle valve case 68 via gears by means of the power transmission mechanism.

The throttle valve case 68 is placed on the exhaust outlet of the exhaust manifold 7, and the joining pipe 66 is placed on the throttle valve case 68, and the joining pipe 66 is fastened with four bolts to the exhaust outlet body of the exhaust manifold 7 via the throttle valve case 68. The lower surface side of the throttle valve case 68 is adhered to the exhaust outlet body of the exhaust manifold 7. A lower-surface-side opening portion of the joining pipe 66 is adhered to the upper surface side of the throttle valve case 68. A sideways opening portion of the joining pipe 66 is coupled with the purification inlet pipe 36 of the exhaust gas purification device 2.

Accordingly, the exhaust manifold 7 is connected to the aforementioned exhaust gas purification device 2 via the joining pipe 66 and the exhaust throttle device 65. After the exhaust gas purification device 2 via the throttle valve case 68 and the joining pipe 66, is purified in the exhaust gas purification device 2, the exhaust gas is transferred from a purification outlet pipe 37 to a tail pipe 135 and finally discharged to the outside of the device.

Also, the joining pipe 66 includes a coupling support portion 66x for coupling the exhaust manifold 7 at a position disposed between the exhaust throttle device 65 and the exhaust inlet pipe 36 of the exhaust gas purification device 2. The coupling support portion 66x is constituted of a wing-shaped plate that protrudes from the outer circumferential surface of the joining pipe 66 to the exhaust manifold 7 and fastened to the right side surface of the exhaust manifold 7. The exhaust inlet of the joining pipe 66 is coupled with the exhaust outlet of the exhaust manifold 7 via the exhaust throttle device 65, and a pipe portion through which the exhaust gas flows to the exhaust inlet pipe 36 is coupled with the side surface of the exhaust manifold 7 and supported by the exhaust manifold 7. Accordingly, the joining pipe 66 is supported by the exhaust manifold 7 having high rigidity, thereby constituting the supporting structure with high rigidity with respect to the exhaust gas purification device 2 via the joining pipe 66.

With the aforementioned constitution, the motor of the exhaust throttle device 65 is actuated based on a difference in pressure detected by a differential pressure sensor 44 of the exhaust gas purification device 2, thereby executing the regeneration control of a soot filter 40. That is, when soot (soot) is accumulated on the soot filter 40, the exhaust pressure of the diesel engine 1 is increased by the control of closing the exhaust throttle valve of the exhaust throttle device 65, there by increasing a temperature of the exhaust gas discharged from the diesel engine 1 to a high temperature and combusting the soot (soot) accumulated on the soot filter 40. As a result the soot is eliminated, and the soot filter 40 is regenerated.

Also, even when a low-load operation in which the temperature of the exhaust gas is likely to be lowered (an operation in which the soot is likely to be accumulated) is continuously performed, an exhaust temperature increase mechanism is actuated by a forced Increase in the exhaust pressure of the exhaust throttle device 65, so that the soot filter 40 can be regenerated, and the exhaust gas purification capacity of the exhaust gas purification device 2 can be appropriately maintained. Also, a burner for burning the soot accumulated on the soot filter 40 and the like are eliminated. Also, at the start of the engine 1, the exhaust pressure of the diesel engine 1 is increased by the control of the exhaust throttle device 65, so that the temperature of the exhaust gas from the diesel engine 1 can be increased to a high temperature, and the warm-up of the diesel engine 1 can be facilitated.

As described above, regarding the exhaust throttle device 65, the exhaust gas intake side of the throttle valve case 68 is fastened to the exhaust outlet of the exhaust manifold 7 opened upward, thereby connecting the joining pipe 66 to the exhaust manifold 7 via the throttle valve case 68. Accordingly, while the exhaust throttle device 65 can be supported on the exhaust manifold 7 having high rigidity, and the supporting structure of the exhaust throttle device 65 can be constituted with high rigidity, the volume of the exhaust gas intake side of the exhaust throttle device 65 can be reduced, and the exhaust pressure in the exhaust manifold 7 can be adjusted with high precision, for example, compared with structure in which the throttle valve case 68 is connected to the exhaust manifold 7 via the joining pipe 66. For example, the temperature of the exhaust gas supplied to the exhaust gas purification device 2 and the like can be simply maintained at a temperature suitable for the purification of the exhaust gas.

Also, the throttle valve case 68 is fastened to the upper surface side of the exhaust manifold 7, and the joining pipe 66 formed in an elbow shape is fastened to the upper surface side of the throttle valve case 68, and the throttle valve case 68 and the joining pipe 66 are arranged in multiple layers with respect to the exhaust manifold 7, and an exhaust pipe 72 is coupled with the joining pipe 66 of an uppermost layer portion. Accordingly, the mounting posture (the coupling direction of the exhaust pipe 72) of the joining pipe 66 can be changed, for example, in accordance with the mounting position of the exhaust gas purification device 2 and the like without changing the supporting postures of the exhaust throttle device 65 and without changing the specifications of the joining pipe 66.

Also, the exhaust outlet of the exhaust manifold 7 is opened upward, and the throttle valve case 68 is provided on the upper surface side of the exhaust manifold 7, and a throttle valve gas outlet is formed on the upper surface side of the throttle valve case 68, and the EGR cooler 29 for cooling EGR gas is arranged with the exhaust manifold 7 sandwiched therebetween below the throttle valve case 68. Accordingly, the exhaust manifold 7, the exhaust throttle device 65, and the EGR cooler 29 can be installed in a compact way along the one side surface of the engine 1.

Thus, regarding the diesel engine 1, the joining pipe 66 is fastened to the upper surface side of the exhaust throttle device 65, and the exhaust throttle device 65 and the joining pipe 66 are arranged in multiple layers with respect to the exhaust manifold 7, and the exhaust gas inlet of the exhaust throttle device 65 is coupled with the joining pipe 66 of the uppermost layer portion. Accordingly, the exhaust throttle device 65 can be contiguously arranged in a compact way between the exhaust manifold 7 and the exhaust gas purification device 2, and the exhaust throttle device 65 can be assembled in a compact way in a limited engine Installation space. Also, the exhaust gas purification device 2 can be easily arranged at a predetermined position only by changing the shapes of the joining pipe 66.

The coolant pipe path provided on the right side (the side of the exhaust manifold 7) of the diesel engine 1 will be described. A coolant outlet pipe 76 of the water cooling case 70 is connected to the other end of a coolant return hose (a coolant pump suction side pipe) 75 whose one end is connected to the coolant pump 21. A coolant discharge port of the EGR cooler 29 is connected to the other end of a joint hose (EGR cooler discharge side pipe) 78 whose one end is connected to a coolant inlet pipe 77 of the water cooling case 70. Then, a coolant intake port of the EGR cooler 29 is connected to the cylinder block 4 via a coolant drawing hose (EGR cooler suction side pipe) 79.

That is, the EGR cooler 29 and the exhaust throttle device 65 are connected in series to the coolant pump 21. Then, in the coolant flow path formed of each of the hoses 75, 78, 79, and the like, the exhaust throttle device 65 is arranged between the coolant pump 21 and the EGR cooler 29. The exhaust throttle device 65 is positioned on the downstream side of the EGR cooler 29. Part of the coolant from the coolant pump 21 is supplied from the cylinder block 4 to the exhaust throttle device 65 via the EGR cooler 29 and recirculated.

Also, in the water cooling case 70, the coolant outlet pipe 76 and the coolant inlet pipe 77 respectively protrude from the rear surface side (the side of the tan 9) of the water cooling case 70 to the coolant pump 21. That is, the water cooling case 70 is arranged on the rear side (the side of the fan 9) with respect to the throttle valve case 68 in such a manner that the tip ends of the coolant outlet pipe 76 and the coolant inlet pipe 77 are oriented to the coolant pump 21. Accordingly, the coolant outlet pipe 76 of the water cooling case 70 can be arranged in proximity of the coolant pump 21, and the return hose 75 can be formed so as to be short. Then, the coolant outlet pipe 76 is arranged on the upper side (exhaust throttle outlet side) of the coolant inlet pipe 77.

As described above, the oil cooler 18 is arranged on the side of the intake manifold 6 with the crankshaft 3 sandwiched therebetween, and the EGR cooler 29 described later is arranged on the side of the exhaust manifold 7 with the crankshaft 3 sandwiched therebetween respectively. That is, in a plan view, while the crankshaft 3 of the diesel engine 1 is sandwiched therebetween, the oil cooler 18 is arranged on the side of the intake manifold 6, and the EGR cooler 29 is arranged on the side of the exhaust manifold 7, so that the coolant flow system for the EGR cooler 29 and the coolant flow system for the oil cooler 18 are allocated to the bilateral sides of the right and left with the crankshaft 3 sandwiched therebetween. Accordingly, the arrangement of the respective coolant flow systems is simplified, so that assembly workability or maintainability can be improved.

The exhaust throttle device 65 is arranged and separated from the right side surface of the head cover 8 in such a manner that the axial direction (the axial direction of the rotation of the motor in the actuator case 69) 65a of the rotation of the exhaust throttle valve in the throttle valve case 68 is in parallel to the right side surface of the head cover 8. That is, regarding the exhaust throttle device 65, the left end surface of the water cooling case 70 in closest proximity of the right side surface of the head cover 8 is parallel to the right side surface of the head cover 8 is a state of being separated from the right side surface of the head cover 8. Accordingly, a gap 8a is formed between the right side surface of the head cover 8 and the inner side surface (left side surface) of the exhaust throttle device 65. It is noted that, in the exhaust throttle device 65, the right end surface of the water cooling case 70 is positioned farthest from the right side surface of the head cover 8.

The exhaust throttle device 65 is formed such that the outer side surface (the right side surface) disposed opposite to the machine body frame 94 is flush with one side surface (the right side surface) of the exhaust gas purification device 2 similarly disposed opposite to the machine body frame 94. That is, the exhaust inlet-side end surface (the right side surface) of the exhaust gas purification device 2 is flush with the outer side surface (the right side surface) of the exhaust throttle device 65 on the inner side of the machine body frame 94. Accordingly, while engine room structure in which the diesel engine 1 is surrounded by the machine body frame 94 can be constituted in a simple manner, the assembly workability of the diesel engine 1 in which the exhaust gas purification device 2 is arranged can be easily improved.

Also, the outer side surface (the right side surface) of the alternator 23 is also flush with the one side surface (the right side surface) of the exhaust gas purification device 2 and the outer side surface (the right side surface) of the exhaust throttle device 65, which are flush with each other. That is, it is formed such that the outer side surface (the right side surface) disposed opposite to the machine body frame 94 of the alternator 23 is flush with the one side surface (the right side surface) of the exhaust gas purification device 2 similarly disposed opposite to the machine body frame 94. Accordingly, the one side surface of the exhaust gas purification device 2, the outer side surface of the exhaust throttle device 65, and the outer side surface of the alternator 23 can be contiguously arranged in a compact way by facing the flat, vertical wall surface of the machine body frame 94, and the diesel engine 1 can be assembled in a compact way in a limited engine room space.

The exhaust throttle device 65 is arranged at a position shifted to the outer side (right side) with respect to the purification inlet pipe 36 of the exhaust gas purification device 2 in a plan view (a top view). That is, the throttle valve case 68 is shifted to a position near to the machine body frame 94 with respect to the purification inlet pipe 36 of the exhaust gas purification device 2 and arranged. In step with this, the joining pipe 66 has a shape in the form of an S in a plan view (a top view), wherein the exhaust inlet side (the side of the exhaust throttle device 65) is disposed on the outer side (right side) with respect to the exhaust outlet side (the side of the exhaust gas purification device 2).

In the exhaust throttle device 65, the actuator case 69 is arranged on the right side with respect to the throttle valve case 68, and the coolant outlet pipe 76 and the coolant inlet pipe 77 are vertically arranged on the left side of the rear end of the water cooling case 70. That is, sufficient space in which the coolant return hose 75 and the coolant joint hose 78 are disposed can be secured between the left side surface of the actuator case 69 and the right side surface of the head cover 8 on the rear surface side (the side of the fan 9) of the water cooling case 70. Accordingly the coolant return hose 75 and the coolant joint hose 78 can be easily prevented from contacting an engine body due to the mechanical vibration and being damaged.

As illustrated in FIGS. 1, 3, 4, 7, 9, and 10, the exhaust manifold 7 is configured to connect an exhaust pressure sensor pipe 85 to a pressure outlet port 83. That is, the pressure outlet port 83 provided on the upper surface of the exhaust manifold 7 is connected to one end of the exhaust pressure sensor pipe 85 extended along the right side surface of the bead cover 8. Also, an exhaust pressure sensor 84 is installed on the rear end side (the side of the coolant pump 21) of the head cover 8, and the exhaust pressure sensor 84 is connected to the other end of the exhaust pressure sensor pipe 85 via an exhaust pressure hose 86 (connection component) constituted of a flexible rubber hose and the like.

That is, the exhaust pressure sensor pipe 85 extends in such a manner as to pass through the gap 8a between the head cover 8 and the exhaust throttle device 65. Accordingly, the exhaust pressure sensor pipe 85 can be formed so as to be short without causing other constituent components to make a detour to a connection path from the pressure outlet port 83 of the exhaust manifold 7 to the exhaust pressure sensor 84, and the vibration-proof structure of the exhaust pressure sensor pipe 85 and the connection component can be simplified. Also, according to the gap 8a, space between the head cover 8 and the left end surface of the water cooling case 70 in closest proximity of the head cover 8 is secured. Accordingly coolant pipes (the coolant return hose 75 and the coolant joint hose 78) can be arranged side by side at intervals apart with respect to the exhaust pressure sensor pipe 85. Consequently, the coolant pipes can be easily prevented from contacting the engine body due to the mechanical vibration and being damaged.

The pressure outlet port 83 is arranged at a position between the cylinder head 5 and the joining pipe 66 on the upper surface of the exhaust manifold 7. Also, as illustrated in FIG. 3, a gas temperature sensor 82 for measuring an exhaust gas temperature in the exhaust manifold 7 is installed on the upper surface of the exhaust manifold 7 on the outside (the side of the joining pipe 66) with respect to the pressure outlet port 83. As illustrated in FIGS. 2, 3, and 6 to 8, an electric wire 87 of the gas temperature sensor 82 passes the upper portion of the front end (the side of the flywheel 9) of the head cover 8 and is connected to a connector on the left side surface.

Figure 7:
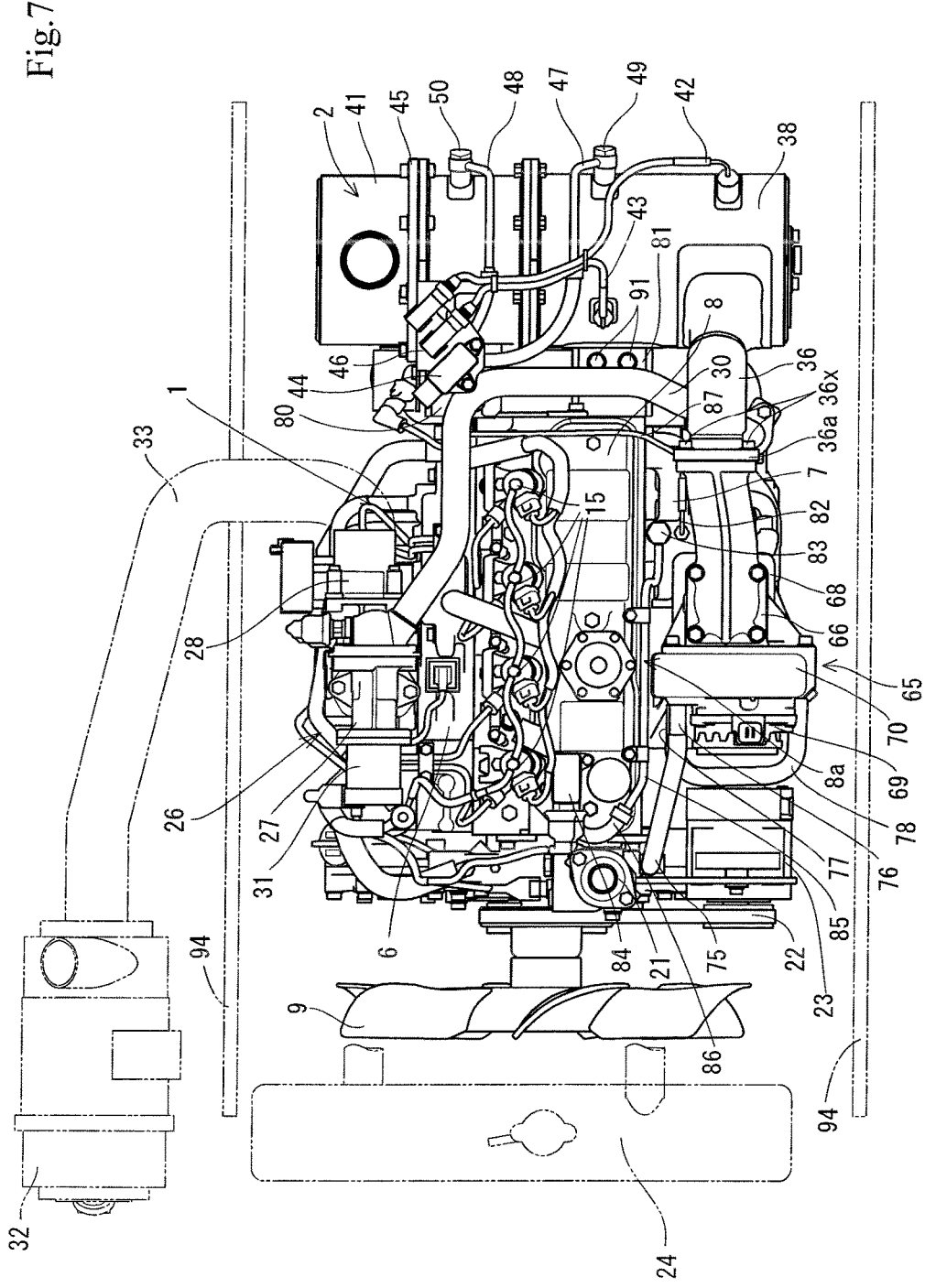
FIG. 7 is a plan view of the diesel engine in which the oil filter is detached.
Figure 8:
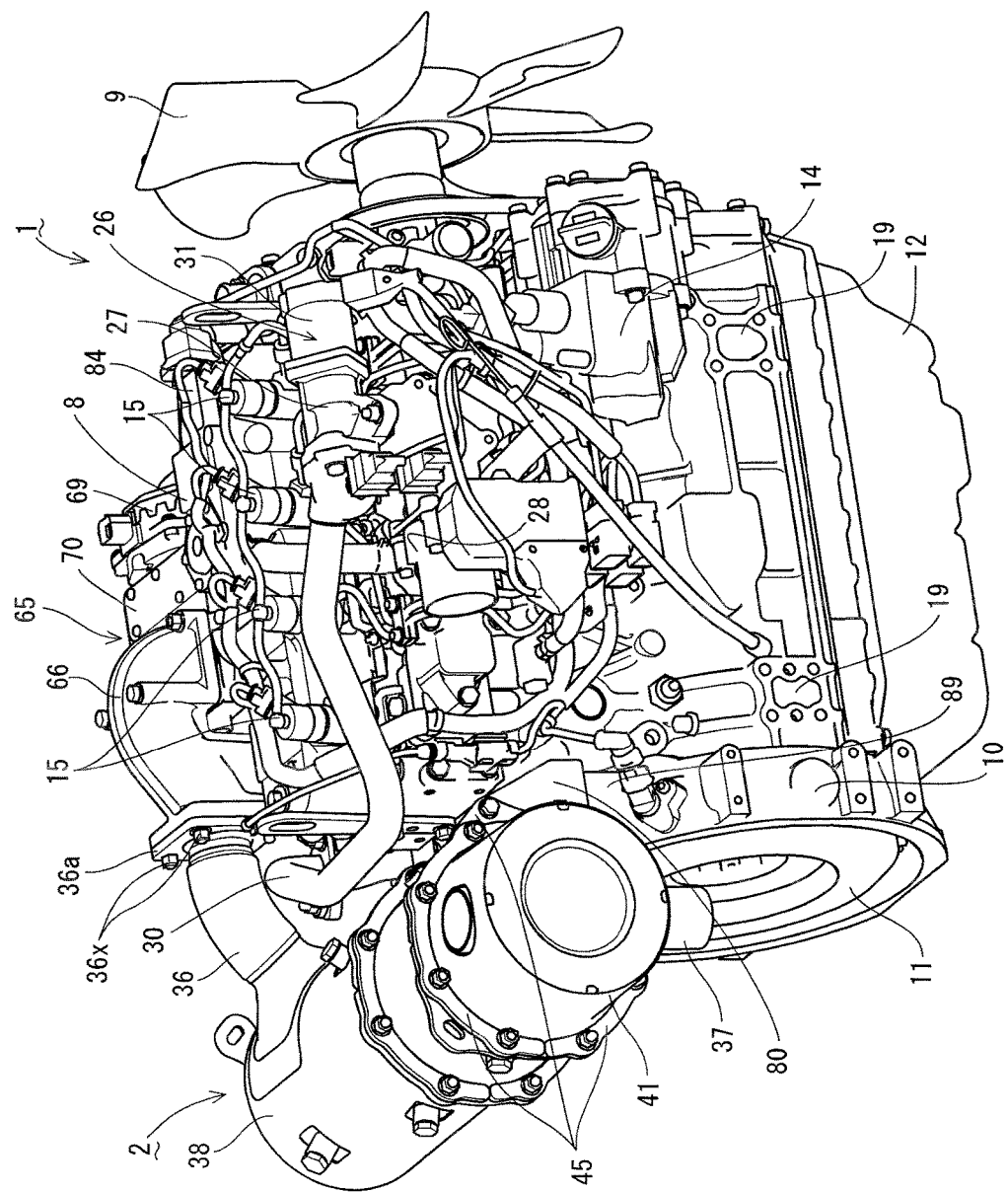
FIG. 8 is a perspective front view of the diesel engine of the present invention of the instant application.

As illustrated in FIGS. 6 and 7, the radiator 24 is arranged at a position opposite to the cooling fen 9 via a tan shroud (not illustrated) in rear of the diesel engine 1. Also, an oil cooler 25 is arranged on the front surface of the radiator 24 in such a manner as to face the cooling fan 9. Thus, the radiator 24 and the oil cooler 25 are arranged at a position opposite to the cooling fen 9 in rear of the diesel engine 1 in a row in the discharge direction of cooling wind in the order in which the amount of thermal radiation is low. Accordingly, outside air is drawn in from the rear of the diesel engine 1 by drivingly rotating the cooling fen 9, and the outside air (cooling wind) respectively blows the radiator 24 and the oil cooler 25, which are heat exchangers, thereby cooling the radiator 24 and the oil cooler 25.

Next, the exhaust gas purification device 2 will be described referring to FIGS. 1 to 3, 5 to 9, and 11 to 14. The exhaust gas purification device 2 includes an exhaust gas purification case 38 that includes the purification inlet pipe 36 and the purification outlet pipe 37. The exhaust gas purification case 38 is constituted in a cylindrical shape elongated in the right-and-left direction. Then, the purification inlet pipe 36 and the purification outlet pipe 37 are respectively provided on the right side (the upstream side of the transfer direction of the exhaust gas) and the left side (the downstream side of the transfer direction of the exhaust gas) of the exhaust gas purification case 38.

Also, the exhaust gas purification device 2 is fixed on the flywheel housing 10 and arranged in front of the cylinder head 5 and the head cover 8. In this time, the purification inlet pipe 36 is provided in rear of the right side on the cylindrical side surface of the exhaust gas purification case 38. Then, the purification inlet pipe 36 is formed in such a manner as to be bent obliquely upward to the rear so as to straddle the recirculation exhaust gas pipe 30 and detachably fastened with bolts to the joining pipe 66. In contrast, the purification outlet pipe 37 is provided below the left side on the cylindrical side surface of the exhaust gas purification case 38 and connected to the tail pipe 135.

A diesel oxidation catalyst 39 (gas purification body) such as platinum that generates nitrogen dioxide ($NO_2$), and a soot filter 40 (gas purification body) having honeycomb structure, in which the particulate matter (PM) collected is consecutively oxidized and removed at a relatively low temperature, are placed in series in the transfer direction of the exhaust gas in the interior of the exhaust gas purification case 38. It is noted that one side portion of the exhaust gas purification case 38 is formed of a silencer 41, and the purification outlet pipe 37 coupled with the tall pipe 135 is provided on the silencer 41.

With the aforementioned constitution, the nitrogen dioxide ($NO_2$) generated by the oxidation action of the diesel oxidation catalyst 39 is supplied from one side end surface (intake side end surface) into the soot filter 40. The particulate matter (PM) included in the exhaust gas of the diesel engine 1 is collected by the soot filter 40, consecutively oxidized, and removed by the nitrogen dioxide ($NO_2$). In addition to the removal of the particulate matter (PM) included in the exhaust gas of the diesel engine 1, the content of carbon monoxide (CO) or hydrocarbon (HC) in the exhaust gas of the diesel engine 1 is reduced.

Also, an upstream side gas temperature sensor 42 and a downstream side gas temperature sensor 43, each of which is of a thermistor type, are installed in the exhaust gas purification case 38. An exhaust gas temperature on a gas inflow side end surface of the diesel oxidation catalyst 39 is detected by the upstream side gas temperature sensor 42. An exhaust gas temperature on a gas outflow side end surface of the diesel oxidation catalyst is detected by the downstream side gas temperature sensor 43.

Furthermore, the differential pressure sensor 44 as an exhaust gas pressure sensor is installed in the exhaust gas purification case 38. A difference in exhaust gas pressure between the upstream side and the downstream side of the soot filter 40 is detected by the differential pressure sensor 44. It is configured such that an amount of accumulation of the particulate matter in the soot filter 40 is calculated based on the difference in exhaust gas pressure between the upstream side and the downstream, side of the soot filter 40, and the clogging state in the soot filter 40 can be grasped.

The differential pressure sensor 44 in which an electric wire connector 51 is integrally provided is supported by a sensor bracket (sensor support body) 46 formed in an approximately L-shaped plate, along with electric wire connectors 55 of the gas temperature sensors 42 and 43. The sensor bracket 46 is detachably mounted on a sensor support body 56 formed on one are body of an outlet clamping flange 45. That is, the sensor support body 56 is formed on part of the outlet clamping flange 45 on the silencing side farthest from the side of the purification inlet pipe 36. Then, a perpendicular plate portion of the sensor bracket 46 is fastened with bolts to the sensor support body 56 on the are body, which allows the sensor bracket 46 to be detachably mounted on the outlet clamping flange 45 on the silencing side. It is noted that the sensor bracket 46 is not limited to the outlet clamping flange 45, but may be fastened to another clamping flange such as a central clamping flange that is fastened in the case where the exhaust gas purification case 38 is assembled.

One end sides of an upstream side sensor pipe 47 and a downstream side sensor pipe 48 are respectively connected to the differential pressure sensor 44. Sensor pipe boss bodies 49 and 50 on the upstream side and the downstream side are arranged in the exhaust gas purification case 38 in such a manner as to sandwich the soot filter 40 in the exhaust gas purification case 38 therebetween. The other end sides of the upstream side sensor pipe 47 and the downstream side sensor pipe 48 are respectively connected to the respective sensor pipe boss bodies 49 and 50.

With the aforementioned constitution, a difference (differential pressure of the exhaust gas) between the exhaust gas pressure on the inflow side of the soot filter 40 and the exhaust gas pressure on the outflow side of the soot filter 40 is detected via the differential pressure sensor 44. The residual amount of particulate matter in the exhaust gas captured by the soot filter 40 is proportional to the differential pressure of the exhaust gas, and therefore, when the amount of particulate matter remained in the soot filter 40 increases to a predetermined amount or more, regeneration control (for example, control in which the exhaust gas temperature is raised), in which the amount of particulate matter in the soot filter 40 is reduced, is executed based on the detection results of the differential pressure sensor 44. Also, when the residual amount of particulate matter is further increased to the allowable range of regeneration control or more, the exhaust gas purification case 38 is detached and disassembled, and the soot filter 40 is cleaned, and maintenance work in which the particulate matter is artificially removed is carried out.

An exhaust gas measuring sensor mechanism made up of the differential pressure sensor 44 fixed on the sensor bracket 46 and the electric wire connectors 55 of the gas temperature sensors 42 and 43 is arranged in such a manner as to be approximately flush with the upper surface of the diesel engine 1 in a side view. The diesel engine 1 has structure in which the exhaust gas sensor 44 is arranged on the upper side surface of the exhaust gas purification device 2, and it is formed such that the upper surface of the diesel engine 1 is flush with the upper surface of the exhaust gas sensor 44 in a side view. That is, the exhaust gas measuring sensor mechanism made up of the differential pressure sensor 44 and the electric wire connectors 55 of the gas temperature sensors 42 and 43 is arranged at approximately the same height as that of the uppermost portion of the exhaust outlet pipe (joining pipe) 66 in a side view.

Next, the mounting structure of the exhaust gas purification device 2 will be described. Regarding the exhaust gas purification case 38 of the exhaust gas purification device 2, a coupling leg body (left bracket) 80 is detachably fastened with bolts to the outlet clamping flange 45 on the downstream side, and a fixing leg body (right bracket) 81 is welded and fixed to the outlet clamping flange 45. In this time, a mounting boss portion of the coupling leg body 80 is fastened with bolts and mounted on a leg body fastening portion equipped with a through hole, which is provided on the arc body of the outlet clamping flange 45. Also, the fixing leg body 81 is welded and adhered to the outer circumferential surface of the exhaust gas purification case 38 on the side of the purification inlet pipe 36. That is, the fixing leg body 81 is installed on the inlet side (upstream side) of the exhaust gas purification case 38, and the coupling leg body 80 is installed on the outlet side (downstream side) of the exhaust gas purification case 38. It is noted that the coupling leg body 80 is not limited to the outlet clamping flange 45, but may be fastened to another clamping flange such as the central clamping flange that is fastened in the case where the exhaust gas purification case 38 is assembled.

The coupling leg body 80 and the fixing leg body 81 provided on the outer circumference of the exhaust gas purification case 38 are respectively fastened with bolts to a purification device mounting portion (DPF mounting portion) 89 formed on the upper surface side of the flywheel housing 10. That is, the exhaust gas purification device 2 is stably coupled and supported on the flywheel housing 10, which is a member having high rigidity, by means of the coupling leg body 80 and the fixing leg body 81. Accordingly the exhaust gas purification device 2 is included in the vibration system of the engine 1, but as one of the constituent components of the engine 1, the exhaust gas purification device 2 can be firmly coupled with the flywheel housing 10, which is a member having high rigidity, and the damage of the exhaust gas purification device 2 due to the vibration of the engine 1 can be prevented. The exhaust gas purification device 2 can be assembled in the engine 1 at a manufacturing site of the engine 1 and shipped. Also, the exhaust gas purification device 2 can be communicated with the exhaust manifold 7 of the engine 1 at a close range, so that the exhaust gas purification device 2 can be easily maintained at an appropriate temperature, and high performance in purifying the exhaust gas can be maintained.

As described above, the exhaust gas purification device (OFF) 2 has structure in which the diesel oxidation catalyst 39, for example, such as platinum and the soot filter 40 having honeycomb structure are arranged in series and stored in the DPF casing (exhaust gas purification case) 38 made of a heat-resistant metal material via the inner side case (not illustrated) formed in a cylindrical shape. The exhaust gas purification device 2 is mounted on the flywheel housing 10 via the flange side bracket leg (coupling leg body) 80 and the casing side bracket leg (fixing leg body) 81 as the support bodies, in this case, one end side of the flange side bracket leg 80 is detachably fastened with bolts to the outer circumferential surface of the DPF casing 38 via the flange 45. One end side of the casing side bracket leg 81 is welded and integrally fixed on the outer circumferential surface of the DPF casing 38.

In contrast, the other end side of the flange side bracket leg 80 is detachably fastened with a pre-mounting bolt 90 and a post-mounting bolt 91 on the upper surface (DPF mounting portion) of the flywheel housing 10. That is, bolt through holes 90a and 91a are formed and disposed in the flange side bracket leg 80. Screw holes 90b and 91b are formed and disposed upward in the DPF mounting portion 89. It is configured that the flange side bracket leg 80 is placed on the flat upper surface of the DPF mounting portion 89, and the pre-mounting bolt 90 and the post-mounting bolt 91 are fastened to the screw holes 90b and 91b via the bolt through holes 90a and 91a, and the exhaust gas purification device 2 is detachably fixed on the upper surface of the flywheel housing 10 via the flange side bracket leg 80.

Also, the other end side of the casing side bracket leg 81 is detachably fastened with two post-mounting bolts 91 to the DPF mounting portion 89 on the upper surface of the flywheel housing 10. That is, the bolt through bole 91a is formed and disposed in the casing side bracket leg 81. The screw hole 91b is formed and disposed upward in the DPF mounting portion 89. It is configured that the casing side bracket leg 81 is placed on the flat upper surface of the DPF mounting portion 89, and the post-mounting bolt 91 is fastened to the screw bole 91b via the bolt through hole 91a, and the exhaust gas purification device 2 is detachably fixed on the upper surface of the flywheel housing 10 via the casing side bracket leg 81.

Furthermore, a notched groove 92 for inserting the pre-mounting bolt 90 into the bolt through hole 90a is formed in the other end side of the flange side bracket leg 80. The notched groove 92 is opened to the front end edge of the flange side bracket leg 80 in such a manner that when the exhaust gas purification device 2 is assembled in to the diesel engine 1, the opening portion of the notched groove 92 is positioned at the front, it is noted that the open edge portion of the notched groove 92 is formed in a tapered shape (broaden to the end).

With the aforementioned constitution, when the exhaust gas purification device 2 is assembled in to the diesel engine 1, first, the pre-mounting bolt 90 is incompletely threadedly engaged with the DPF mourning portion 89 on the upper surface of the flywheel housing 10 via the screw hole 90b. In a state where the head portion of the pre-mounting bolt 90 is separated from the upper surface of the DPF mounting portion 89 with an interval apart, which is equal to the thickness of the flange side bracket leg 80 or more, the DPF mounting portion 89 is supported with the pre-mounting bolt 90. Then, an operator lifts the exhaust gas purification device 2 with his both hands, and the bolt through hole 90a of the flange side bracket leg 80 is locked on the head portion of the pre-mounting bolt 90 via the notched groove 92, and the exhaust gas purification device 2 is temporally fixed on the upper surface of the flywheel housing 10. In this state, the operator can detach his both hands off the exhaust gas purification device 2.

Subsequently, the flange side bracket leg 80 and the casing side bracket leg 81 are fastened with three post-mounting bolts 91 to the DPF mounting portion 89 on the upper surface of the flywheel housing 10. In contrast, an inlet flange body 36a is fastened to the joining pipe 66 via an embedding bolt 36x and an inlet flange nut 36y, and the exhaust gas inlet pipe (purification inlet pipe) 36 is adhered to the joining pipe 66.

Next, the pre-mounting bolt 90 is completely fastened to the DPF mounting portion 89 on the upper surface of the flywheel housing 10, and the exhaust gas purification device 2 is detachably adhered to the exhaust gas outlet side of the joining pipe 66 and the upper surface of the flywheel housing 10, and the operation of assembling the exhaust gas purification device 2 into the diesel engine 1 is completed. It is noted that the bolt through hole 90a for inserting the bolt is opened at the front side edge of the flange side bracket leg 80 via the notched groove 92 on the front surface side in the detachable direction of the DPF casing 38, and the DPF casing 38 is lifted with both hands in a state where the pre-mounting bolt 90 is temporarily mounted in a posture of being incompletely fastened (semifixed) and transferred to the mounting section of the diesel engine 1 (or a main machine), that is, the upper surface of the flywheel housing 10, thereby engaging the bolt through hole 90a with the pre-mounting bolt 90 via the notched groove 92.

When the diesel engine 1, in which the exhaust gas purification device 2 is mounted, is viewed from the upper surface thereof the mounting position of the pre-mounting bolt 90 of the DPF mounting portion 89 overlaps the piping position of the recirculation exhaust gas pipe 30. In contrast the mounting position of the post-mounting bolt 91 of the DPF mounting portion 89 does not overlap the piping position of the recirculation exhaust gas pipe 30. That is, the screw hole 90b of the DPF mounting portion 89 is arranged on the lower side of the recirculation exhaust gas pipe 30 laid in front of the cylinder head 5, but the screw hole 91b of the DPF mounting portion 89 is arranged at a position deviated from the piping position of the recirculation exhaust gas pipe 30 in a plan view.

Accordingly, when the pre-mounting bolt 90 is temporarily fixed on the DPF mounting portion 89, the pre-mounting bolt 90 is threadedly engaged with the screw hole 90b positioned on the lower side of the recirculation exhaust gas pipe 30. Consequently, the operator can easily mount the pre-mounting bolt 90 from the front side (the front of the flywheel housing 10) of the diesel engine 1 because the exhaust gas purification device 2 is not mounted yet. Then, after the pre-mounting bolt 90 is temporarily fixed, the lower surfaces of leg bodies (bracket legs) 80 and 81 are disposed along the upper surface of the DPF mounting portion 89, thereby sliding the exhaust gas purification device 2 from the front side (the front of the flywheel housing 10) of the diesel engine 1 to the front surface of the cylinder head 5. That is, the exhaust gas purification device 2 is slid in such a manner that the pre-mounting bolt 90 passes through the notched groove 92, and the leg bodies (bracket legs) 80 and 81 are arranged on the DPF mounting portion 89.

Accordingly, in a state where the bolt through hole 90a of the flange side bracket leg 80 is locked with the pre-mounting bolt 90, the exhaust gas purification device 2 is placed on the DPF mounting portion 89. In this time, the bolt through hole 91a of the leg bodies (bracket legs) 80 and 81 is positioned on the upper side of the screw hole 91b of the DPF mounting portion 89. Then, the operator can verily the positions of the bolt through hole 91a and the screw hole 91b, which are vertically overlapped and communicated to each other, at a position in the periphery of the recirculation exhaust gas pipe 30 from the upper side of the diesel engine 2. That is, the bolt through hole 91a and the screw hole 91b are disposed at a position at which the recirculation exhaust gas pipe 30 is not overlapped in a plan view, so that the post-mounting bolts 91 can be inserted and fastened immediately above the bolt through hole 91a and the screw hole 91b.

When the exhaust gas purification device 2 is assembled in the aforementioned manner, the operator can fasten the flange side bracket leg 80 and the casing side bracket leg 81 by tightening the post-mounting bolts 91 (bolt) in a state where the operator detaches his hands off the DPF casing 38. It is noted that the exhaust gas purification device 2 can be detached in a reverse order of the aforementioned assembly. As a result, the exhaust gas purification device 2 (the DPF easing 38) can be stably coupled and supported on the front portion of the diesel engine 1 by means of the bracket legs 80 and 81 and the joining pipe 66 on the upper portion of the flywheel housing 10, which is a member having high rigidity. Also, the attachment or detachment work of the exhaust gas purification device 2 to/from the diesel engine 1 can be executed by one operator.

Thus, the diesel engine 1 includes the exhaust gas purification device 2 for treating the exhaust gas, and the exhaust gas purification device 2 is arranged on the upper surface side of the diesel engine 1. Then, the structure is provided wherein the temporal locking body 90 is pro vided on one of the diesel engine 1 or the exhaust gas purification device 2, and the temporal locking notch 92 is provided on the other of the diesel engine 1 or the exhaust gas purification device 2, and the temporal locking body 90 or the temporal locking notch 92 is arranged on the lower side of the attached component of the diesel engine 1. Accordingly, the post-mounting bolt 91 of the exhaust gas purification device 2 can be fastened at a position apart from the attached component thereby improving the attachment and detachment workability of the exhaust gas purification device 2.

The diesel engine 1 has structure in which the exhaust gas purification device 2 is mounted on the flywheel housing 10, and the recirculation exhaust gas pipe 61 as the attached component is extended between the diesel engine 1 and the exhaust gas purification device 2. Accordingly, the recirculation exhaust gas pipe 61 makes a detour to the lateral surface (lateral surface on the front surface side) of the diesel engine 1, thereby forming a mounting height in a compact way. Then, the exhaust gas purification device 2 is temporarily fixed and supported on the upper surface side of the flywheel housing 10 via he temporal locking body 90, thereby improving the fastening workability.

Also, regarding the diesel engine 1, the exhaust outlet pipe (joining pipe) 66 is adhered to the exhaust manifold 7 via the exhaust throttle valve case (throttle valve case) 68, and the exhaust outlet pipe 66 is coupled with the purification inlet pipe 36 of the exhaust gas purification device 2. Accordingly, the mounting position of the exhaust gas purification device 2 and the like can be easily changed only by changing the specifications of the exhaust outlet pipe 66, and the diesel engine 1 in which the exhaust gas purification device 2 is mounted can be mounted in accordance with the engine room space of various work vehicles in an easy manner.

The diesel engine 1 of the present embodiment is configured to be capable of exchanging the flywheel housings 10, each of which has different specifications. That is, a flywheel housing of another specification is mounted in the diesel engine 1 in accordance with a work machine to be mounted in place of the aforementioned flywheel housing 10. Hereinafter, regarding the diesel engine 1 mounted on a stationary work machine, the diesel engine 1 in which a flywheel housings 10*a*, which has specifications different from those of the flywheel housings 10, is replaced for the flywheel housing 10, will be exemplified, and the constitution thereof will be described in detail.

Figure 15:
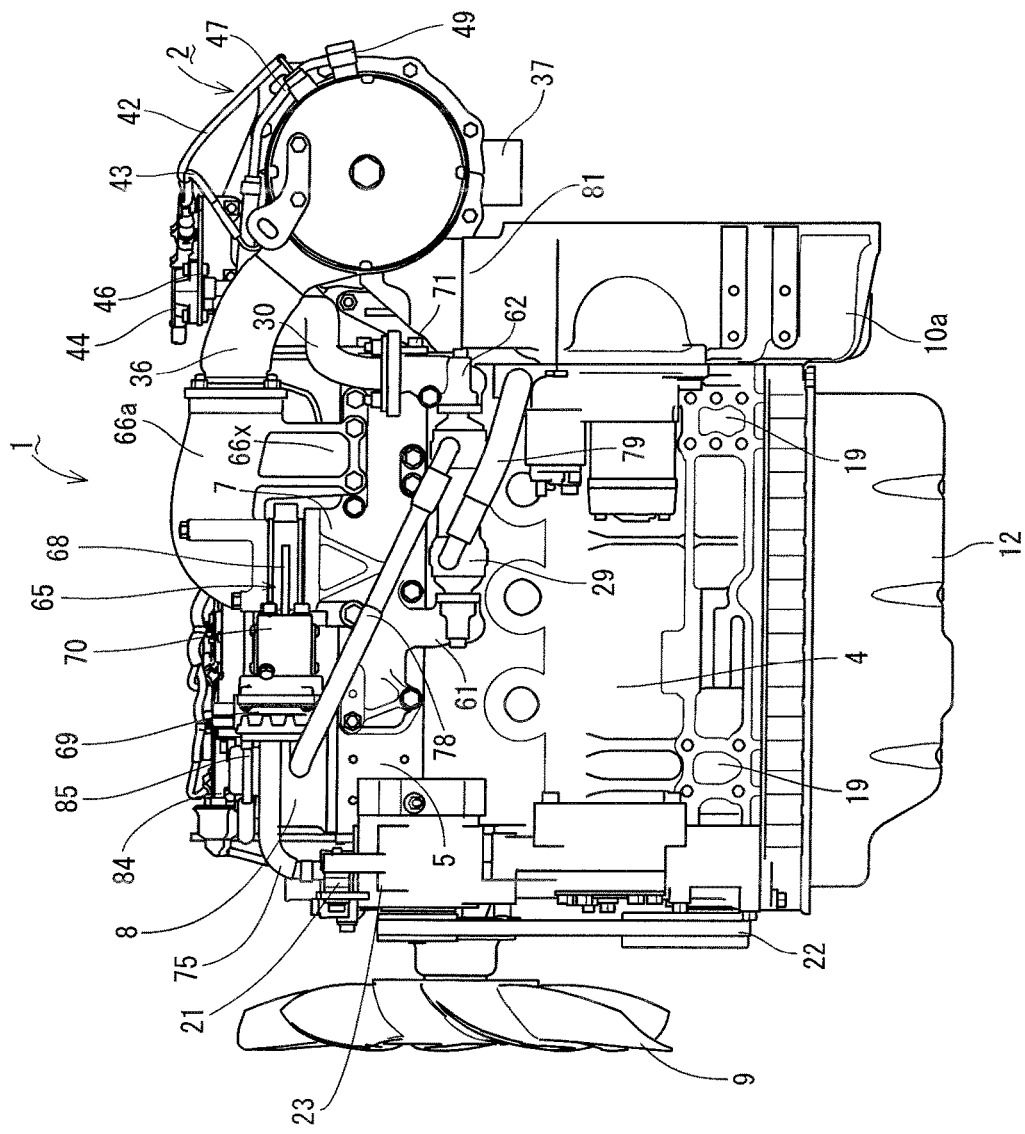
FIG. 15 is a right side view of the diesel engine as another example different from the first embodiment of the present invention of the instant application.

As illustrated in FIG. 15, a purification device mounting portion (DPF mounting portion) 89*a* configured to be capable of being installed on the upper portion of the exhaust gas purification device 2 is provided on the upper surface of the flywheel housings 10*a*. Then, the coupling leg body 80 and the fixing leg body 81 provided on the outer circumference of the exhaust gas purification case 38 are respectively mounted on the DPF mounting portion 89*a* of the flywheel housings 10*a*, and the exhaust gas purification device 2 is placed on the flywheel housings 10*a*. The exhaust gas purification device 2 on the flywheel housings 10*a* has constitution illustrated in FIG. 12, as is the same case with the exhaust gas purification device 2 mourned on the flywheel housings 10, and the purification inlet pipe 36 is detachably fastened with bolts to a joining pipe 66*a*.

The joining pipe 66*a* is placed on the throttle valve case 68 placed on the exhaust outlet of the exhaust manifold 7 and fastened with four bolts to the exhaust outlet body of the exhaust manifold 7 via the throttle valve case 68. Also, a lower-surface-side opening portion of the joining pipe 66*a* is adhered to the upper surface side of the throttle valve case 68, and the sideways opening portion of the joining pipe 66*a* is coupled with the purification inlet pipe 36 of the exhaust gas purification device 2. Also, the joining pipe 66*a* includes the coupling support portion 66*x* that couples the exhaust manifold 7 at a position between the exhaust throttle device 65 and the exhaust inlet pipe 36 of the exhaust gas purification device 2.

In this time, the diesel engine 1 has structure in which an exhaust gas sensor 44 is arranged on the upper side surface of the exhaust gas purification device 2, and it is formed such that the upper surface of the diesel engine 1 is flush with the upper surface of the exhaust gas sensor 44 in a side view. That is, the exhaust gas measuring sensor mechanism made up of the differential pressure sensor 44 and the electric wire connectors 55 of the gas temperature sensors 42 and 43 is arranged at approximately the same height as that of the uppermost portion of the exhaust outlet pipe (joining pipe) 66*a* in a side view.

Figure 16:
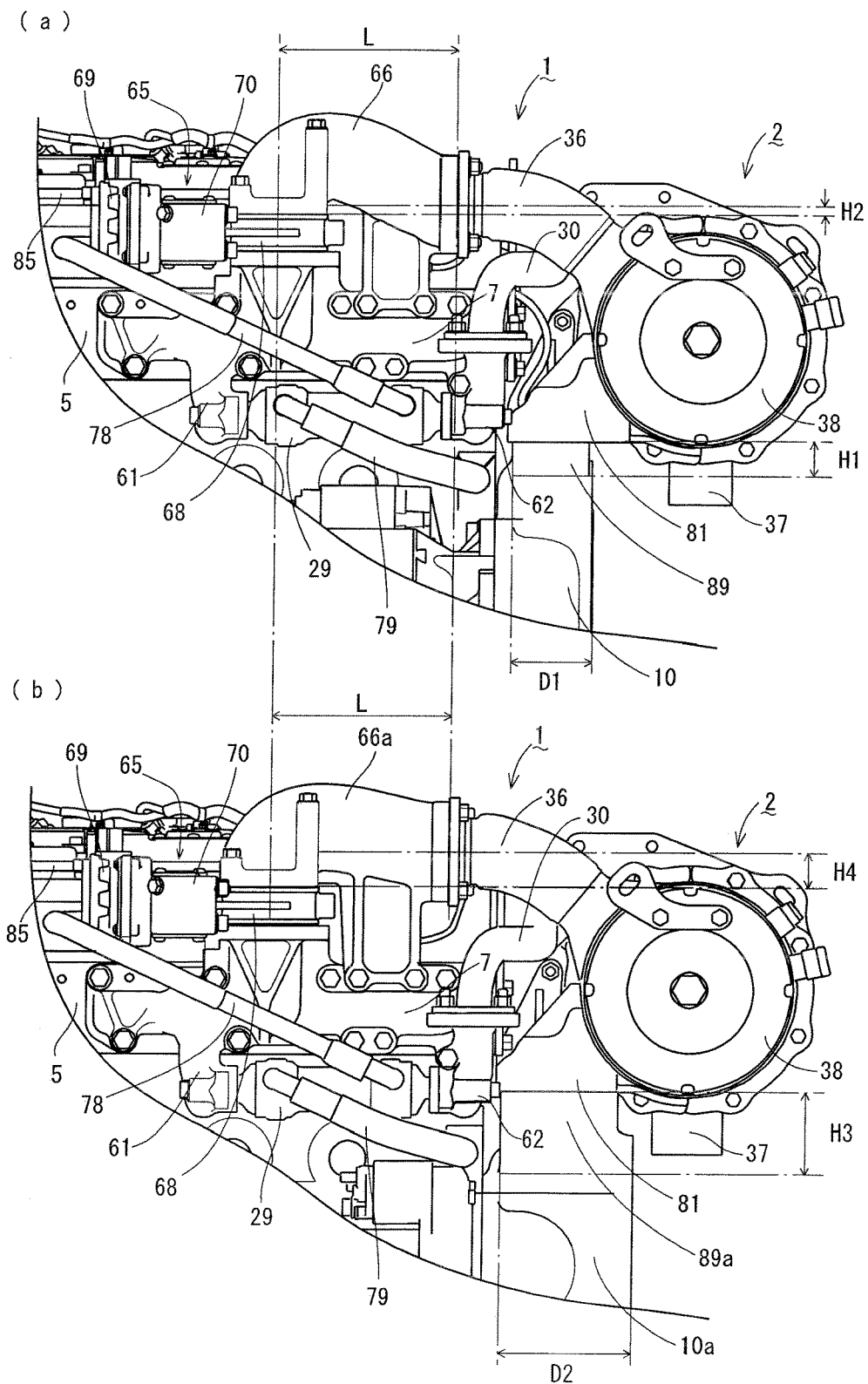
FIG. 16 is a partial enlarged view of a right side surface of the diesel engine of the first embodiment of the present invention of the instant application, and (a) is a partial enlarged view of the constitution illustrated in FIG. 1, and (b) is a partial enlarged view of the constitution illustrated in FIG. 15.

The width D2 of the flywheel housings 10*a* in the back-and-forth direction, as illustrated in FIG. 16(*b*), is longer than the width D1 of the flywheel housings 10 in the back-and-forth direction, as illustrated in FIG. 16(*a*). Also, a back-and-forth width of the DPF mounting portion 89*a* in the flywheel housings 10*a*, as illustrated in FIG. 16(*b*), is approximately equal to a back-and-forth length of the fixing leg body (right bracket) 81, and the front end edge (the side end edge of the cylinder head 5) of the fixing leg body 81 is positioned in the vicinity of the front end edge of the DPF mounting portion 89*a*.

In contrast, when the exhaust gas purification device 2 is placed on the flywheel housing 10, illustrated in FIG. 16(*a*), the front end edge of the fixing leg body 81 approximately corresponds to front end edge of the DPF mounting portion 89. Accordingly, even when the exhaust gas purification device 2 is placed on any of the flywheel housings 10 and 10*a*, the relative position of the exhaust gas purification device 2 to the exhaust manifold 7 in the back-and-forth direction does not change. That is, a distance in the back-and-forth direction between the center line on the exhaust outlet side of the throttle valve case 68 and the exhaust inlet of the purification inlet pipe 36 in the diesel engine 1 including the flywheel housing 10*a* is equal to a distance L in the back-and-forth direction between the center line on the exhaust outlet side of the throttle valve case 68 and the exhaust inlet of the purification inlet pipe 36 in the diesel engine 1 including the flywheel housing 10.

Also, as illustrated in FIGS. 16(*a*) and (*b*), a height H3 of the DPF mounting portion 89*a* on the upper side of the flywheel housing 10*a* is higher than a height H1 of the DPF mounting portion 89 on the upper side of the flywheel housing 10. Accordingly, the exhaust gas purification device 2, illustrated in FIG. 16(*b*), on the flywheel housing 10*a* is positioned high with regard to the relative height to the exhaust manifold 7, compared with the exhaust gas purification device 2, illustrated in FIG. 16(*a*), on the flywheel housing 10. That is, a distance 114 in the up-and-down direction between the exhaust outlet of the throttle valve case 68 and the center line on the exhaust inlet side of the purification inlet pipe 36 in the diesel engine 1 including the flywheel housing 10*a* is longer than a distance H2 in the up-and-down direction between the exhaust outlet of the throttle valve case 68 and the center line on the exhaust inlet side of the purification inlet pipe 36 in the diesel engine 1 including the flywheel housing 10.

The height of the exhaust gas inlet of the joining pipe 66 that couples the exhaust gas purification device 2 on the flywheel housing 10 is approximately equal to the height of the exhaust gas outlet, and therefore the joining pipe 66 is constituted in a U shape as illustrated in FIG. 16(*a*). In contrast, the exhaust gas inlet of the joining pipe 66*a* that couples the exhaust gas purification device 2 on the flywheel housing 10*a* is positioned lower than the exhaust gas outlet, and therefore the joining pipe 66*a* is constituted in an L shape illustrated in FIG. 16(*b*). Also, as illustrated in FIGS.

16(a) and 16(b), the heights of the uppermost portions of the joining pipes 66 and 66a are approximately the same in a side view.

Figure 17:
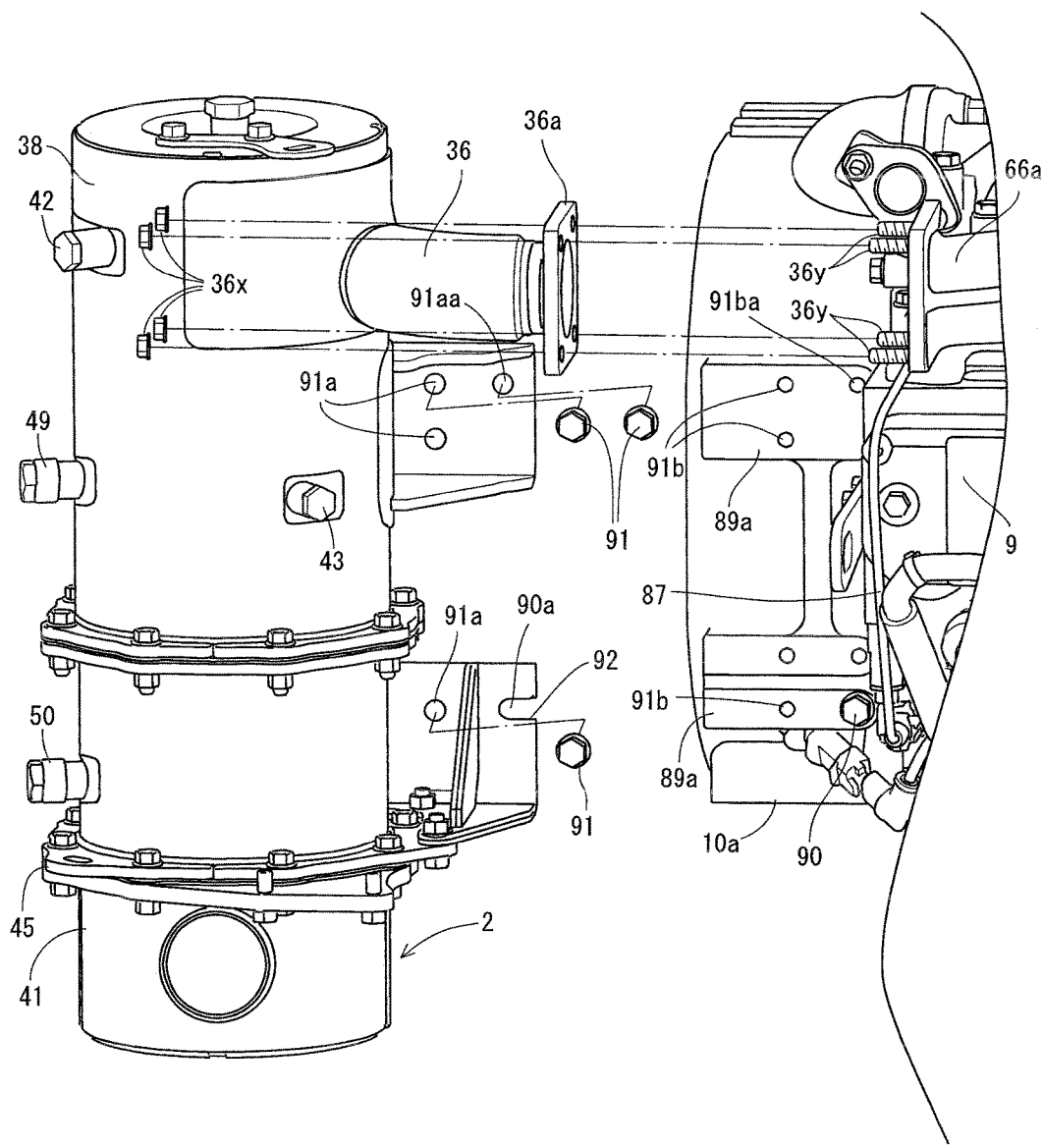
FIG. 17 is an (exploded) explanatory view of assembly of the exhaust gas purification device of the diesel engine in FIG. 15.
Figure 18:
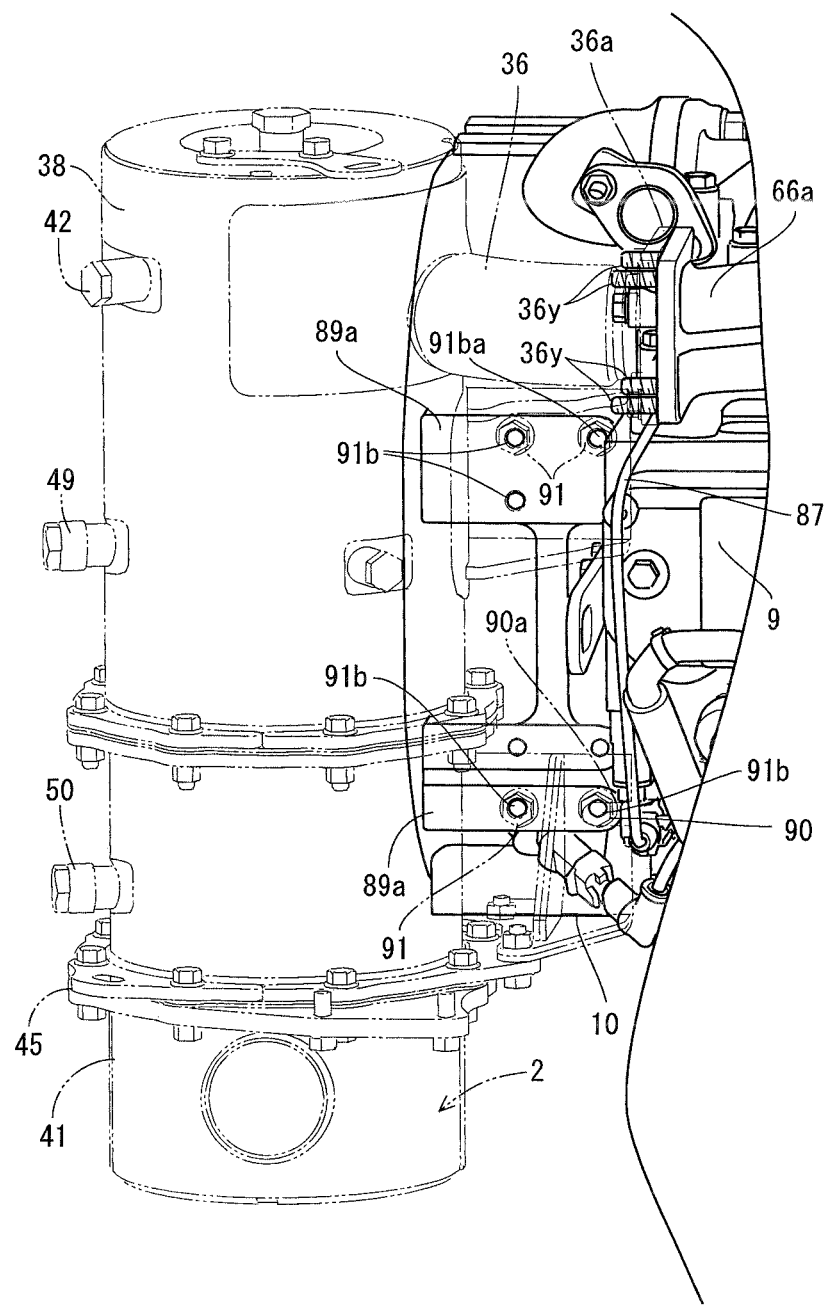
FIG. 18 is an enlarged view to describe the constitution of the mounting portion on the flywheel housing of the diesel engine in FIG. 15.
Figure 19:
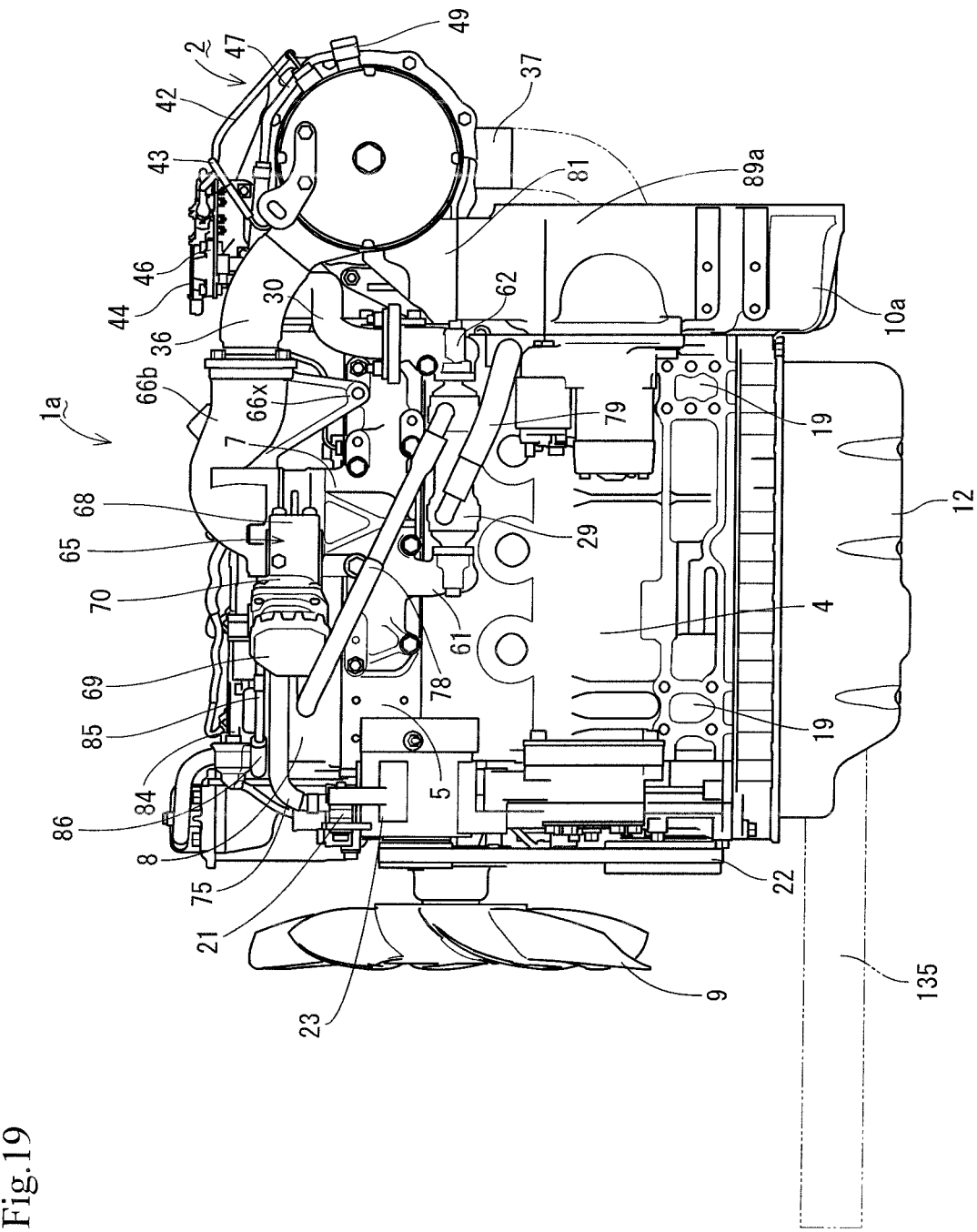
FIG. 19 is a right side view of the diesel engine of the second embodiment of the present invention of the instant application.
Figure 20:
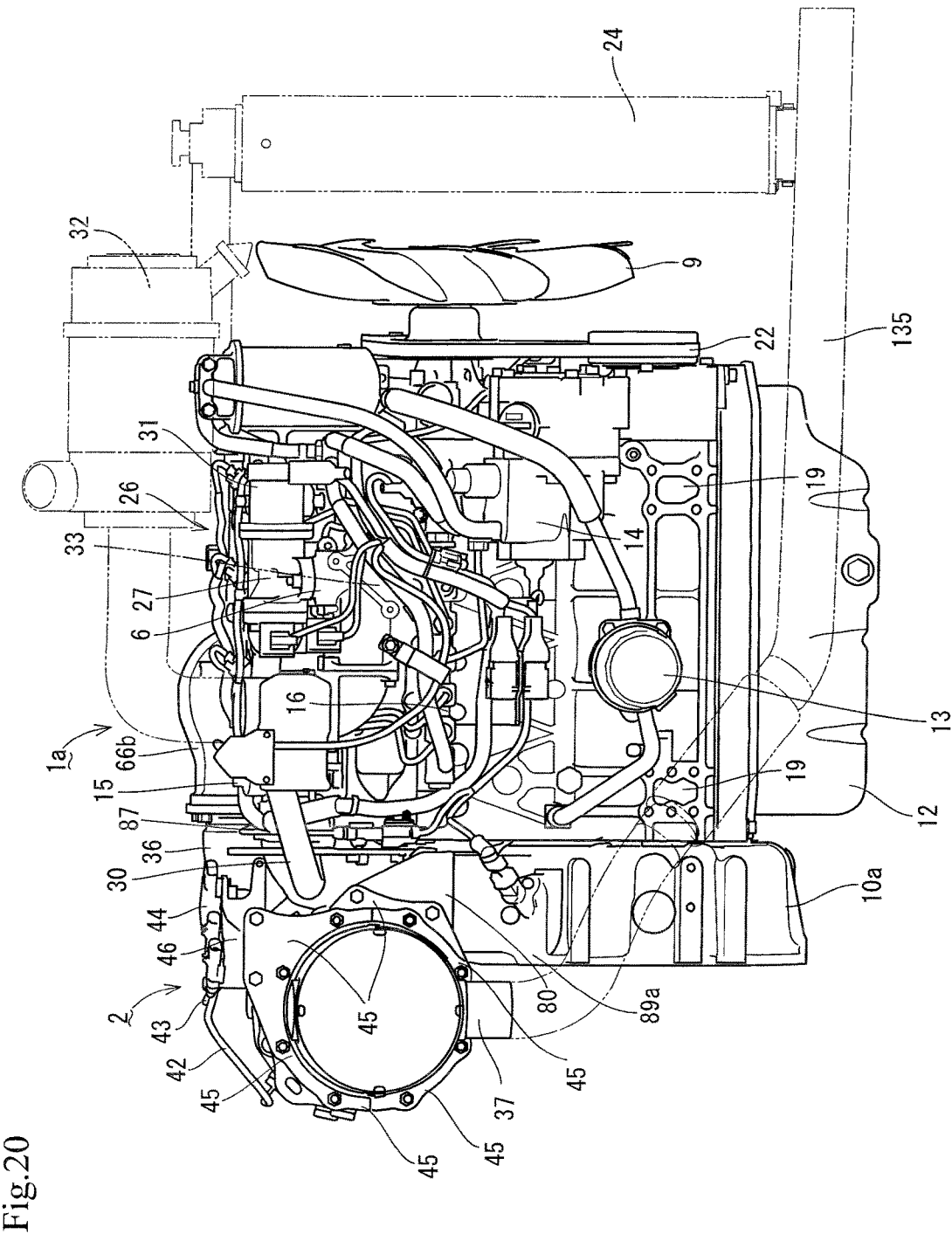
FIG. 20 is a left side view of the diesel engine.
Figure 21:
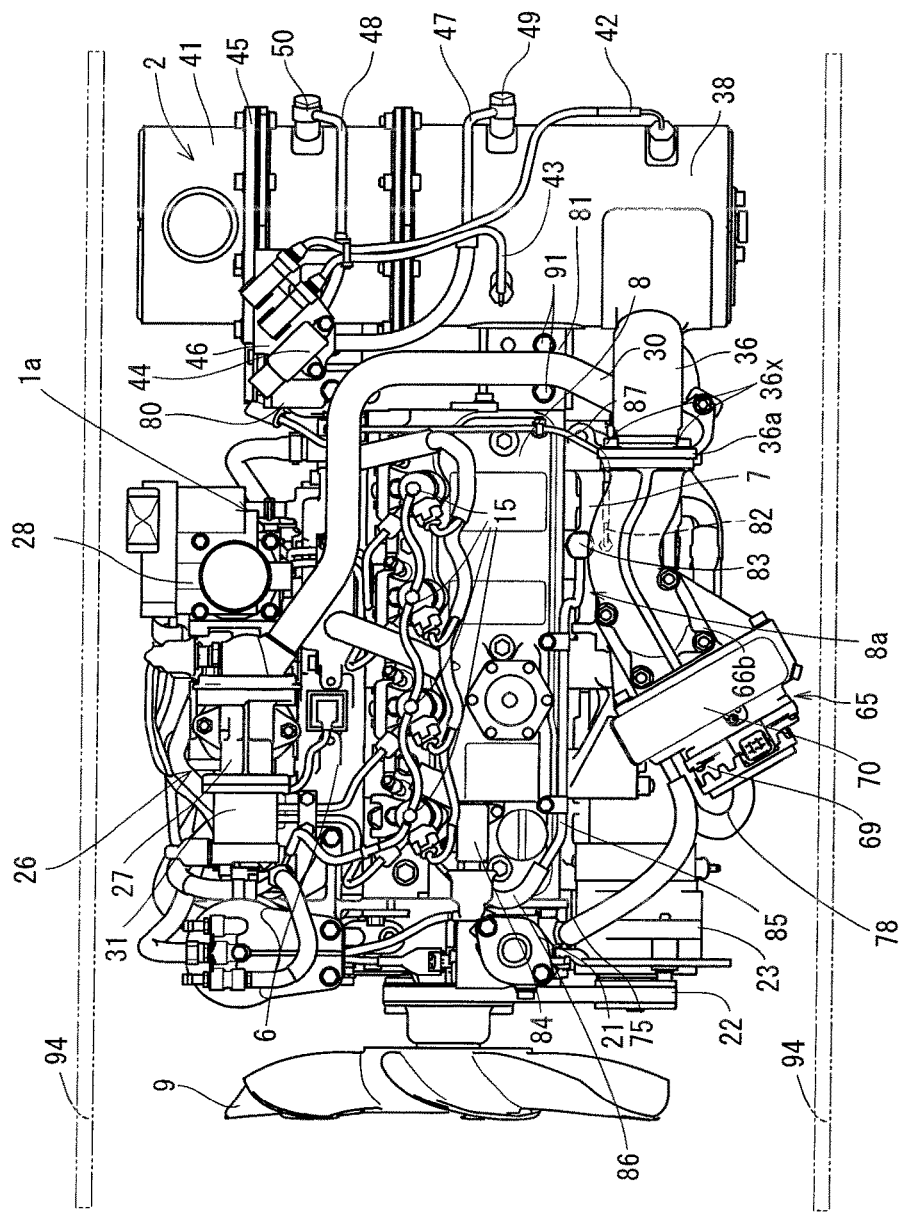
FIG. 21 is a plan view of the diesel engine.
Figure 22:
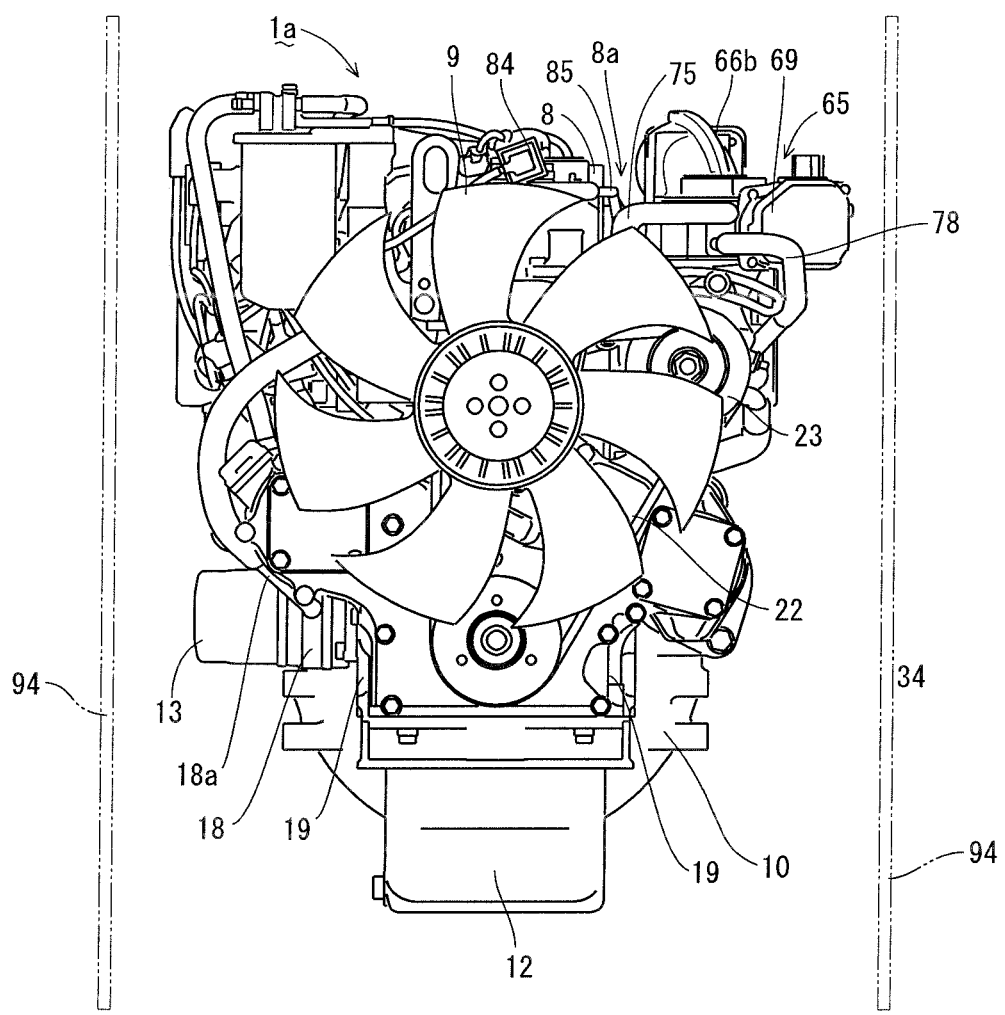
FIG. 22 is a rear view of the diesel engine.
Figure 23:
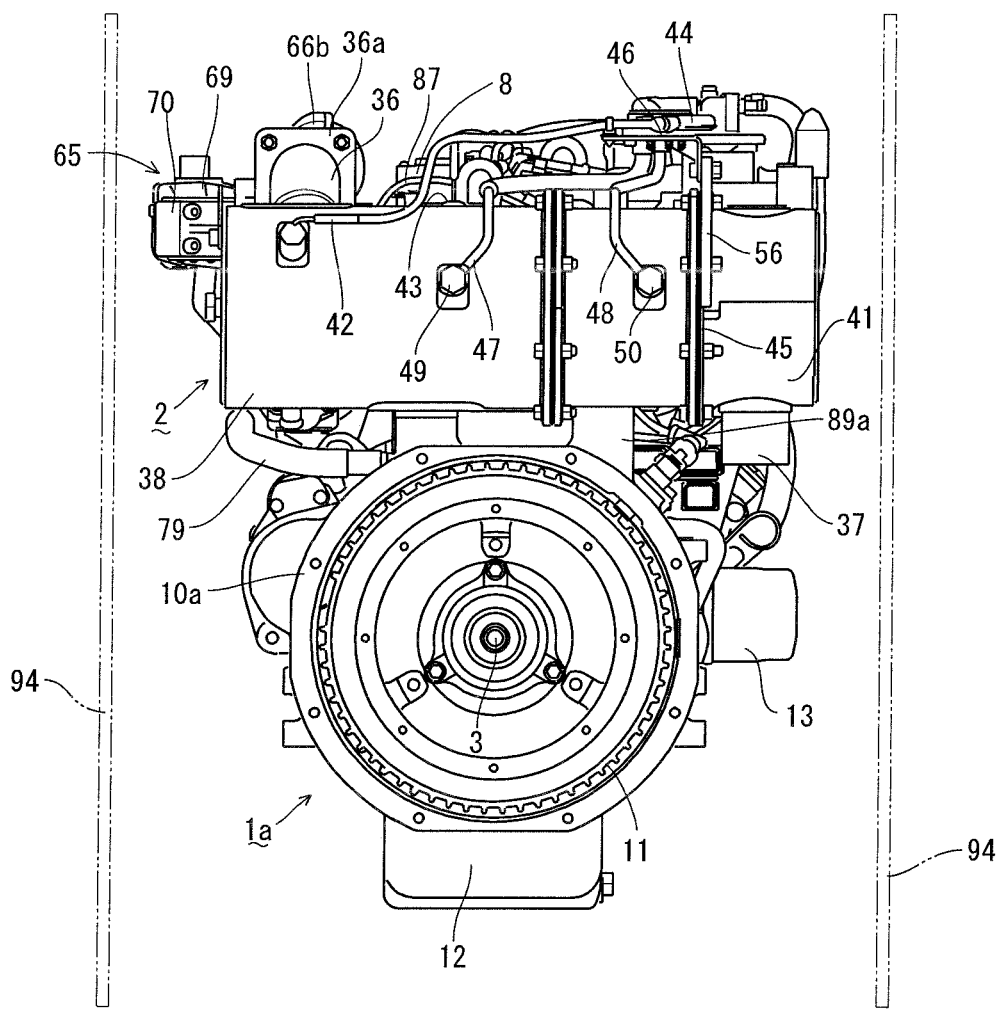
FIG. 23 is a front view of the diesel engine.
Figure 24:
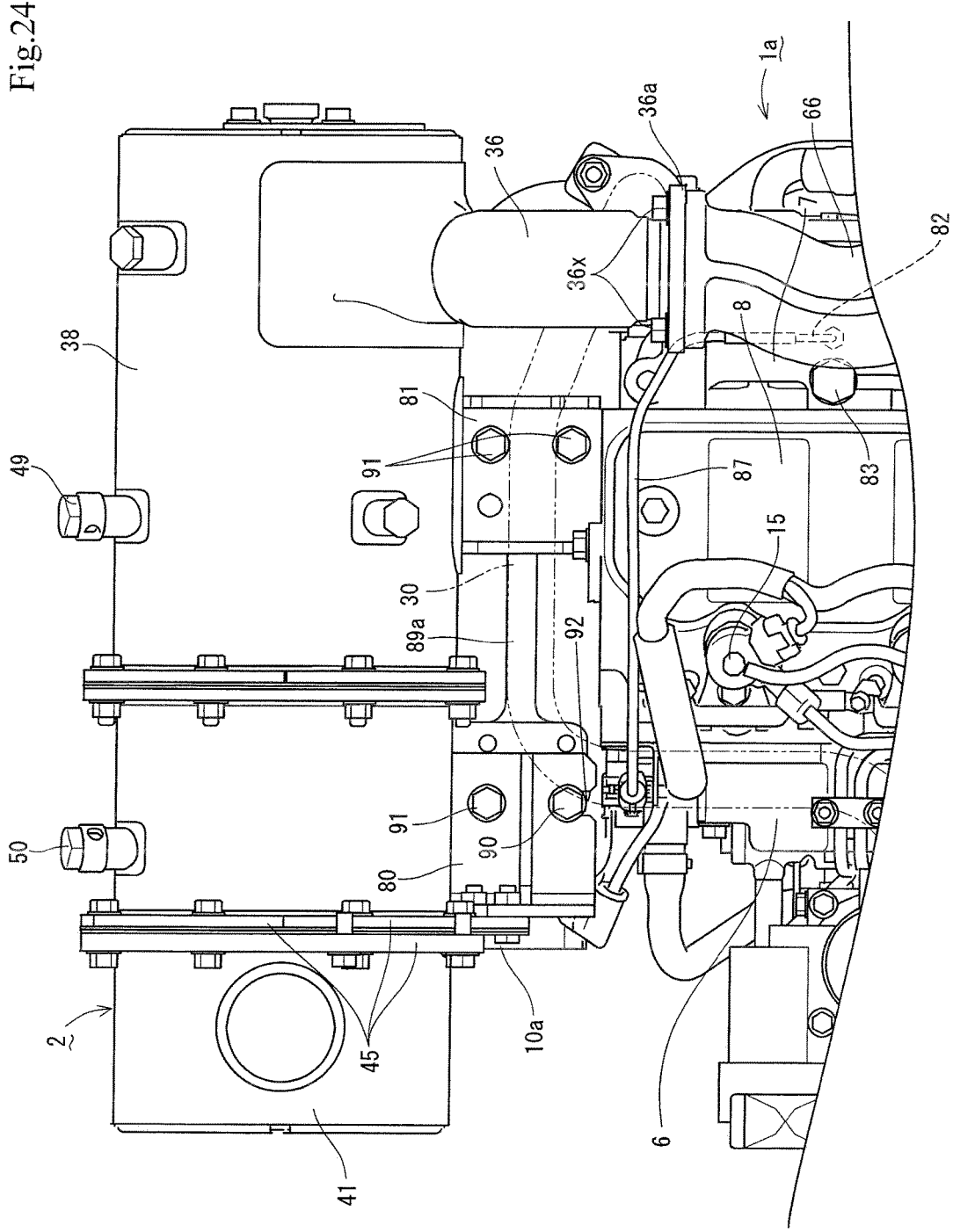
FIG. 24 is a partial enlarged view of FIG. 20.

As illustrated in FIGS. 17 and 18, the flange side bracket leg 80 is detachably fastened with the pre-mounting bolt 90 and the post-mounting bolt 91 to the DPF mounting portion 89a of the flywheel housing 10a. That is, the two bolt through holes 90a and 91a are contiguously arranged back and forth, opened, and disposed in the flange side bracket leg 80, and the screw holes 90b and 91b are contiguously arranged back and forth, opened, and disposed upward in the DPF mounting portion 89. Then, the flange side bracket leg 80 placed on the DPF mounting portion 89a is fastened with the pre-mounting bolt 90 and the post-mounting bolt 91 into the screw holes 90b and 91b through the bolt through holes 90a and 91a and fixed.

Also, as illustrated in FIGS. 17 and 18, the casing side bracket leg 81 is detachably fastened with the two post-mounting bolts 91 to the DPF mounting portion 89a of the flywheel housing 10a. The two bolt through holes 91a arranged side by side and a bolt through hole 91aa arranged in front of one of the bolt through holes 91a are opened and disposed in the casing side bracket leg 81. The screw holes 91b and 91ba contiguously arranged in back and front of the DPF mounting portion 89 are opened and disposed upward. Then, the casing side bracket leg 81 placed on the DPF mounting portion 89a is fastened with the post-mounting bolt 91 into the screw holes 91b and 91ba via the bolt through holes 91a and 91aa and fixed.

Furthermore, the notched groove 92 for inserting the pre-mounting bolt 90 into the bolt through hole 90a is formed on the other end side of the flange side bracket leg 80. The notched groove 92 is opened to the front end edge of the flange side bracket leg 80 in such a manner that when the exhaust gas purification device 2 is assembled in to the diesel engine 1, the opening portion of the notched groove 92 is positioned at the front. It is noted that the open edge portion of the notched groove 92 is formed in a tapered shape (broaden to the end).

With the aforementioned constitution, when the exhaust gas purification device 2 is assembled in to the diesel engine 1, first, the pre-mounting bolt 90 is incompletely threadedly engaged with the DPF mounting portion 89a on the upper surface of the flywheel housing 10a via the screw hole 90b. Then, an operator lifts the exhaust gas purification device 2 with his both hands, and the bolt through hole 90a of the flange side bracket leg 80 is locked with the pre-mounting bolt 90, and the exhaust gas purification device 2 is temporarily fixed on the flywheel housing 10a. Subsequently, the flange side bracket leg 80 and the easing side bracket leg 81 are fastened with the three post-mounting bolts 91 to the DPF mounting portion 89a.

In contrast the inlet flange body 36a is fastened to the joining pipe 66a via the embedding bolt 36x and the inlet flange not 36y, and the exhaust gas inlet pipe (purification inlet pipe) 36 is adhered to the joining pipe 66a. Subsequently, the pre-mounting bolt 90 is completely fastened to the DPF mounting portion 89a on the upper surface of the flywheel housing 10a, and the exhaust gas purification device 2 is detachably adhered to the exhaust gas outlet side of the joining pipe 66a and the upper surface of the flywheel housing 10a, and the operation of assembling the exhaust gas purification device 2 into the diesel engine 1 is completed.

As for the engine device of the second embodiment of the present invention of the instant application, with reference to FIGS. 19 to 24, a diesel engine 1a mourned as a power engine on the work machine such as a stationary work machine described later is exemplified and described below, it is noted that in the present embodiment, the same reference numbers are applied to the same constituent components as those of the first embodiment, and therefore their detailed descriptions are omitted.

As described above, the diesel engine 1a includes the exhaust gas purification device 2 that is connected via the exhaust throttle device 65. The exhaust gas purification device 2 includes a function of reducing carbon monoxide (CO), hydrocarbon (HC) in the exhaust gas of the diesel engine 1a, in addition to the removal of particulate matter (PM) in the exhaust gas of the diesel engine 1a. In the diesel engine 1a, the flywheel housing 10a in which the flywheel 11 is arranged in the interior is provided on the front side surface of the cylinder block 4.

The oil cooler 18 is mounted above the oil pan 12 on the left side surface of the cylinder block 4. The coolant pipes 18a and 18b are connected to the oil cooler 18 and have structure in which the coolant recirculates in the interior thereof. The oil filter 13 is arranged in such a manner as to overlap the left side of the oil cooler 18. That is, the oil filter 13 and the oil cooler 18, which are coupled to each other on the right and left, are arranged in such a manner as to protrude from the left side surface to the outer side (left side) of the cylinder block 4, at a position above the oil pan 12. The fuel supply pump 14 for supplying fuel is mounted above the oil filter 13 (below the intake manifold 6) on the left side surface of the cylinder block 4.

Also, the exhaust throttle device 65 that increases die exhaust pressure of the diesel engine 1 is provided on the right side of the cylinder head 5. The exhaust outlet of the exhaust manifold 7 is opened upward. The exhaust outlet of the exhaust manifold 7 is detachably coupled with a joining pipe 66b formed in an elbow shape via the exhaust throttle device 65 for adjusting the exhaust pressure of the diesel engine 1.

The throttle valve case 68 is placed in the exhaust outlet of the exhaust manifold 7, and the joining pipe 66b is placed in the throttle valve case 68, and the joining pipe 66b is fastened with four bolts to the exhaust outlet body of the exhaust manifold 7 via the throttle valve case 68. The lower surface side of the throttle valve case 68 is adhered to the exhaust outlet body of the exhaust manifold 7. A lower-surface-side opening portion of the joining pipe 66b is adhered to the upper surface side of the throttle valve case 68. A sideways opening portion of the joining pipe 66b is coupled with the purification inlet pipe 36 of the exhaust gas purification device 2.

Accordingly, the exhaust manifold 7 is connected to the aforementioned exhaust gas purification device 2 via the joining pipe 66b and the exhaust throttle device 65. After the exhaust gas, which has transferred from the outlet portion of the exhaust manifold 7 into the exhaust gas purification device 2 via the throttle valve case 68 and the joining pipe 66b, is purified in the exhaust gas purification device 2, the exhaust gas is transferred from the purification outlet pipe 37 to the tail pipe 135 and finally discharged to the outside of the device.

Also, the joining pipe 66b includes the coupling support portion 66x for coupling the exhaust manifold 7 at a position disposed between the exhaust throttle device 65 and the exhaust inlet pipe 36 of the exhaust gas purification device 2. The coupling support portion 66x is constituted of a wing-shaped plate that protrudes from the outer circumferential surface of the joining pipe 66 to the exhaust manifold 7 and fastened to the right side surface of the exhaust manifold 7. The exhaust inlet of the joining pipe 66b is coupled with the exhaust outlet of the exhaust manifold 7 via the exhaust throttle device 65, and a pipe portion through which the exhaust gas flows to the exhaust inlet pipe 36 is coupled with the side surface of the exhaust manifold 7 and supported by the exhaust manifold 7.

Also, the throttle valve case 68 is fastened to the upper surface side of the exhaust manifold 7, and the joining pipe 66b formed in an elbow shape is fastened to the upper surface side of the throttle valve case 68, and the throttle valve case 68 and the joining pipe 66b are arranged in multiple layers with respect to the exhaust manifold 7, and the exhaust pipe 72 is coupled with the joining pipe 66b of the uppermost layer portion. Accordingly, the mounting posture (the coupling direction of the exhaust pipe 72) of the joining pipe 66b can be changed, for example, in accordance with the mounting position of the exhaust gas purification device 2 and the tike without changing the supporting posture of the exhaust throttle device 65 and without changing the specifications of the joining pipe 66b.

Thus, regarding the diesel engine 1a, the joining pipe 66b is fastened to the upper surface side of the exhaust throttle device 65, and the exhaust throttle device 65 and the joining pipe 66b are arranged in multiple layers with respect to the exhaust manifold 7, and the exhaust gas inlet of the exhaust throttle device 65 is coupled with the joining pipe 66b of the uppermost layer portion. Accordingly, the exhaust throttle device 65 can be contiguously arranged in a compact way between the exhaust manifold 7 and the exhaust gas purification device 2, and the exhaust throttle device 65 can be assembled in a compact way in a limited engine installation space. Also, the exhaust gas purification device 2 can be easily arranged at a predetermined position only by changing the shapes of the joining pipe 66b.

The exhaust throttle device 65 is arranged and separated from the right side surface of the head cover 8 to the side (rear) of the cooling fan 9 in such a manner that the axial direction (the axial direction of the rotation of the motor in the actuator case 69) 65a of the rotation of the exhaust throttle valve in the throttle valve case 68 is inclined to the right side surface of the head cover 8. Accordingly, the left side front end of the throttle valve case 68 is in closest proximity to the right side surface of head cover 8, and the right side rear end of the actuator case 69 is positioned farthest from the right side surface of the head cover 8.

That is, the exhaust throttle device 65 is inclined and disposed with respect to the right side surface of the diesel engine 1a in a plan view, and the gap 8a is formed between the right side surface of the head cover 8 and the inner side surface (left side surface) of the exhaust throttle device 65. Accordingly, in the exhaust throttle device 65, a connection portion (the coolant outlet pipe 76 and the coolant inlet pipe 77) with a coolant pipe (the coolant return hose 75 and the coolant joint hose 78) can be formed outward on the rear surface side (the side of the cooling fan 9) of the exhaust throttle device 65. Accordingly, the exhaust throttle device 65 can be contiguously arranged on the right side surface of the diesel engine 1 and can be supported in a compact way, while the coolant pipes can be easily prevented from contacting the diesel engine 1 due to the mechanical vibration and being damaged.

In the exhaust throttle device 65, the actuator case 69 is arranged on the right side with respect to the throttle valve case 68, and the coolant outlet pipe 76 and the coolant inlet pipe 77 are vertically arranged on the left side of the rear end of the water cooling case 70. That is, sufficient space in which the coolant return hose 75 and the coolant joint hose 78 are disposed can be secured between the left side surface of the actuator case 69 and the right side surface of the head cover 8 on the rear surface side (the side of the fen 9) of the water cooling case 70. Accordingly, the coolant return hose 75 and the coolant joint hose 78 can be easily prevented from contacting an engine body due to the mechanical vibration and being damaged.

That is, the exhaust pressure sensor pipe 85 extends in such a manner as to pass through the gap 8a between the bead cover 8 and the exhaust throttle device 65. Accordingly, the exhaust pressure sensor pipe 85 can be formed so as to be short without causing other constituent components to make a detour to a connection path from the pressure outlet port 83 of the exhaust manifold 7 to the exhaust pressure sensor 84, and the vibration-proof structure of the exhaust pressure sensor pipe 85 and the connection component can be simplified. Also, according to the gap 8a, space between the head cover 8 and the left end surface of the water cooling case 70 in closest proximity of the head cover 8 is secured. Accordingly, coolant pipes (the coolant return hose 75 and the coolant joint hose 78) can be arranged side by side at intervals apart with respect to the exhaust pressure sensor pipe 85. Accordingly, the coolant pipes can be easily prevented from contacting the engine body due to the mechanical vibration and being damaged.

The exhaust gas purification device 2 is mounted on the flywheel housing 10a via the flange side bracket leg (coupling leg body) 80 and the casing side bracket leg fixing leg body) 81 as the support bodies. In this case, one end side of the flange side bracket leg 80 is detachably fastened with bolts to the outer circumferential surface of the DPF casing 38 via the flange 45. One end side of the easing side bracket leg 81 is welded and integrally fixed on the outer circumferential surface of the DPF casing 38.

In contrast, the other end side of the flange side bracket leg 80 is detachably fastened with the pre-mounting bolt 90 and the post-mounting bolt 91 on the DPF mounting portion 89a of the flywheel housing 10a. Also, the other end side of the casing side bracket leg 81 is detachably fastened with the two post-mounting bolts 91 to the DPF mounting portion 89a on the upper surface of the flywheel housing 10a. It is configured that the casing side bracket leg 81 is placed on the flat upper surface of the DPF mounting portion 89a, and the post-mounting bolts 91 are fastened to the screw holes 91b and 91ba via the bolt through holes 91a and 91aa, and the exhaust gas purification device 2 is detachably fixed on the upper surface of the flywheel housing 10a via the easing side bracket leg 81.

Furthermore, the notched groove 92 for inserting the pre-mounting bolt 90 into the bolt through hole 90a is formed on the other end side of the flange side bracket leg 80. The notched groove 92 is opened to the front end edge of the flange side bracket leg 80 in such a manner that when the exhaust gas purification device 2 is assembled in to the diesel engine 1, the opening portion of the notched groove 92 is positioned at the front. It is noted that the open edge portion of the notched groove 92 is formed in a tapered shape (broaden to the end).

When the diesel engine 1a, in which the exhaust gas purification device 2 is mounted, is viewed from the upper surface thereof the mounting position of the pre-mounting bolt 90 of the DPF mounting portion 89a overlaps the piping position of the recirculation exhaust gas pipe 30. In contrast, the mounting position of the post-mounting bolts 91 of the DPF mounting portion 89a does not overlap the piping position of the recirculation exhaust gas pipe 30. Accordingly, after the temporal fixing of the pre-mounting bolt 90, the operator arranges the lower surface of the leg bodies (bracket legs) 80 and 81 along the upper surface of the DPF mounting portion 89a, so that the post-mounting bolt 91 can be inserted immediately from above and fastened.

As described above, the constitution of the diesel engine 1a of the present embodiment has been described by exemplifying the case where the flywheel housing 10a is included. Accordingly, the constitution is provided wherein the joining pipe 66b connected between the exhaust throttle device 65 and the exhaust inlet pipe 36 is formed in an approximately S shape in a plan view, and the exhaust outlet oriented forward is arranged at a high position with respect to the exhaust inlet oriented downward. Another joining pipe is substituted for the joining pipe 66b, as is the same with the diesel engine 1 of the first embodiment, and the flywheel housing 10 having different specifications can be substituted for the flywheel housing 10a with regard to the diesel engine 1a of the present embodiment.

That is, regarding the diesel engine 1a of the present embodiment, as is the same with the diesel engine 1 of the first embodiment, the DPF mounting portion 89, whose thickness in the back-and-forth direction is thinner than that of the flywheel housing 10a and whose height is lower than that of the DPF mounting portion 89a, can be mounted on the low flywheel housing 10. Regarding the diesel engine 1a including the flywheel housing 10, the joining pipe, which is formed in an approximately S shape in a plan view and has the constitution in which the center line of the exhaust outlet oriented forward is arranged at a height that is equal to the height of the exhaust inlet oriented downward, is connected between the exhaust throttle device 65 and the exhaust inlet pipe 36, in place of the joining pipe 66b.

Thus, regarding the diesel engine 1a of the present embodiment, the exhaust outlet pipe (joining pipe) 66b is adhered to the exhaust manifold 7 via the exhaust throttle valve case (throttle valve case) 68, and the exhaust outlet pipe 66b is coupled with the purification inlet pipe 36 of the exhaust gas purification device 2. Accordingly, the mounting position of the exhaust gas purification device 2 can be easily changed only by changing the specifications of the exhaust outlet pipe 66b, and the diesel engine 1a in which the exhaust gas purification device 2 is mounted can be mounted in accordance with the engine room space of various work vehicles in an easy manner.

Hereinafter, the work vehicle in which the engine device (diesel engine 1) according to the first embodiment is mounted will be described based on the drawings with reference to FIGS. 25 to 28. FIGS. 25 to 28 are explanatory views of the wheel loader as the work vehicle.

The wheel loader 211 illustrated in FIGS. 25 to 28 includes a travelling vehicle body 216 that includes a pair of right and left front wheels 213 and a pair of right and left rear wheels 214. A maneuvering section 217 and the engine 1 are mounted on the travelling vehicle body 216. A loader device 212, which is a work portion, is configured to be equipped with the front side portion of the travelling vehicle body 216 and configured to be capable of performing loading work. A maneuvering seat 219 that the operator takes, a maneuvering handle 218, an operating means for operating the output of the engine 1 and the like, and levers, switches, or the like as an operating means for the loader device 212 are arranged in the maneuvering section 217.

As described above, the loader device 212, which is a work portion, is provided on the front portion of the wheel loader 211 and above the front wheels 213. The loader device 212 includes loader posts 222 arranged on both sides of the right and left of the travelling vehicle body 216, a pair of right and left lift arms 223 coupled with the upper end of each loader post 222 in such a manner as to oscillate up and down, and buckets 224 coupled with the tip end portions of the right and left lift arms 223 in such a manner as to oscillate up and down.

A lift cylinder 226 for oscillating the lift arm 223 up and down is provided between the each loader post 222 and the corresponding lift arm 223. A bucket cylinder 228 for oscillating the bucket 224 up and down is provided between the right and left lift arms 223 and the buckets 224. In this case, the operator on the maneuvering seat 219 operates a loader lever (not illustrated), and it is configured such that the lift cylinders 226 or the bucket cylinders 228 operates in a stretchable, contractible manner, and the lift anus 223 or the buckets 224 are oscillated up and down, thereby executing the loading work.

In the wheel loader 211, the engine 1 is arranged on the lower side of the maneuvering seat 219, and the flywheel housing 10 is arranged in such a manner as to be positioned on the front portion side of the travelling machine body 216. That is, the engine 1 is arranged in such a manner that the engine output shaft is oriented along the back-and-forth direction that the loader device 212 and a counter weight 215 are placed side by side. Then, the oil cooler 25 and the radiator 24 are arranged in the order from the front on the rear side of the front of the cooling fan 9, in the rear of the engine 1. Also, the exhaust gas purification device 2 fixed on the upper portion of the flywheel housing 10 is arranged on the upper side of the front of the engine 1.

Regarding the exhaust gas purification device 2, the purification inlet pipe 36 thereof is directly connected to the exhaust outlet 71 of the exhaust manifold 7 installed on the right side transfer direction of the exhaust gas therein is the same direction. That is, the exhaust gas flown from the purification inlet pipe 36 into the exhaust gas purification case 38 flows from the right side to die left side in the exhaust gas purification case 38, which removes the particulate matter (PM). Then, the exhaust gas purified is discharged to the outside of the device through the tail pipe 135 connected on the lateral surface on the lower left side of the exhaust gas purification device 2.

Also, the engine 1 is coupled with the air cleaner 32 that draws in fresh air (outside air) on the left side thereof. The air cleaner 32 is arranged at a position apart from the exhaust gas purification device 2, which is heated by waste heat based on the exhaust gas, in the rear on the left side of the engine 1. That is, the air cleaner 32 is arranged at a position where the air cleaner 32 is not affected by the heat from the exhaust gas purification device 2, on the left side of the radiator 24 in the rear of the engine 1. Accordingly, the air cleaner 32, which is constituted of resin molding and susceptible to heat, can be suppressed from being affected or deformed due to the waste heat based on the exhaust gas passing through the exhaust gas purification device 2.

Thus, the engine 1, the exhaust gas purification device 2, the radiator 24, and the air cleaner 32, which are arranged on the lower side and the rear of the maneuvering seat 219, are covered with a hood 220 arranged on the upper side of the counter weight 215. The hood 220 is configured to serve as a sheet frame (front cover portion) 221 protruded from the floor surface of the maneuvering section 217, and the front portion in the maneuvering section 217 and the rear portion of the maneuvering section 217 are configured to serve as a hood cover 229 (protrusion cover portion) that is openable and closable.

That is, the sheet frame 221 covers the upper section of the front portion of the engine 1, so that the exhaust gas purification device 2 arranged on the upper side of the front of the engine 1 is covered with the sheet frame 221. In contrast, the hood cover 229 has a shape formed in such a manner as to cover the engine 1 from above the rear portion to the rear of the engine 1, so that the radiator 24 and the oil cooler 25 arranged in the rear of the engine 1 are also covered.

The maneuvering seat 219 is detachably installed on the upper side of the sheet frame 221 of the hood 220. Accordingly, when the maneuvering seat 219 is detached from the sheet frame 221, the upper surface of the sheet frame 221 is opened, which makes it possible to perform maintenance for the engine 1 on the lower side of the sheet frame 221, the exhaust gas purification device 2 and the like. It is noted that the present invention is not limited to the constitution in which the maneuvering seat 219 is detachable, but may apply one wherein the maneuvering seat 219 is tilted to the front side above the sheet frame 221, which allows the upper surface of the sheet frame 221 to be opened. In this time, as the example illustrated in FIG. 26, it may be such that the sheet frame 221 itself, to which the maneuvering seat 219 is fixedly installed, is tilted to the front side, so that the upper side of the engine 1 and the like are opened.

The hood 220 includes the sheet frame 221, whose upper surface can be opened, on the front thereof, so that when the upper surface of the sheet frame 221 is closed, the sheet frame 221 covers the exhaust gas purification device 2 arranged on the upper side in front of the engine 1. Accordingly, the reduction of the temperature of the exhaust gas purification device 2, which is attributed to wind, rain, and the like, can be suppressed, and the appropriate temperature of the exhaust gas purification device 2 is easily maintained. Also, the risk that the operator comes in contact with the exhaust gas purification device 2 can be reduced. On the other hand, when the upper surface of the sheet frame 221 is opened, the upper side in front of the engine 1 is released, which facilitates access to the exhaust gas purification device 2 arranged on the upper side in front of the engine 1, so that the maintenance work is easily performed.

Figure 27:
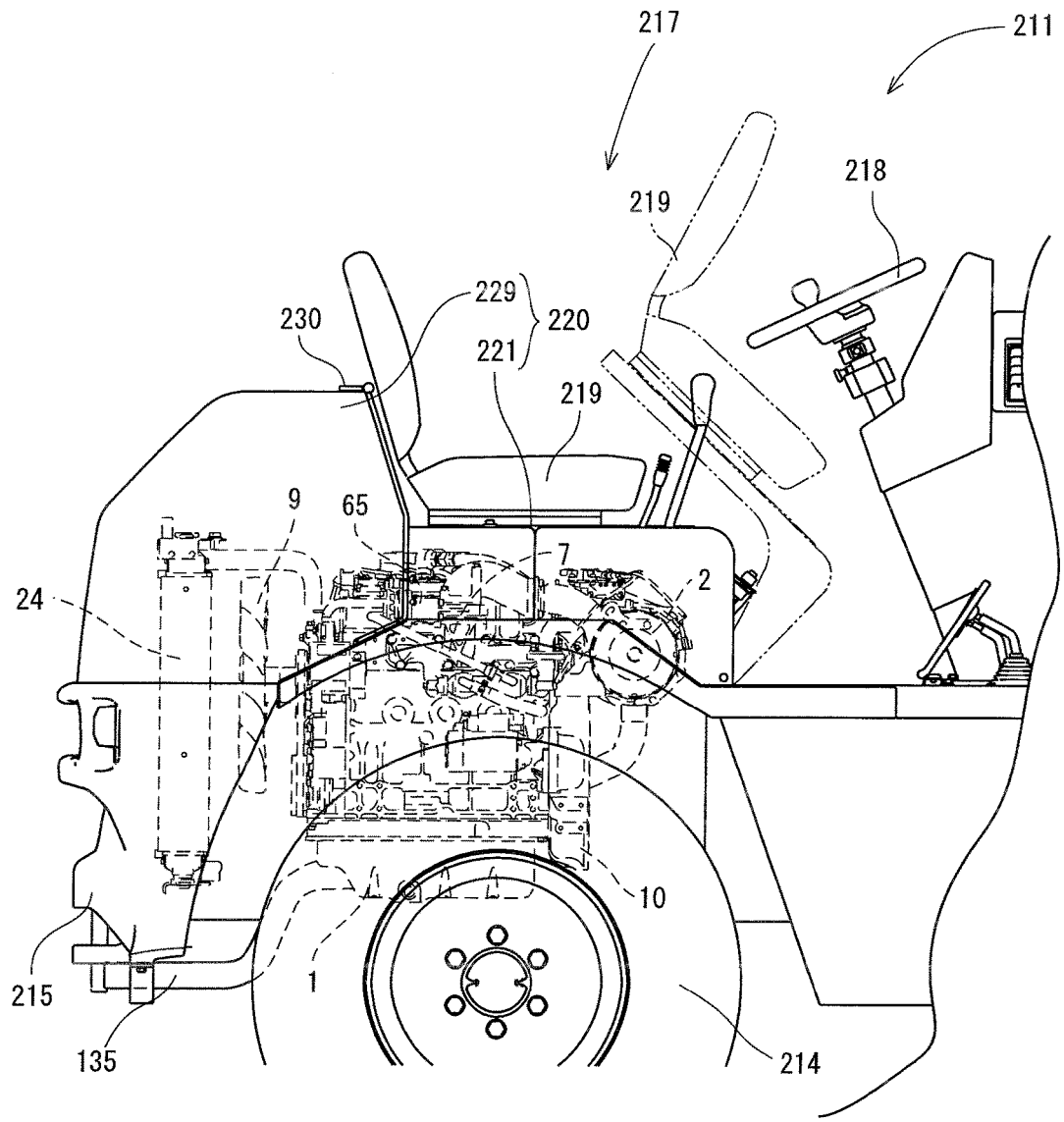
FIG. 27 is an enlarged view of the right side surface of the wheel loader to describe the rotation of a sheet frame.
Figure 28:
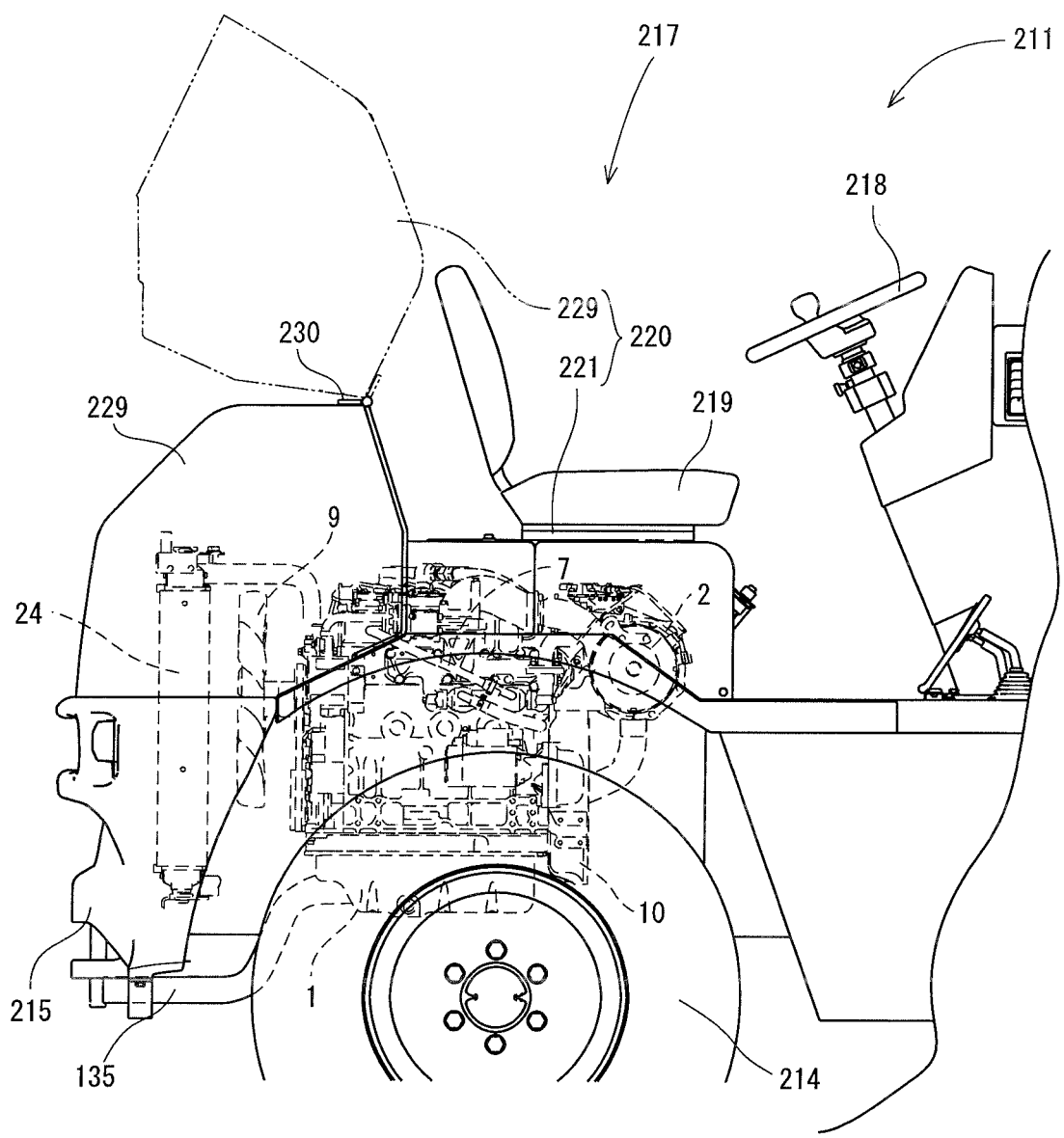
FIG. 28 is an enlarged view of the right side surface of the wheel loader to describe the rotation of a hood cover.

In contrast, in the rear of the sheet frame 221, the hood 220 includes the hood cover 229 protruded upward with respect to the upper surface of the sheet frame 221. The hood cover 229 is arranged on the upper side of the counter weight 215, thereby covering the radiator 24 and the oil cooler 25 arranged in the rear of the engine 1, and is configured to be openable/closable. That is, as illustrated in the example of FIG. 27, it may be such that a hinge portion 230 arranged on the upper side in front of the hood cover 220 is configured to pivotally support the hood cover 229 in a rotatable manner, and the hood cover 229 is rotated time, it may be configured such that the hood cover 229 is coupled with the travelling machine body 216 via a hydraulic damper and the like, so that when the hood cover 229 is opened, the hood cover 229 is supported.

Regarding the engine 1, a mission case 132 is coupled with the front surface side of the flywheel housing 10. The power transmitted from the engine 1 to the flywheel 11 is appropriately shifted by the mission case 132 and transmitted to hydraulic drive sources 133 such as the front wheels 213, the rear wheels 214, the lift cylinders 226, and the bucket cylinder 228.

Figure 29:
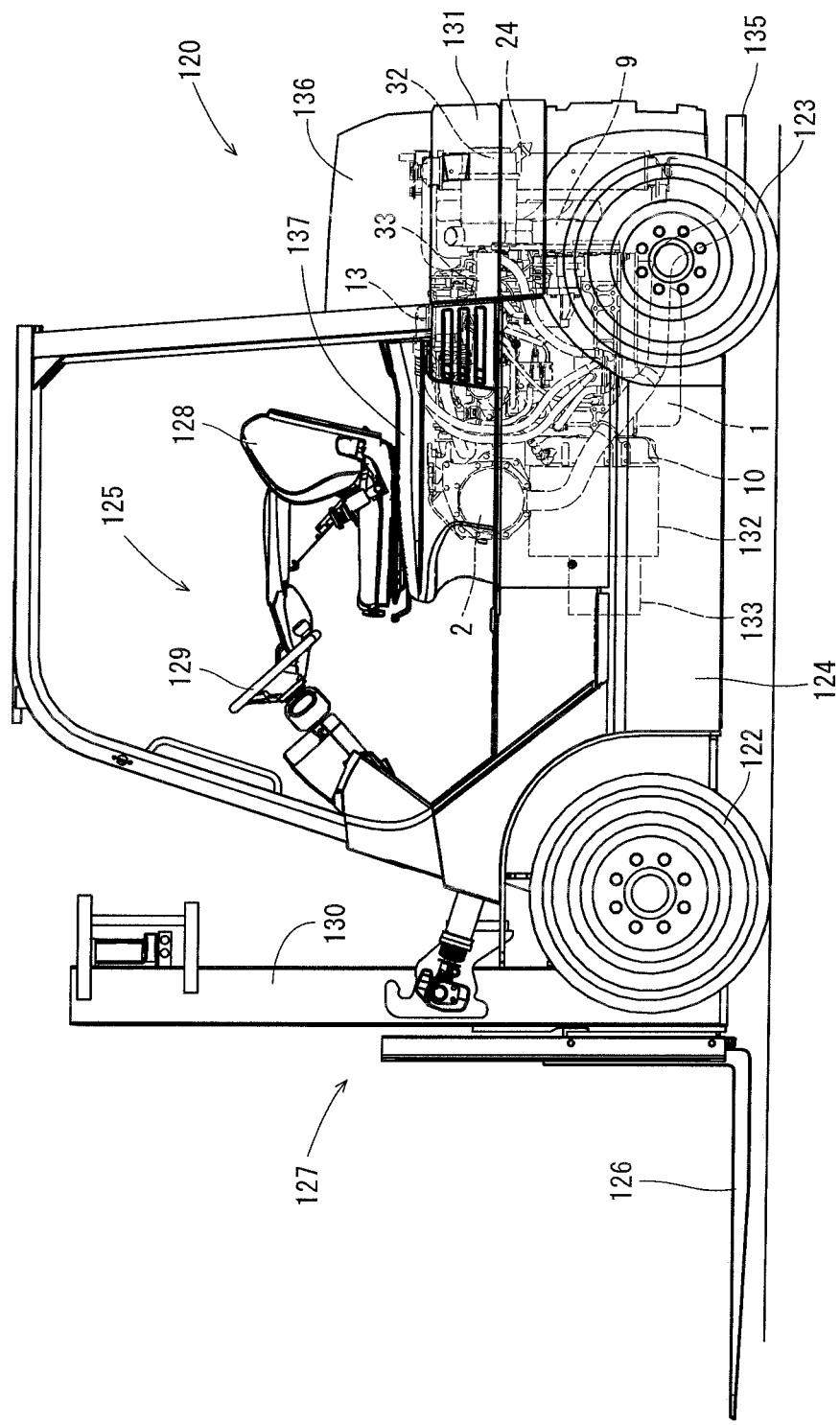
FIG. 29 is a side view of a forklift cap which is another example of the work machine in which the diesel engine of the first embodiment is mounted.
Figure 30:
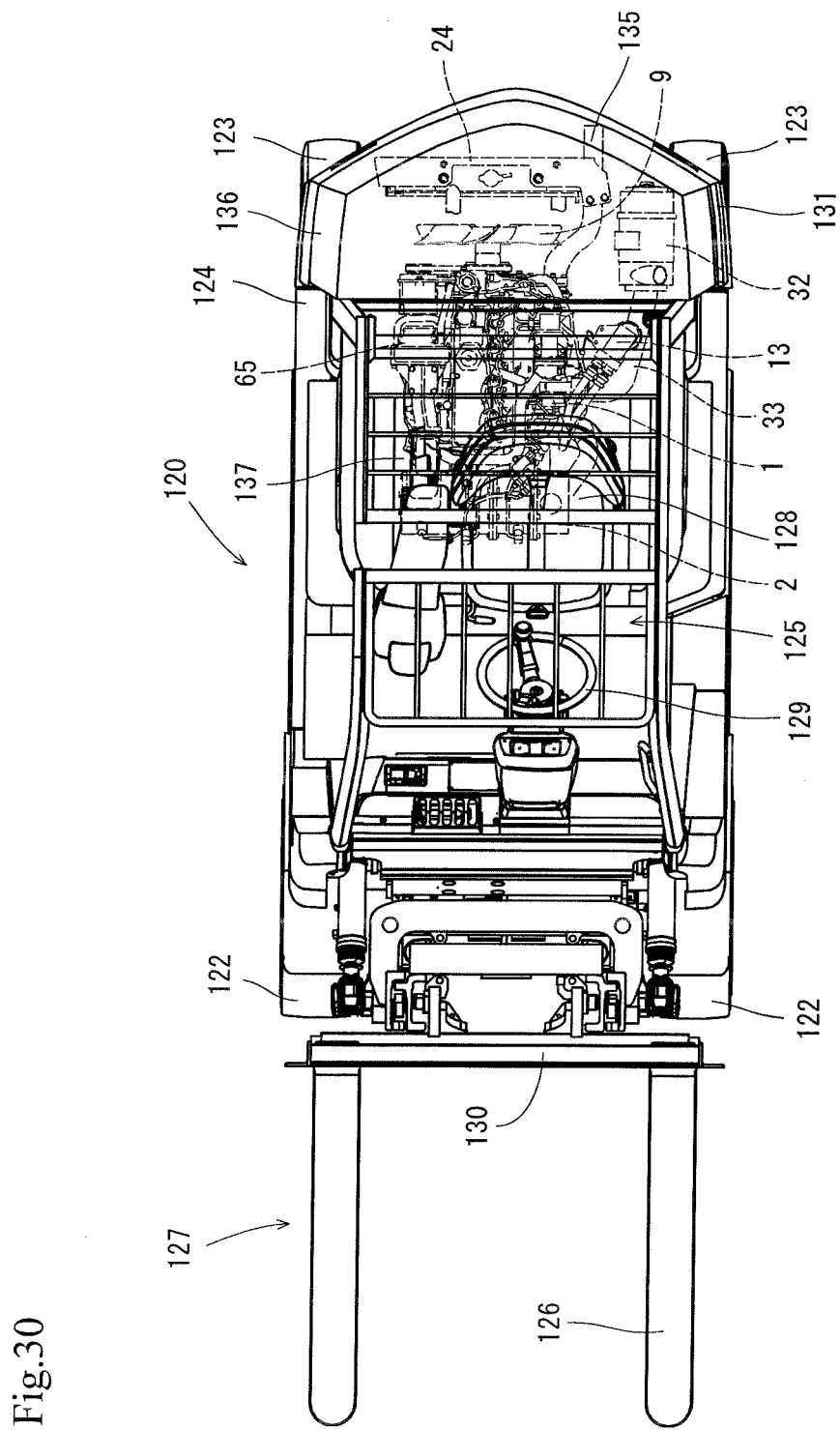
FIG. 30 is a plan view of the forklift car.

Also, structure in which the diesel engine 1 (the engine device of the first embodiment) is mounted on a forklift car 120 will be described referring to FIGS. 29 and 30. As illustrated in FIGS. 29 and 30, the forklift car 120 includes a travelling machine body 124 that includes a pair of right and left front wheels 122 and a pair of right and left rear wheels 123. A maneuvering section 125 and the engine 1 are mounted on the travelling machine body 124. A work unit 127 that includes a fork 126 for loading-and-unloading work is provided on the front side portion of the travelling machine body 124. A maneuvering seat 128 that an operator takes, a maneuvering handle 129, an operating means for operating the output of the engine 1 and the like, and levers, switches, or the like as an operating means for the work unit 127 are arranged in the maneuvering section 125.

The fork 126 is arranged in such a manner as to be capable of being hoisted and lowered on a mast 130, which is a constituent element of the work unit 127. It is configured such that the fork 126 is hoisted and lowered, and a pallet (not illustrated) on which goods are loaded is placed on the fork 126, and the travelling machine body 124 moves forward and backward, and the loading-and-unloading work such as conveyance of the pallet is carried out.

Regarding the forklift car 120, the engine 1 is arranged on the lower side of the maneuvering seat (operating seat) 128, and the flywheel housing 10 is arranged in such a manner as to be positioned on the front portion side of the travelling machine body 124. Then, the exhaust gas purification device 2 is arranged on the upper side in front of the engine 1. That is, the exhaust gas purification device 2 is arranged above the flywheel housing 10 provided in front of the engine 1. Also, the radiator 24 and the oil cooler 25 are arranged at a position facing the cooling fen 9 in the rear of the engine 1, and the air cleaner 32 connected to the left side of the engine 1 is arranged on the left side of the radiator 24 in the rear of the left side of the engine 1.

Thus, the engine f, the exhaust gas purification device 2, the radiator 24, and the air cleaner 32, which are arranged on the lower side and the rear of the maneuvering seal 128, are covered with a hood 136 arranged on the upper side of a counter weight 131. Then, regarding the hood 136, it is configured such that the maneuvering seat 128 is detachably provided, and the upper front surface portion is opened in such a manner that an operator can access the engine 1 or the exhaust gas purification device 2 in the hood 136. Also, the rear of the hood 136 is also configured to be openable/closable.

As described above, the diesel engine 1 is arranged in such a manner that the crankshaft 3 is oriented along the front-and-back direction that the work unit 127 and the counter weight 131 are placed side by side. The mission case 132 is coupled with the front surface side of the flywheel housing 10. The power transmitted from the diesel engine 1 to the flywheel 11 is appropriately shifted by the mission case 132 and transmitted to the hydraulic drive source 133 for the from wheels 122, the rear wheels 123, or the fork 126.

Figure 31:
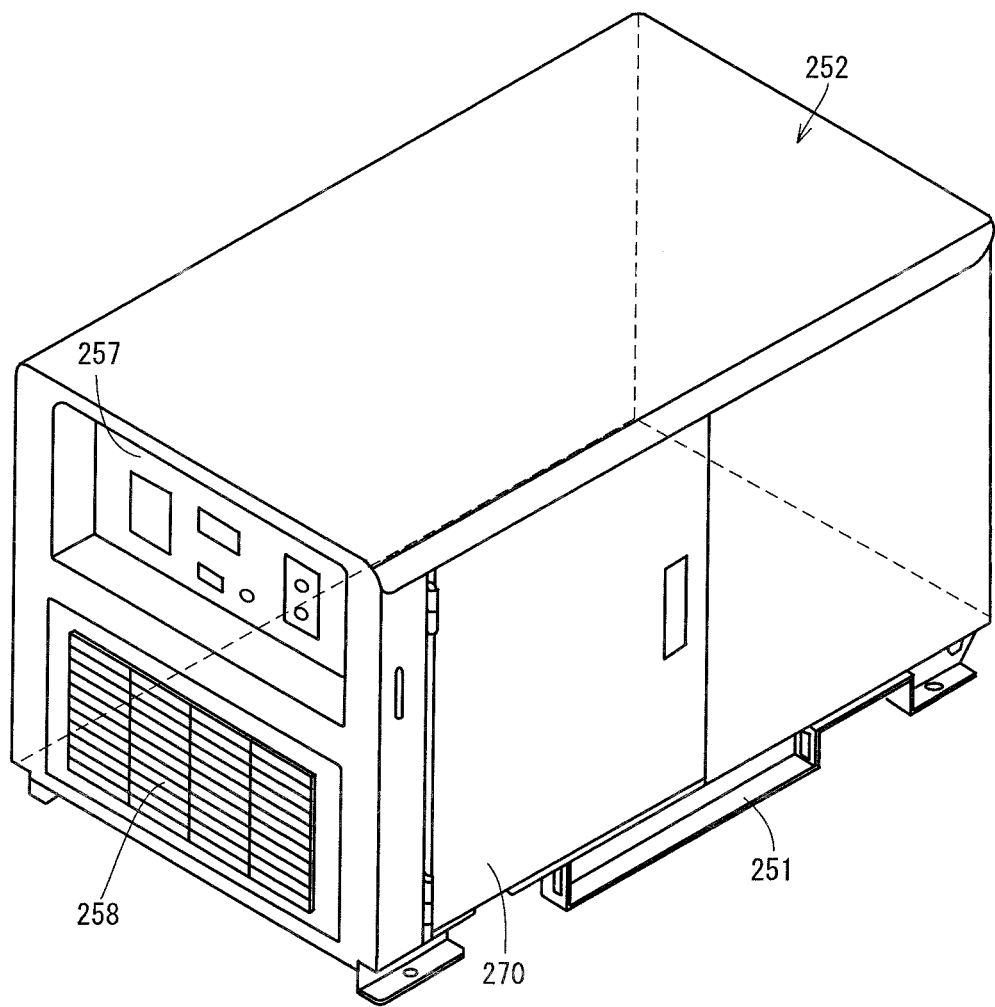
FIG. 31 is a perspective view of a stationary work machine, which is one example of the work machine in which the diesel engine of the second embodiment is mounted.
Figure 32:
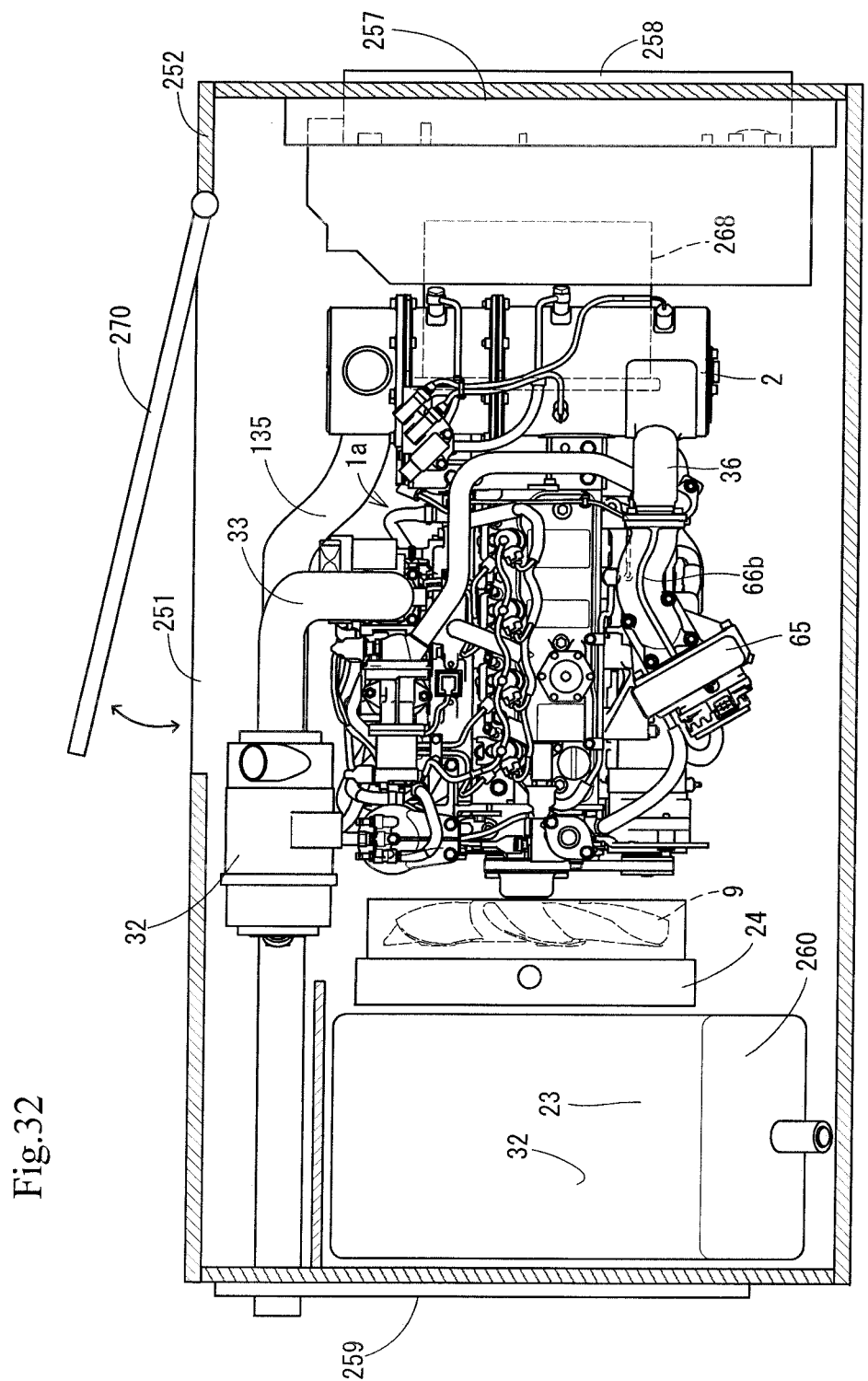
FIG. 32 is a plan view of a machine easing, of which the cross section is made, of the stationary work machine.
Figure 33:
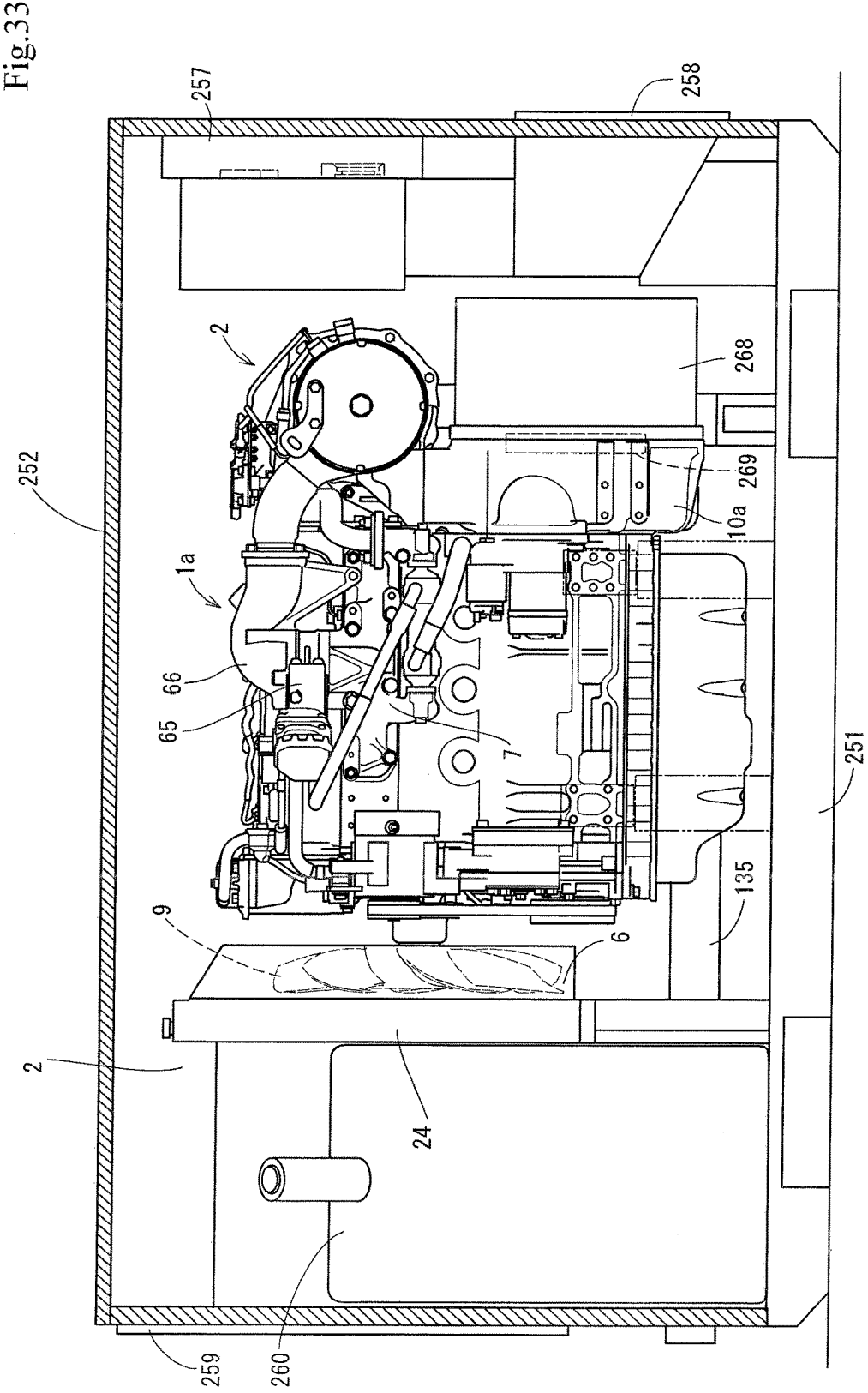
FIG. 33 is a side view of the machine casing, of which the cross section is made.

Hereinafter, the work vehicle in which the engine device (diesel engine 1a) according to the second embodiment is mounted will be described based on the drawings with reference to FIGS. 31 to 33. FIGS. 31 to 33 are explanatory views of the engine generator as a stationary work machine.

As illustrated in FIGS. 31 to 33, regarding the stationary work machine, a machine casing 252 formed in a quadrilateral box shape is placed on a machine casing stand 251. The diesel engine 1 is installed in the center in the interior of the machine casing 252 on the upper surface of the machine easing stand 251. The radiator 24 is arranged on the installation side of the cooling fan 9 on the front surface side of the diesel engine 1a. A generator 268 described later is arranged on the rear surface side of the diesel engine 1a, and an operational panel portion 257 and an outside air intake port 258 are provided on the lateral wall of the machine casing 252 on the installation side of the generator 268.

Also, the air cleaner 32 for purifying outside air and removing dust from the outside air and the exhaust gas recirculation device (EGR) 26 for recirculating part of the exhaust gas from the intake manifold 6 to each cylinder of the diesel engine 1a are provided on the installation portion of the intake manifold 6 on the right-side surface side of the diesel engine 1a. The air cleaner 32 is connected to the intake manifold 6 via the exhaust gas recirculation device 26 and the intake pipe 44, and fresh air is supplied from the air cleaner 32 to the diesel engine 1a.

On the other hand, the exhaust throttle valve (exhaust throttle device) 65 is provided on the installation portion of the exhaust manifold 7 on the left-side surface side of the diesel engine 1a. The inlet pipe 36 of the exhaust gas purification device 2 fixed on the flywheel housing 10a is connected to the exhaust manifold 7 via the exhaust throttle valve 65. Also, the exhaust gas purification device 2 is connected to the tall pipe 135, and the exhaust gas of the diesel engine 1a is discharged from the tail pipe 135 to the outside of the machine casing 252.

A warm-up discharge port portion 259 is provided on the lateral wall of the machine easing 252 on the installation side of the radiator 24, and a fuel tank 260 for the diesel engine 1a is arranged on the upper surface of the machine casing stand 251 on the installation side of the radiator 24. Also, a door 270 is provided in an openable/closable manner on the lateral wall of the machine casing 252, and the maintenance work of the air cleaner 32 or the exhaust gas purification case 38 is performed. It can be configured such that the operator can take it in or out from the door 270 to the interior of the machine casing 252.

The generator 268 as the work machine is mounted on the flywheel housing 10a of the diesel engine 1a. The driving shaft of the generator 268 is coupled with the output shaft (crankshaft) 3 of the diesel engine 1a via a PTO clutch 269 with which the operator engages of disengages by manual operations, thereby driving the generator 268 by means of the diesel engine 1a. The power of the generator 268 is configured to be supplied as a power source such as an electric apparatus at a remote place through electric cables. It is noted that, as is the same with the generator 268, a compressor or a hydraulic pump driven by the diesel engine 1a is provided, and it is possible to constitute a stationary work machine used for construction works or engineering works.

It is noted that the present invention of the instant application is not limited to the aforementioned embodiments, but can be embodied in various modes. Also, the constitution of each portion of the present invention of the instant application is not limited to the embodiments illustrated, but various modifications can be applied without departing from the scope of the gist of the present invention of the instant application.

The invention claimed is:

1. An engine device comprising:
   an engine having a cylinder block, a cylinder head and a head cover;
   an exhaust gas purification device for treating exhaust gas of the engine;
   an exhaust inlet pipe integral with a surface of a body of the exhaust gas purification device;
   an exhaust manifold having an exhaust outlet formed on an upper surface thereof and facing upwards;
   an exhaust throttle valve having an exhaust throttle valve case fastened to the exhaust outlet at a lower surface of the exhaust throttle valve case, the exhaust throttle valve case being adjacent to a lateral side of the engine and inclined away from said lateral side of the engine in a direction toward a front of the engine at which a cooling fan is mounted to form a gap between the exhaust throttle valve case and the lateral side of the engine;
   a joining pipe, wherein the joining pipe is detachably fastened at a first end thereof to the exhaust throttle valve case at an upper surface of the exhaust throttle valve case and detachably fastened at a second end thereof to a distal end of the exhaust outlet pipe; and
   a cooling pipe for the exhaust throttle valve, and wherein the cooling pipe is connected to a surface of the exhaust throttle valve case facing toward the front of the engine.

2. The engine device according to claim 1,
   wherein the exhaust gas purification device is mounted on a fly wheel housing of the engine.

3. The engine device according to claim 1,
   further comprising an exhaust pressure pipe connected to a pressure outlet port on an upper surface of the exhaust manifold and
   wherein the exhaust pressure sensor pipe passes through the gap between the lateral side of the engine and the exhaust throttle valve case and connected to an exhaust pressure sensor provided proximate the front of the engine.

4. The engine device according to claim 1,
   wherein the exhaust gas purification device is mounted on a flywheel housing of the engine.

5. The engine device according to claim 3,
   wherein an upper surface of the engine is flush with an upper surface of the exhaust gas sensor.

6. The engine device according to claim 4,
   wherein an exhaust outlet pipe is adhered to the exhaust manifold and the exhaust outlet pipe is coupled with the exhaust inlet pipe of the exhaust gas purification device, and
   wherein the exhaust throttle valve is provided between the exhaust manifold and the exhaust outlet pipe.

7. The engine device according to claim 6,
   wherein one side surface of the exhaust gas purification device is flush with an outer side surface of the exhaust throttle valve.

* * * * *